United States Patent
Okada et al.

(10) Patent No.: US 8,331,769 B2
(45) Date of Patent: Dec. 11, 2012

(54) RECORDING MEDIUM, PLAYBACK DEVICE, PROGRAM, PLAYBACK METHOD, AND RECORDING METHOD

(75) Inventors: Tomoyuki Okada, Nara (JP); Masayuki Kozuka, Osaka (JP); Kazuhiko Nakamura, Osaka (JP); Yasushi Uesaka, Hyogo (JP); Wataru Ikeda, Osaka (JP)

(73) Assignee: Panasonic Corporation, Osaka (JP)

( * ) Notice: Subject to any disclaimer, the term of this patent is extended or adjusted under 35 U.S.C. 154(b) by 416 days.

(21) Appl. No.: 12/792,056

(22) Filed: Jun. 2, 2010

(65) Prior Publication Data

US 2010/0260489 A1 Oct. 14, 2010

Related U.S. Application Data

(63) Continuation of application No. 10/525,788, filed as application No. PCT/JP03/11679 on Sep. 12, 2003, now Pat. No. 7,764,868.

(60) Provisional application No. 60/409,999, filed on Sep. 12, 2002, provisional application No. 60/440,623, filed on Jan. 17, 2003.

(51) Int. Cl.
*H04N 5/92* (2006.01)
*H04N 9/80* (2006.01)
*H04N 5/84* (2006.01)
*H04N 5/89* (2006.01)
H04N 5/76 (2006.01)

(52) U.S. Cl. ........ 386/326; 386/239; 386/248; 386/261; 386/291; 386/332; 386/334; 386/336; 386/337

(58) Field of Classification Search ................. 386/239, 386/248, 261, 291, 326, 332, 334, 336, 337
See application file for complete search history.

(56) References Cited

U.S. PATENT DOCUMENTS

| | | | |
|---|---|---|---|
| 5,434,676 A | | 7/1995 | Okamoto et al. |
| 5,696,919 A | * | 12/1997 | Masuno et al. ............... 715/841 |
| 5,771,334 A | * | 6/1998 | Yamauchi et al. ............ 386/239 |
| 5,907,658 A | * | 5/1999 | Murase et al. ................. 386/248 |
| 6,067,400 A | * | 5/2000 | Saeki et al. .................... 386/243 |
| 6,141,044 A | | 10/2000 | Anderson et al. |

(Continued)

FOREIGN PATENT DOCUMENTS

EP 0 479 535 4/1992

(Continued)

OTHER PUBLICATIONS

Blu-ray Disc Association: "White paper Blu-ray Disc Format 2.B Audio Visual Application Format Specifications for BD-ROM" dated Mar. 31, 2005. XP007903517.

(Continued)

*Primary Examiner* — Daquan Zhao
(74) *Attorney, Agent, or Firm* — Panasonic Patent Center

(57) ABSTRACT

Recorded on the recording medium (BD-ROM) is an AV stream that is obtained by multiplexing a video stream and one or more audio streams. MOVIE objects are scenarios showing playback procedures of video data described using playback device-oriented commands. In addition to the MOVIE objects, enhanced-mode scenarios (Java and WebPage objects) are also recorded on the recording medium. These enhanced-mode scenarios, each of which is described in the Java language or a markup language, show control procedures with respect to playback devices. The Java and WebPage objects are capable of taking over register setting values set by MOVIE objects, and extracting parts of video data played by MOVIE objects.

4 Claims, 57 Drawing Sheets

U.S. PATENT DOCUMENTS

| | | | |
|---|---|---|---|
| 6,215,746 B1* | 4/2001 | Ando et al. | 369/53.2 |
| 6,266,483 B1* | 7/2001 | Okada et al. | 386/248 |
| 6,288,991 B1* | 9/2001 | Kajiyama et al. | 369/47.23 |
| 6,456,777 B1* | 9/2002 | Masuno et al. | 386/243 |
| 6,519,168 B2* | 2/2003 | Jain et al. | 363/98 |
| 6,539,168 B2 | 3/2003 | Ando et al. | |
| 6,564,006 B1* | 5/2003 | Mori et al. | 386/241 |
| 7,178,106 B2 | 2/2007 | Lamkin et al. | 715/716 |
| 7,356,247 B2* | 4/2008 | Hamasaka et al. | 386/248 |
| 7,783,172 B2 | 8/2010 | Seo et al. | |
| 8,233,777 B2 | 7/2012 | Seo | |
| 2001/0008576 A1* | 7/2001 | Otomo et al. | 386/96 |
| 2001/0028788 A1* | 10/2001 | Nakahara et al. | 386/95 |
| 2001/0055466 A1* | 12/2001 | Iwashita | 386/46 |
| 2002/0078144 A1* | 6/2002 | Lamkin et al. | 709/203 |
| 2002/0176693 A1* | 11/2002 | Cho et al. | 386/95 |
| 2002/0194618 A1* | 12/2002 | Okada et al. | 725/132 |
| 2003/0049017 A1* | 3/2003 | Chung et al. | 386/95 |
| 2003/0161615 A1* | 8/2003 | Tsumagari et al. | 386/95 |
| 2005/0251732 A1 | 11/2005 | Lamkin et al. | |
| 2006/0004778 A1* | 1/2006 | Lamkin et al. | 707/10 |
| 2006/0153021 A1 | 7/2006 | Seo et al. | |

FOREIGN PATENT DOCUMENTS

| | | |
|---|---|---|
| EP | 0836189 A | 4/1998 |
| EP | 0 994 480 | 4/2000 |
| EP | 1 148 502 | 10/2001 |
| EP | 1 309 205 | 5/2003 |
| JP | 5-282371 | 10/1993 |
| JP | 07-078242 | 3/1995 |
| JP | 7-226011 | 8/1995 |
| JP | 8-306167 | 11/1996 |
| JP | 10-013809 | 1/1998 |
| JP | 10-108136 | 4/1998 |
| JP | 10-116472 | 5/1998 |
| JP | 2813245 B | 10/1998 |
| JP | 10-327381 | 12/1998 |
| JP | 11-98467 | 4/1999 |
| JP | 11-161663 | 6/1999 |
| JP | 11-191282 | 7/1999 |
| JP | 11-331780 | 11/1999 |
| JP | 2000-57746 | 2/2000 |
| JP | 2000-057746 | 2/2000 |
| JP | 2000-25364 | 9/2000 |
| JP | 2000-253364 | 9/2000 |
| JP | 2002-101390 | 4/2002 |
| JP | 2002-247526 | 8/2002 |
| JP | 2003-23604 | 1/2003 |
| JP | 2003-249057 | 9/2003 |
| WO | 98/14942 | 4/1998 |

OTHER PUBLICATIONS

Blu-ray Disc Association: "Application Definition Blu-ray Disc Format BD-J Baseline Application and Logical Model Definition for BD-ROM" dated Mar. 31, 2005. XP007904998.

Blu-ray Disc Founders: "White paper Blu-ray Disc Format 2.A Logical and Audio Visual Application Format Specifications for BD-RE" dated Aug. 31, 2004. XP002480404.

The Extended European Search Report, Application No. EP10173285.7 dated Oct. 27, 2010.

Supplementary European Search Report, dated Jul. 6, 2009, for counterpart European Application No. 03795416.1.

Summons to attend oral proceedings, dated Jun. 28, 2012, for EP Application No. 03748559.6.

* cited by examiner

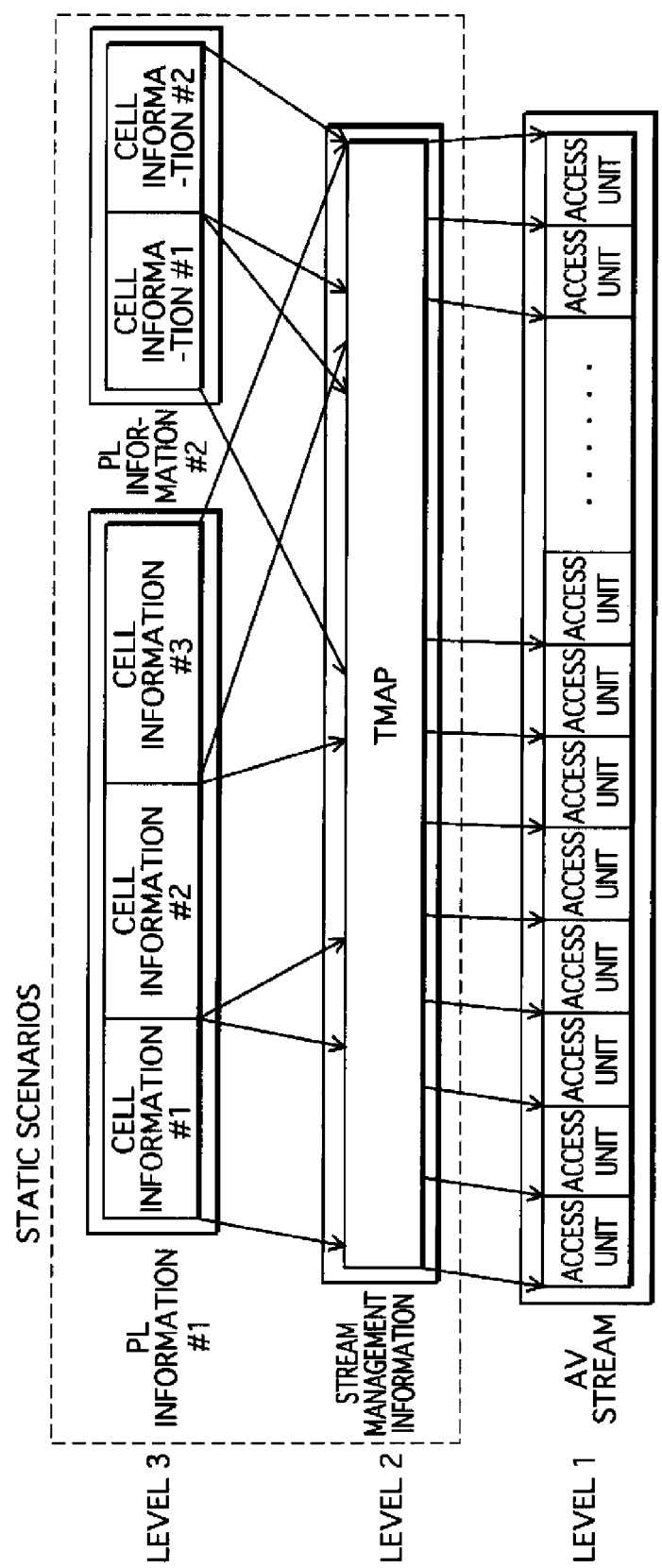

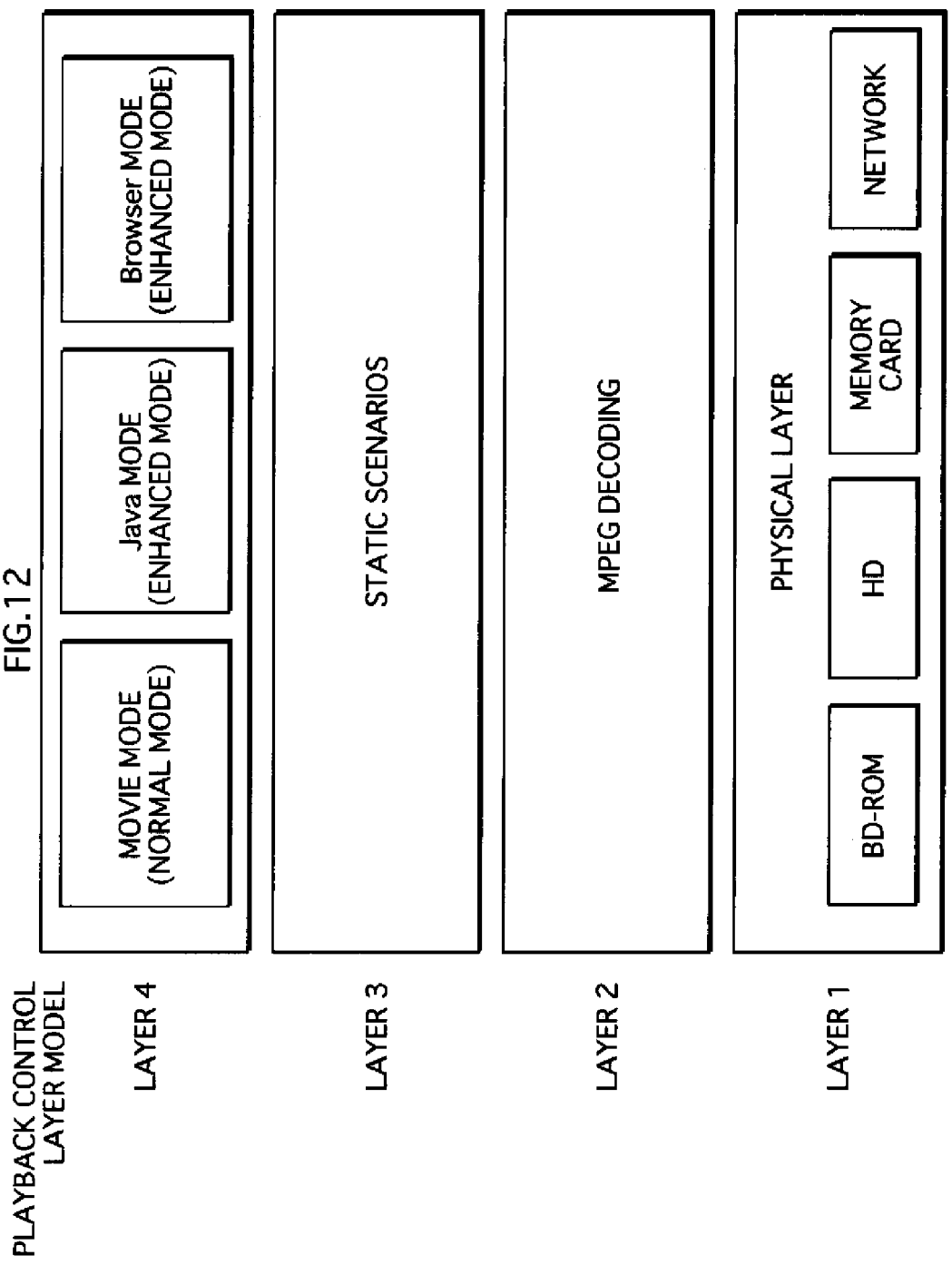

ADDED-VALUE ENHANCEMENT USING Java MODE

NORMAL PLAYBACK IN MOVIE MODE

ADDED-VALUE ENHANCEMENT USING Browser MODE

FIG17

Java OBJECT(J—OBJ)

```
IF(GPRM(0)==1)
    { A.draw Character ();PlayPL(PL#1,CELL#2);}
else { if (GPRM(0)==2)
    { B.draw Character();PlayPL(PL#2,CELL#1);}}
else { if (GPRM(0)==3)
    { C.draw Character();PlayPL(PL#1,CELL#3);}}}
```

ZZZ.CLASS

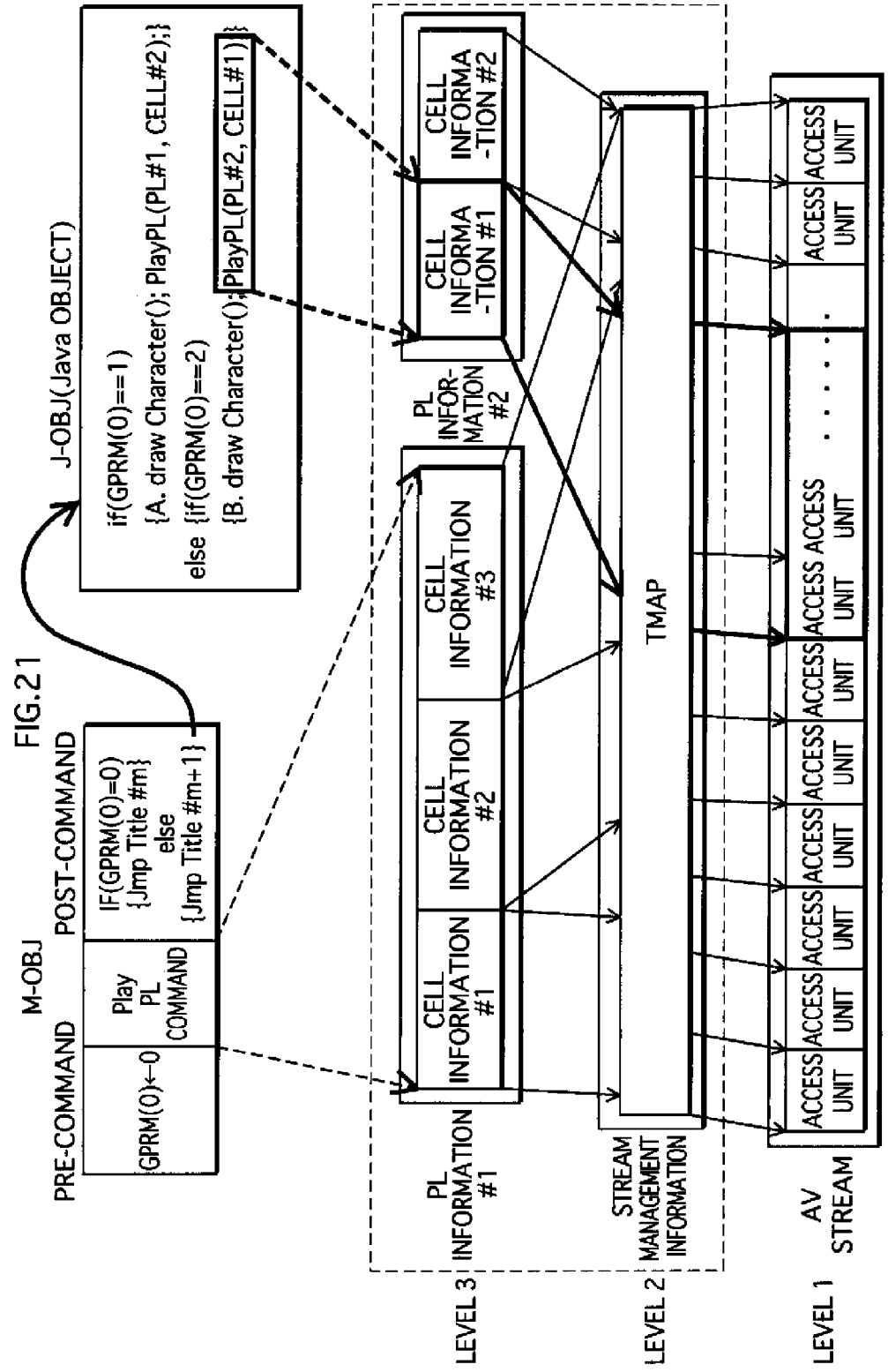

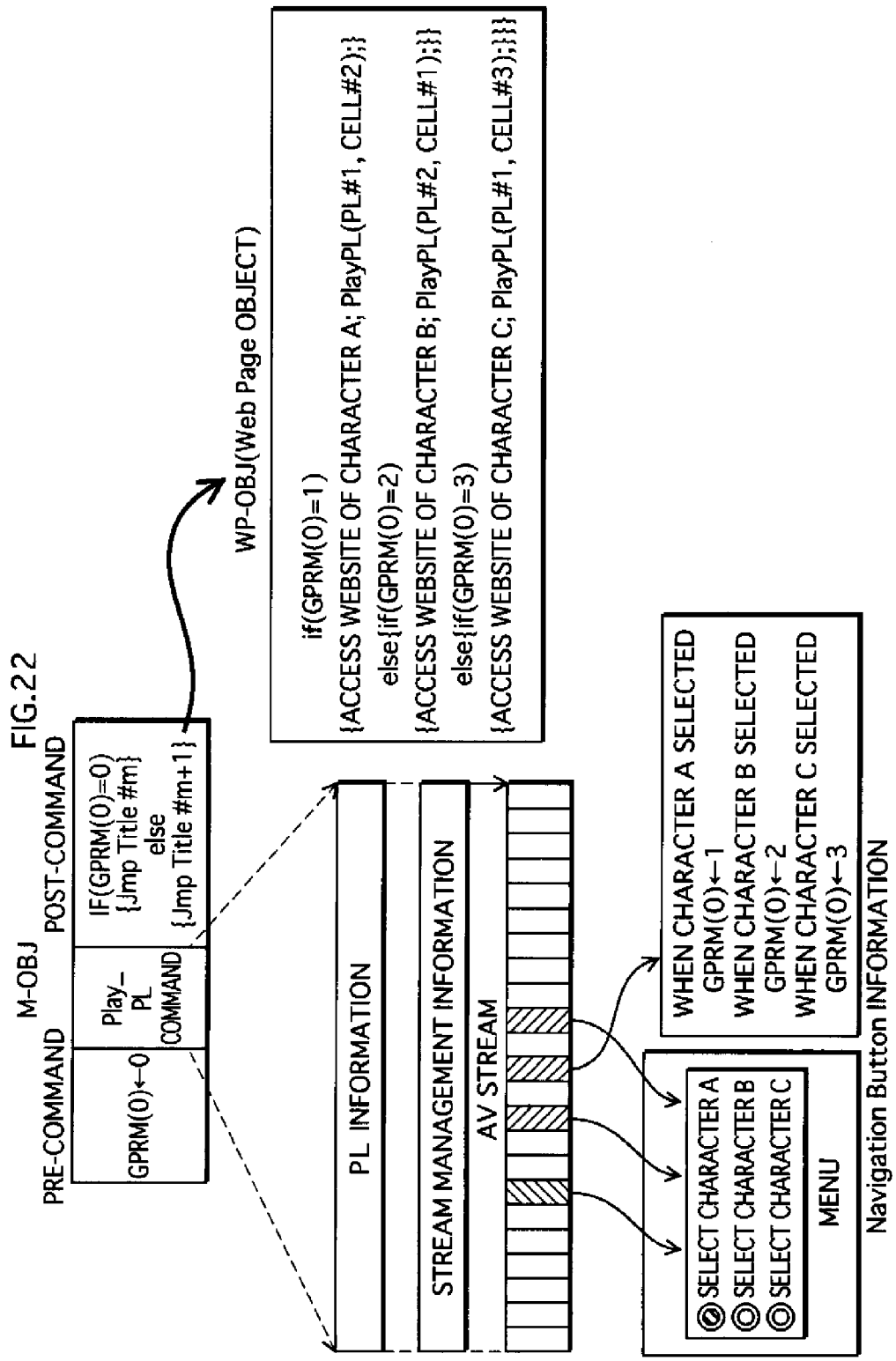

FIG.23B  TITLE #1 ~ #m INDEX
FIG.23C  TITLE #m+1 ~ #n INDEX

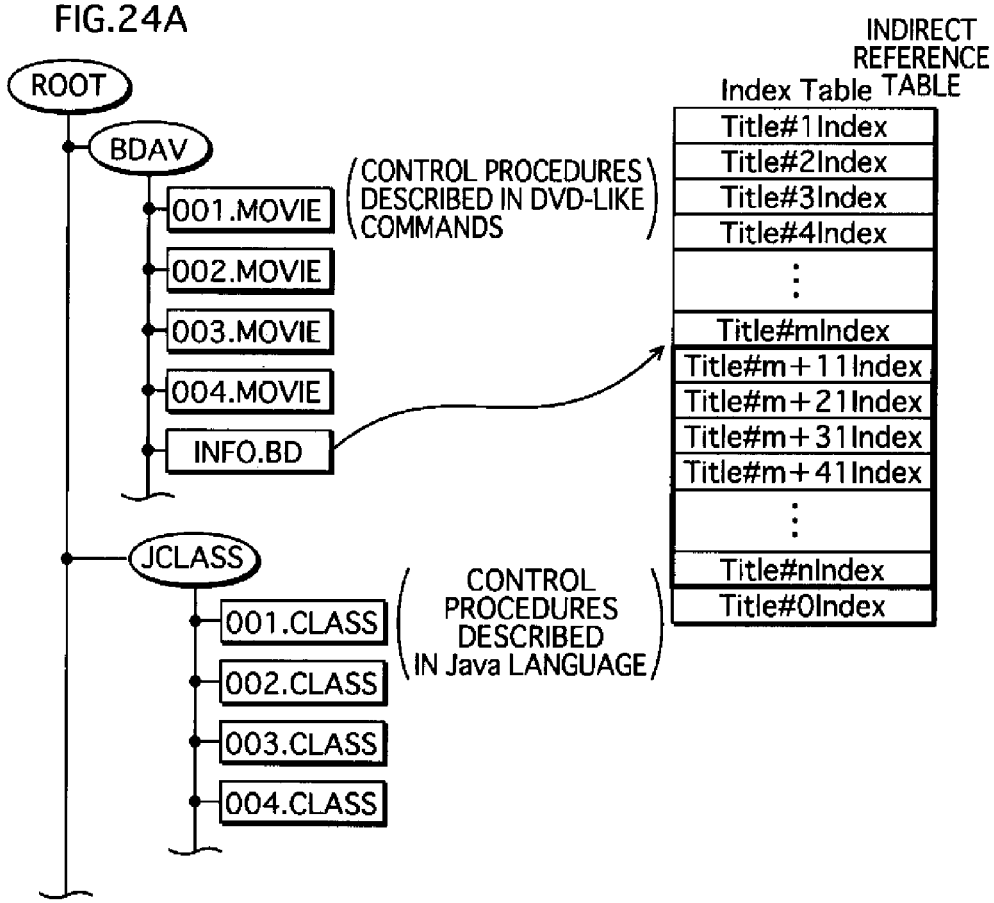

MOVIE AND Java MODES AVAILABLE (FULL SYSTEM)

ONLY MOVIE MODE AVAILABLE (CORE SYSTEM)

START OF PL
PLAYBACK
t0
TIME AXIS

PLAYBACK
HAS REACHED
TIME t1
t1
Time Event
OCCURRENCE
TIME AXIS

CG RENDERED AS A
RESULT OF TimeEvent t1    t2
TIME AXIS
REWIND WHEN PLAYBACK
HAS REACHED TIME t2

CG MOTION
CONTINUED

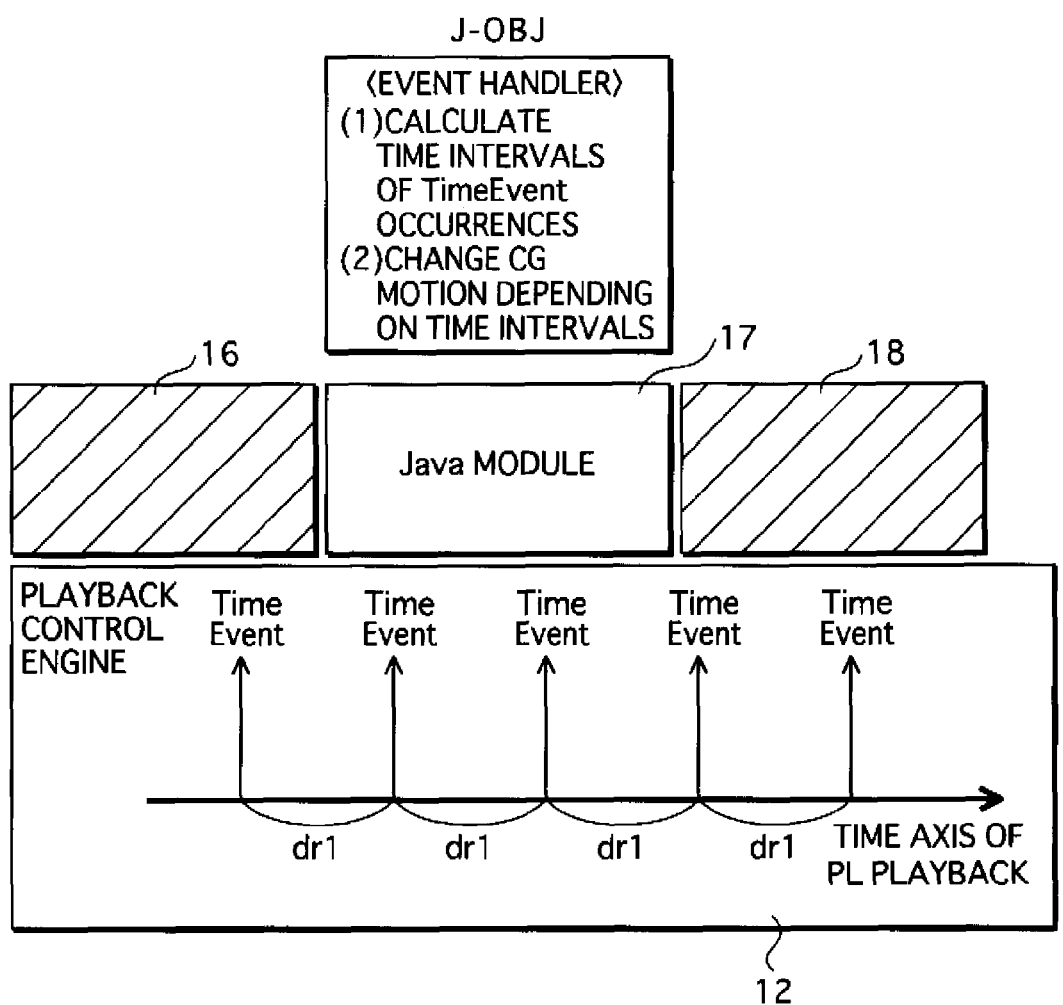

PLAYBACK
START
├─────────────────►
t₀            TIME AXIS

ADVENTURE GAME

Time Event
OCCURRENCE
├──●──────────────►
   t₁         TIME AXIS
PLAYBACK HAS
REACHED TIME t1

ADVENTURE GAME

CG OF CHARACTER
A IS RERENDERED

Time
Event
├──────────────────►
t₁       t₂

ADVENTURE GAME

CG IS CHANGED BASED ON TIME
INTERVALS OF EVENT OCCURRENCES

FIG.53

SCHEDULE TABLE USED BY J-OBJ

| CHARACTER A | 0 3 : 0 0 ~ 0 5 : 0 0, PL#1, CELL#1 |
|---|---|
| CHARACTER B | 0 5 : 0 1 ~ 0 8 : 0 0, PL#1, CELL#1 |
| CHARACTER C | 0 8 : 0 1 ~ 1 0 : 0 0, PL#1, CELL#2 |
| CHARACTERS A & B | 1 0 : 0 1 ~ 1 7 : 0 0, PL#1, CELL#2 |

RECORDING MEDIUM, PLAYBACK DEVICE, PROGRAM, PLAYBACK METHOD, AND RECORDING METHOD

TECHNICAL FIELD

The present invention relates to a video-data recording medium such as Blu-Ray Disc Read Only Memory (hereinafter simply "BD-ROM"), a playback device for playing such a recording medium, a program, a playback method, and a recording method, and in particular relates to a technology of distributing movie works and the like by the recording medium.

BACKGROUND ART

Distribution of movie works by recording media is an important source of revenue for moviemakers and suppliers. Video data of movie works is produced by getting celebrated actors cast in roles and a large amount of cost is spent for the production, and therefore, video data of movie works holds significant property values. It is considered now that enhancing the added value of such video data by using functions of recording media and playback devices makes quite meaningful sense with the objective of merchandise strategy in order to distribute movie works. One strategy to enhance the added value of DVDs is that, on DVDs where video data has been recorded, quizzes and games applying the video data are recorded so that users have fun with playing with these features. Even if the same video data has been used, a user gets dramatically different impressions of the video data when watching it as a movie and when seeing it as one scene of a corresponding game. While requiring a little work, this allows to keep conveying fresh impressions to a user, and therefore such an added value enhancement is a powerful weapon to moviemakers.

The prior art relating to ways to enhance the added value of DVDs includes the known technology disclosed in the following Patent Reference 1.

Patent Reference 1: Japanese Patent No. 2813245

Conventionally, the added value enhancement has been realized by using renderable secondary images (i.e. subtitles) and interpretable commands for DVD playback devices. In other words, such an added value enhancement is a by-product as a result of applying functions of playback devices. As networking of home appliances advances, the functions of playback devices are on the verge of dramatic evolution. With the advancement of the networking, home appliances, such as a playback device, have started to include browsers and Java Virtual Machines as standard equipment and to be equipped with operation modes implemented by these browsers and Java Virtual Machines, which results in supplying a user with various services through networks. In light of the advancement of playback devices, it is expected that movie suppliers will propose to electric appliance makers to create new contents for enhancing the added value of actual video data by harnessing characteristic features of Java Virtual Machines and browsers. Although Java Virtual Machines and browsers have been in widespread use, a concept in which enhancing the added value of actual video data by using these applications has never existed so far. Even if there is such a demand, both kinds of playback devices, having and not having a Java Virtual Machine and a browser, will appear in the actual market for commercial electric appliances. If there is no operation assurance when the added-value enhanced recording medium is loaded on a playback device not having these applications, then the recording medium may be rejected from the market.

In addition, when recording media with movie works recorded thereon are distributed, targeting playback devices hooked up to home appliance networks, copyrights of the movie works will be exposed to unknown risk. Although operation modes using a Java Virtual Machine and a browser have an appeal, the unknown risk certainly makes the copyright holders deeply anxious.

DISCLOSURE OF THE INVENTION

The present invention aims at offering a recording medium and a playback device capable of realizing operation assurance for any type of playback devices while enhancing the added value of actual video data, in the case where a Java Virtual Machine and a browser are equipped on the playback device, by using these applications.

The above objective is achieved by a recording medium having video data, a plurality of programs, and a table recorded thereon, wherein each of the plurality of programs shows a playback control procedure of the video data; the table includes (1) identification information of each of the plurality of programs, and (2) information showing that each of the plurality of programs belongs to either a movie mode or an enhanced mode; one of the plurality of programs includes a command for branching; and the branching command specifies a branch destination using indirect referencing via the table. Using the command for branching enables to dynamically switch over between playback of the video data as a movie in the movie mode and controls in the enhanced mode. In the case where the controls in the enhanced mode are implemented by using a Java Virtual Machine and a browser, the video data recorded on the recording medium is played on either a screen for playing normal movies or a screen relating to the Java Virtual Machine and the browser. Such screen switching realizes unprecedented and innovative virtual effects. Using the command for branching enables to dynamically switch over between playback of the video data as a movie in the movie mode and controls in the enhanced mode. In the case where the controls in the enhanced mode are implemented by using a Java Virtual Machine and a browser, the video data recorded on the recording medium is played on either a screen for playing normal movies or a screen relating to the Java Virtual Machine and the browser. Such screen switching realizes unprecedented and innovative virtual effects.

The above configuration allows the playback device to execute games and the like that harness dynamic mode switching, which results in enhancing the added value of the actual video data. In terms of branching from the movie mode to the enhanced mode, a branch destination is specified by indirect referencing via a table. By designing descriptive contents of the table, it is possible to realize operations for changing branch destinations of when the record medium is loaded on a playback device having a Java Virtual Machine and a browser from those of when it is loaded on a playback device not having those applications. As a result of the change in branch destinations, it is possible to close a path for branching to a program in the enhanced mode when the record medium is loaded on a playback device having no Java Virtual Machine and browser, and operation assurance for any type of playback devices can be thus realized.

Here, in the recording medium, the table may include a plurality of indexes corresponding one-to-one with the plurality of programs; the indexes may show that the plurality of corresponding programs respectively belong to either the movie mode or the enhanced mode; and the indirect referencing is to specify a program of the branch destination by using labels relating to the indexes.

Branching from a program to another program is implemented by referring to the indexes. Since each of the indexes shows a mode in which the corresponding program should be executed, it is possible to easily have the playback device execute branching involving mode switching where branching to another program is performed after modes being switched.

Here, in the recording medium, the indexes may include a reserved index; and the reserved index may correspond to a movie-mode program used alternatively to an enhanced-mode program when branching to the enhanced-mode program is instructed in a playback device operable to execute only the movie mode.

When the recording medium is loaded on a playback device not having the enhanced mode, branching is performed by referring to the reserved index. Herewith, leading to the program in the movie mode at program branching is made possible. Since a path for branching to the program in the enhanced mode is closed, unintended false operations can be prevented.

In the recording medium, a movie-mode program and an enhanced-mode program may be executed by two or more execution modules; the two or more execution modules may be resident programs on a same layer in a control hierarchy; and the playback control procedure may be described using a function supplied from the control hierarchy layer.

Here, in the recording medium, the supplied function may be one of (1) a function for having a playback device execute a playback control based on a predefined playback path, (2) a function for setting a predetermined value to a register in the playback device, and (3) a function for acquiring the value set to the register.

According to the above configuration, controls of taking over the register value in the movie mode and executing a different procedure according to the setting value can be realized in the enhanced mode. For example, in the case when a program in the enhanced mode is a procedure for moving a character on screen, taking the setting value of the register over to the enhanced mode from the movie mode allows the playback device to execute a control procedure in which user settings for the video data is closely linked with the motion of the CG character. As a result of adopting such a control procedure, it is possible to expand the range of expression for producing movie works, and to effectively enhance the added value of the video data with a fractional investment of describing playback controls. Thus, the control procedure will become a powerful weapon for moviemakers and suppliers.

In the case of seeking a remarkable enhancement of the added value through producing games, in the recording medium, the enhanced mode may be a mode for having a virtual machine execute a program; and an enhanced-mode program may be described in a virtual machine-oriented programming language.

An environment for developing the Java language (registered trademark) is established by realizing branching that involves mode switching, and it is thereby possible to have a number of software houses set their entry into the production businesses. As a result, many innovative styles of movie works will be created in which video data is played in association with switching over to the Java mode. Accordingly, this results in energizing the market for movie works.

In the case of seeking integration with a DVD playback environment, in the recording medium of claim 13, a movie-mode program may include a button command; the button command may be a command for branching to the enhanced-mode program, and may be recorded on the recording medium as a multiplexed stream after being multiplexed with the video data and subtitle data; and each piece of the subtitle data may be image data of a button, and the button command may be executed when a confirmation operation is conducted with respect to the image data of the button.

The button commands comply with commands comprehensible to DVD playback devices, and describing control procedures using the button commands allows the compatibility of control procedures with DVDs. As a result of ensuring the compatibility, it is possible to standardize control structures in the case of releasing a single movie work in both DVDs and BD-ROMs, and to reduce the need of authoring in the case of releasing movie works in BD-ROMs.

Furthermore, a mode transition of branching from the DVD-like movie mode to the enhanced mode using a Java Virtual Machine and a browser is made possible, which allows playback controls involving both DVD functions and Java Virtual Machine/browser functions.

In a situation where a browser is employed, a movie work could possibly be played with a website maligning the movie work. If such playback is allowed, there is a risk of bringing discredit to the movie work. It is intolerably painful for moviemakers and suppliers that movie works on which they have worked are degraded, and this could be a cause to create frictions of moviemakers and suppliers with appliance manufacturers.

In order to avoid such frictions, it is desirable to describe the programs in the enhanced mode in a markup language.

Since the control procedures are described in a markup language, it is possible to enhance the added value of the video data by control procedures involving information retrieved from websites. Because information from which websites is taken up is decided by the creator side, it is possible to avoid movie works to be exposed to aspersion and defamation from general public via Internet.

Technical significance of implementing mode transitions by indirect references via the table is not confined to the operation assurance as mentioned above. In the case when a certain condition is met on the playback device side, it is possible to close a path for branching from the movie mode to the enhanced mode, and therefore it is significant when playback devices are in the following situations:

(1) when an encryption key for protecting a copyright of a movie work is exposed in a playback device, and the a playback device is made invalid by a key management center;

(2) when there is a possibility that copies of a movie work will be circulated on networks as a result that a user made unauthorized copies of the movie work recorded on a recording medium by using ripper software;

(3) when additional charge is not paid although it is required for execution of the enhanced modes;

(4) when it is desired to cut a playback device off from a network due to an occurrence of a failure in a system of the playback device;

(5) when there are version conflicts in Java Virtual Machines and browsers;

(6) when there is a possibility of leakage of personal information or infection with virus software, and it is desired to cut a playback device off from a network; and (7) when it is desired to cut a playback device off from a network in order to protect movie works on a recording medium from an unauthorized device attempting to read recorded contents on the recording medium via a network.

It is possible to cut off a mode transition when one of such situations (1) to (7) exists in playback devices.

Even if playback devices are placed in an environment where a constant network connection is available, programs in the movie mode can be described so as to restrain transitions to a Java Virtual Machine and a browser in the cases, for example, when operations of playback devices and copyright protection of video data are not ensured and when a user has fallen into debt default. Therefore, it is possible to cast aside copyright holders' fear when they distribute their movie works targeted for playback devices hooked up to home appliance networks.

In addition, branch commands by indirect reference as described above offer a significant advantage to distributors of movie works in that replacements at a later date can be realized with little effort. When certain pieces of the video data recorded on the recording medium have moral and ethical issues, the present invention enables a user to watch replacement videos, instead of the problematic videos, by having the playback device download a table and the replacement videos and causing the playback device to make indirect referencing via the new table during playback. There is no need to rewrite all the programs recorded on the recording medium when partial replacement is desired, which allows to avoid the risk of recalling the recording medium even when such problems are raised.

In addition to the case where replacing videos is wanted, when it is desired not to have playback devices play certain pieces, from among multiple pieces of the video data recorded on the recording medium, or when it is desired to shuffle the order of the video data pieces recorded on the recording medium, all required is to download a table. Thus, there is no need to rewrite programs on the record medium, and therefore burden of the distributors can be alleviated when problems are found.

The broadest concept of the recording medium according to the present invention may be as follows.

A recording medium having video data and a program recorded thereon, wherein the program shows a playback control procedure of the video data, an execution of the playback control procedure is triggered with an event that occurs in a playback device during video data playback, and the event is one of (i) an event showing that a current playback position has reached a predetermined time point on a playback time axis of the video data, and (ii) an event showing that a current playback position has proceeded by a predetermined time interval on the playback axis.

The broadest concept of the playback device according to the present invention may be as follows. A playback device relating to a recording medium having video data and a program recorded thereon, comprising a playback control engine operable to cause an occurrence of an event synchronizing with video data playback and playback progress, and an execution module operable to execute an event handler when the playback control engine causes the event occurrence, the event is one of (i) an event showing that a current playback position has reached a predetermined time point on a playback time axis of the video data, and (ii) an event showing that a current playback position has proceeded by a predetermined time interval on the playback axis.

Since the program that operates in synchronization with the video data playback can be created as an event handler, the development by programmers can be facilitated.

BRIEF DESCRIPTION OF THE DRAWINGS

FIG. 11 shows an example of when a different PL to the PL shown in FIG. 10 is defined;

FIG. 12 shows playback modes on Layer 4 (dynamic scenarios) of the layer model;

FIG. 17 shows an exemplified description of a Java object in the case where branching is performed with a command of the MOVIE object of FIG. 16;

FIG. 21 shows a scene extraction performed using a different PL from one used in the MOVIE mode;

FIG. 22 shows an exemplified description of a WebPage object;

FIG. 23B and FIG. 23C show Indexes in an Index Table;

FIG. 24A shows a BD-ROM on which a plurality of dynamic scenarios (001.MOVIE, 002.MOVIE, 003.MOVIE, . . . , 001.CLASS, 002.CLASS, 003.CLASS, . . . ) is recorded;

FIG. 24B shows an exemplified description of the Index Table of when a plurality of dynamic scenarios as shown in FIG. 24A is described in a BD-ROM;

FIG. 43 schematically shows TimeEvent occurrences during fast-forwarding;

FIG. 53 shows an example of a schedule table;

BEST MODE FOR CARRYING OUT THE INVENTION

1. First Embodiment

Figure 1:
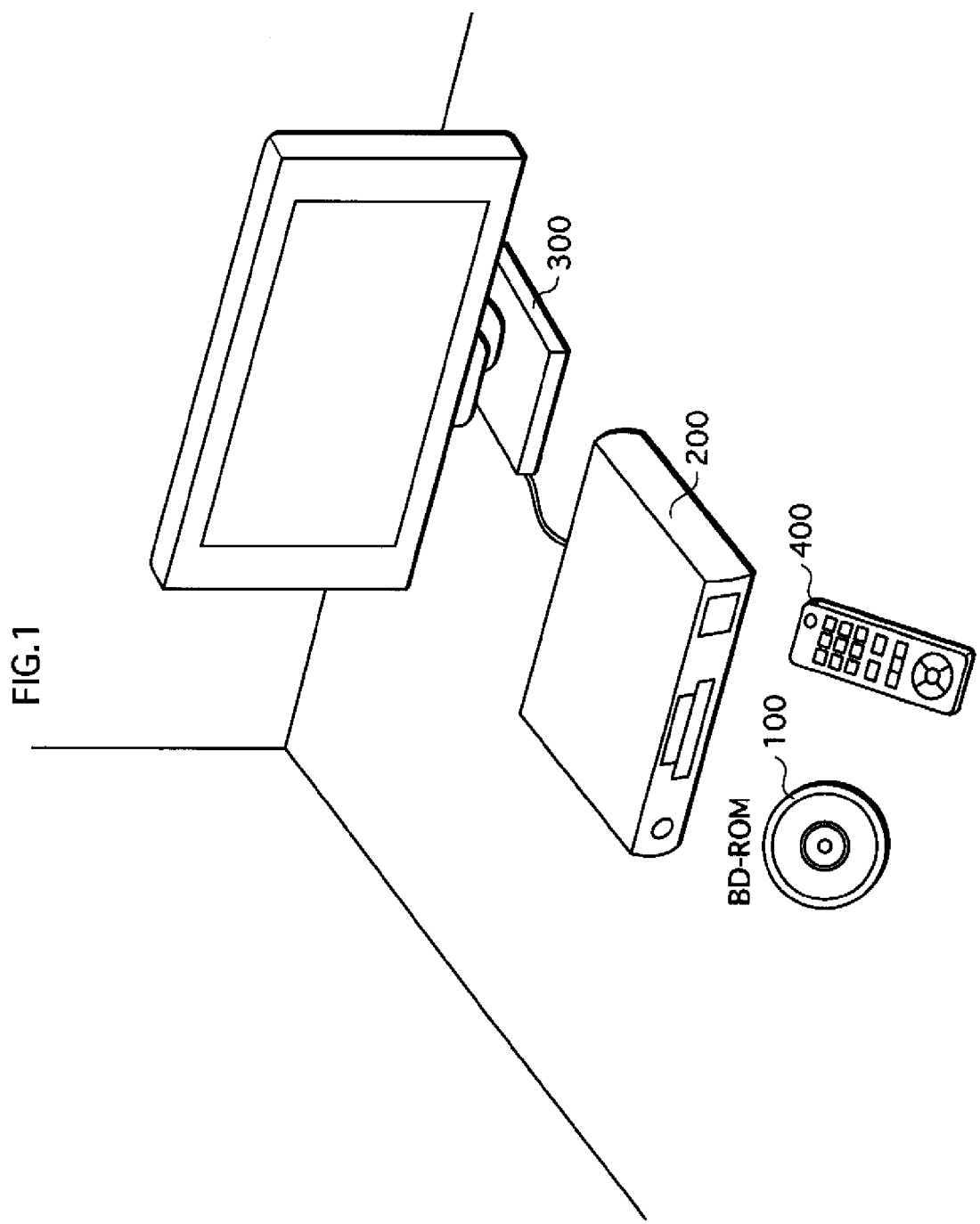
FIG. 1 shows a usage application of a recording medium according to the present invention.

The following gives an account of a preferred embodiment of a recording medium according to the present invention. First, a usage application is described in relation to the implementation of the recording medium of the present invention. FIG. 1 shows a usage application of the recording medium according to the present invention. A BD-ROM 100 in FIG. 1 is the recording medium of the present invention. The BD-ROM 100 is used for supplying movie works to a home theater system composed of a playback device 200, a television 300, and a remote controller 400.

Figure 2:
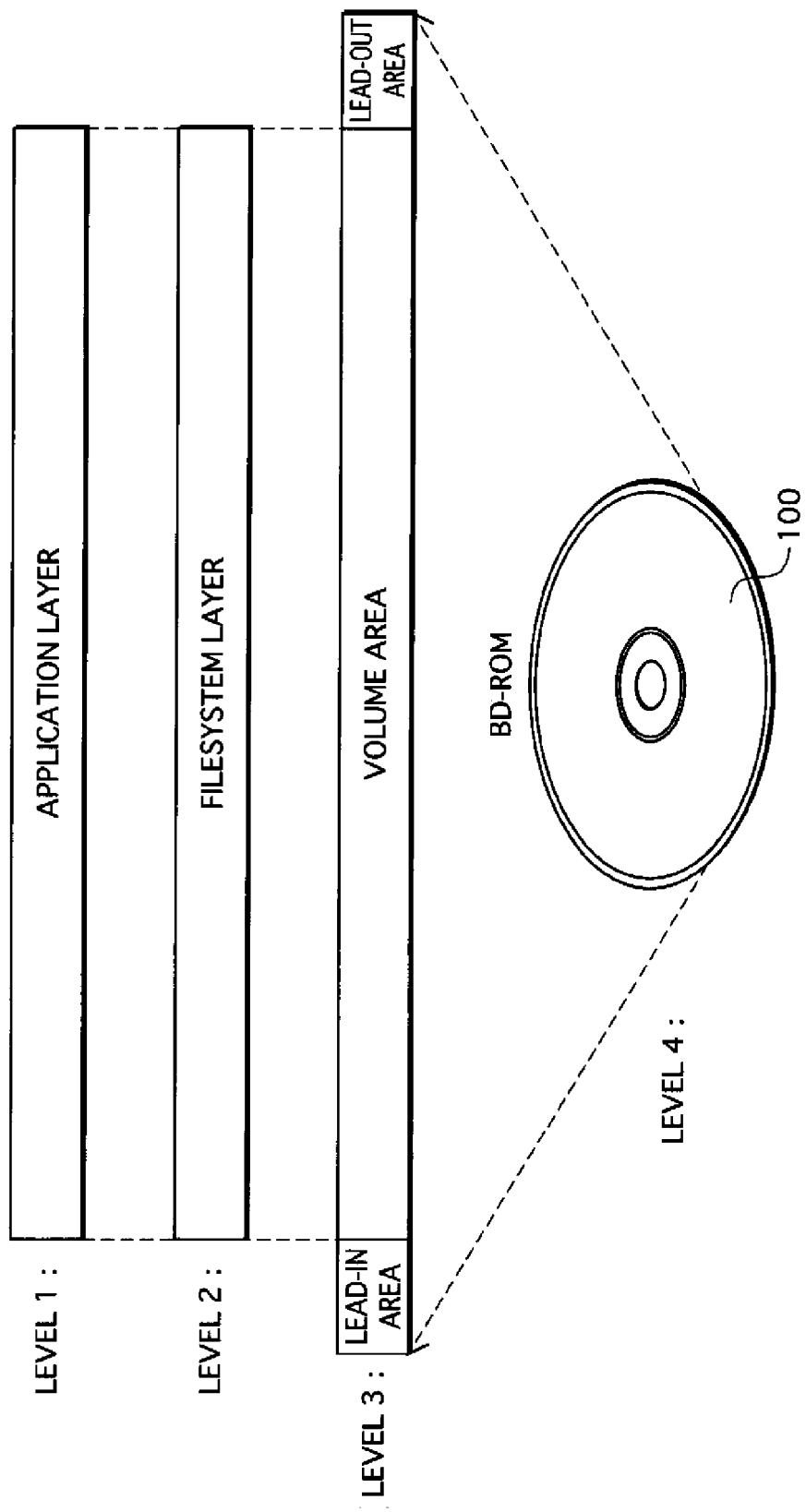
FIG. 2 shows a structure of a BD-ROM.

Next, a production application is described in relation to the implementation of the recording medium of the present invention. The recording medium of the present invention can be implemented as a result of improvements in the application layer of BD-ROMs. FIG. 2 shows a structure of a BD-ROM.

Level 4 in the figure shows the BD-ROM, and Level shows a track on the BD-ROM. The figure depicts the track in a laterally drawn-out form, although the track is, in fact, formed in a spiral, winding from the inside toward the outside of the BD-ROM. The track is composed of a lead-in area, a volume area, and a lead-out area. The volume area in the figure has a layer model made up of a physical layer, a filesystem layer, and an application layer. The recording medium of the present invention is industrially manufactured by forming the data format shown in FIG. 2 on the application layer of a BD-ROM.

Figure 3:
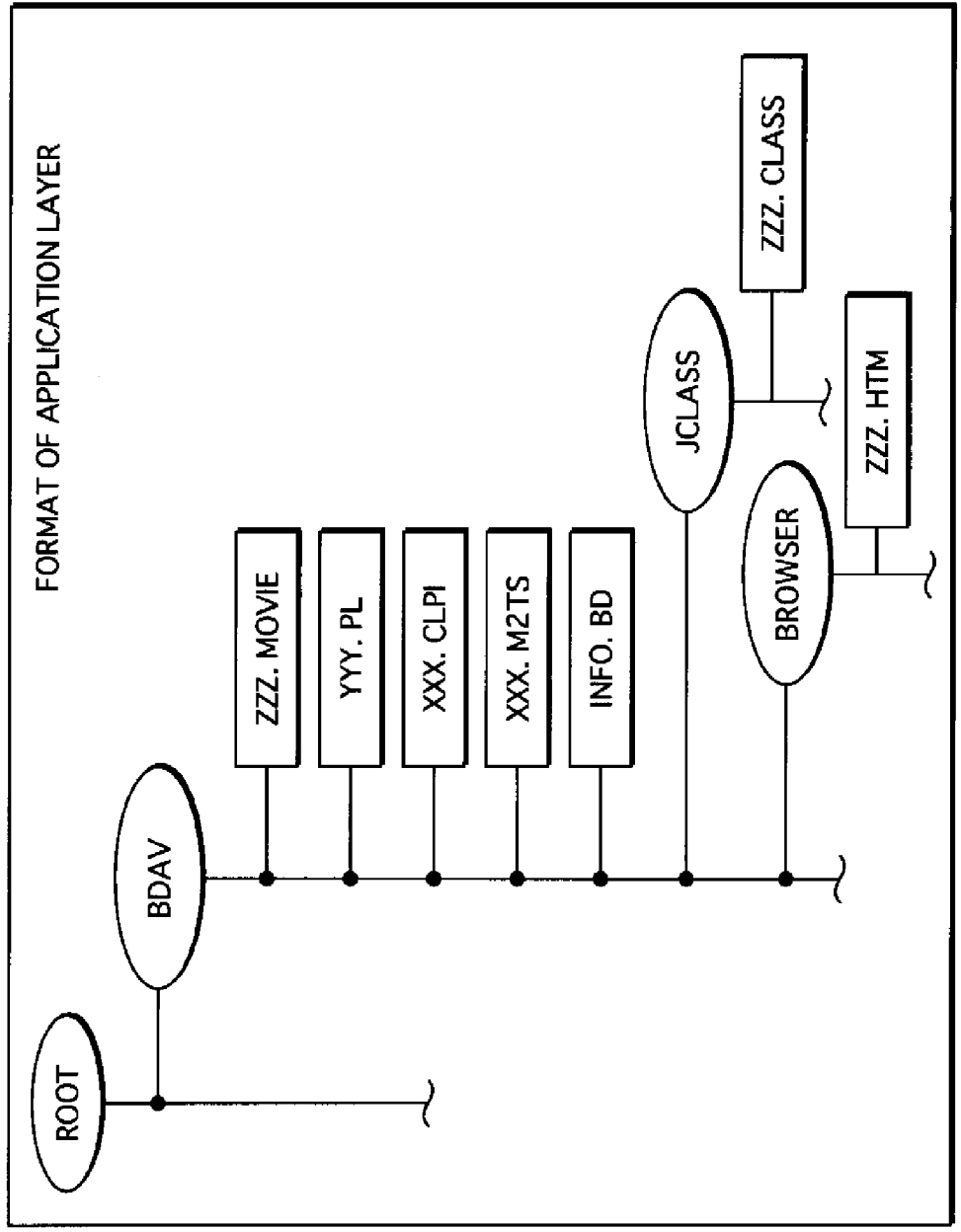
FIG. 3 shows an application layer format of the BD-ROM by using a directory structure.

FIG. 3 shows a format of the application layer (applications) of the BD-ROM by using a directory structure. In the BD-ROM, as shown in the figure, JCLASS directory and BROWSER directory are located under BD-ROMAV directory, which is found under ROOT directory.

Under BD-ROMAV directory, there are files named INFO.BD-ROM, XXX.M2TS, XXX.CLPI, YYY.PL, and ZZZ.MOVIE. Under JCLASS directory and BROWSER directory, individual files called ZZZ.CLASS and ZZZ.HTM are respectively located.

Figure 4:
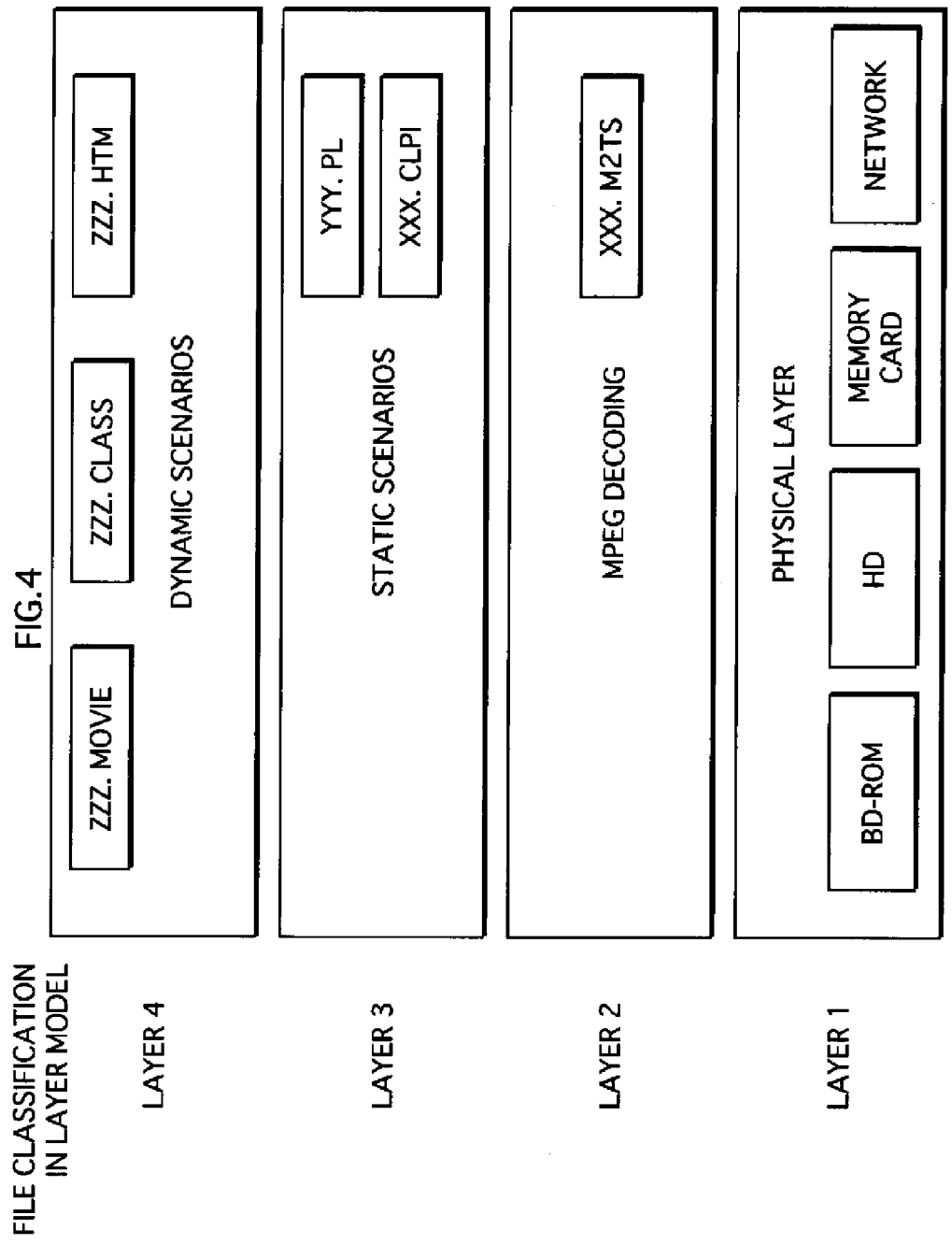
FIG. 4 is a classification diagram in which files are classified from a functionality viewpoint.

FIG. 4 is a classification diagram in which these files are classified from a functionality viewpoint. As shown in FIG. 4, a hierarchical structure composed of Layers 1 to 4 symbolizes the classification of the figure. XXX.M2TS is classified in Layer 2 in the figure. XXX.CLPI and YYY.PL are classified in Layer 3 (static scenarios). ZZZ.MOVIE under BD-ROMAV directory, ZZZ.CLASS under JCLASS directory, and ZZZ.HTM under BROWSER directory are all classified in Layer 4.

Figure 5:
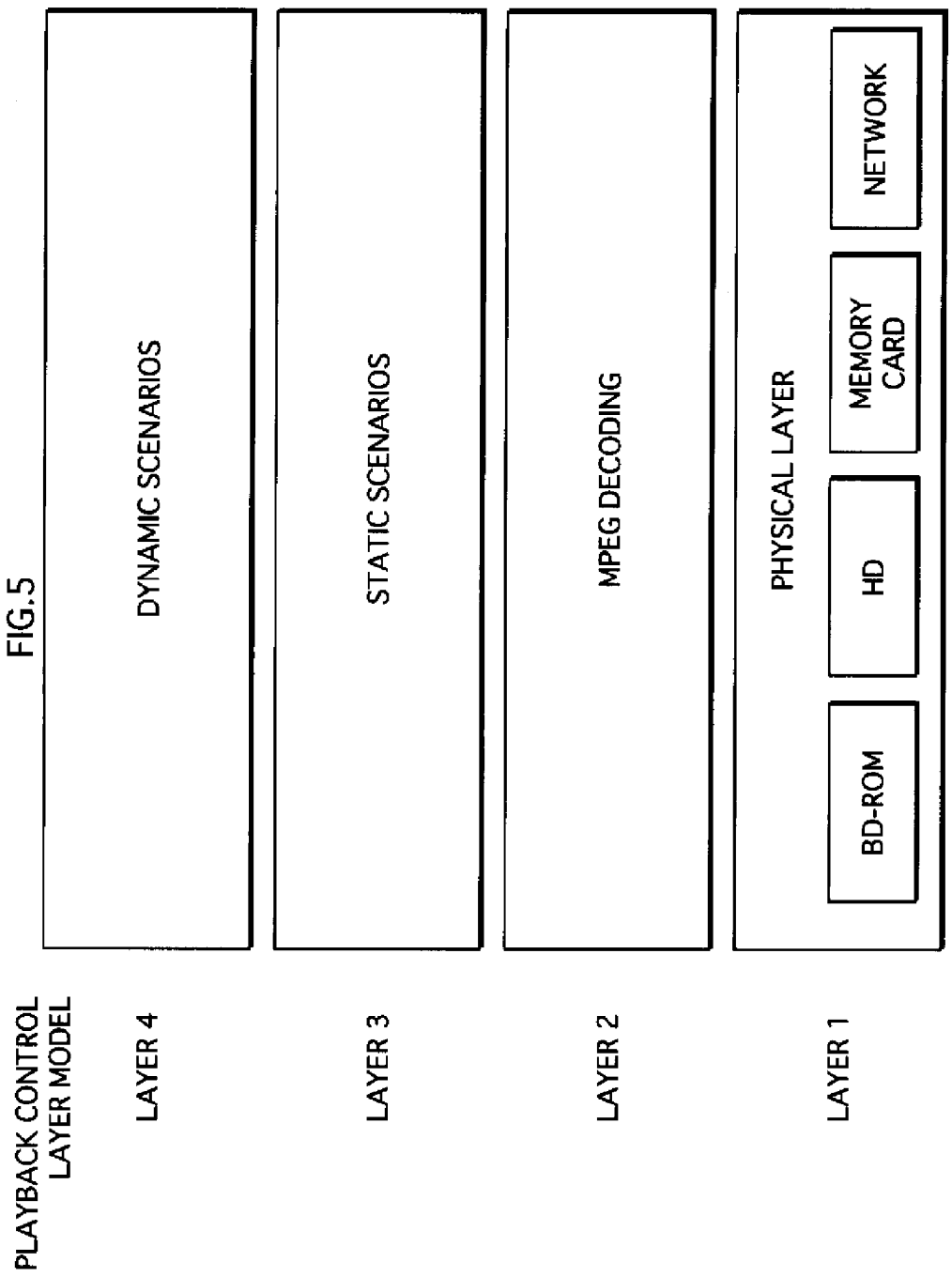
FIG. 5 shows a layer model of software that a BD-ROM targets.

The classification (Layers 1 to 4) of FIG. 4 targets a layer model as shown in FIG. 5. The following describes the layer model of control software that the BD-ROM targets, with reference to FIG. 5.

Layer 1 of FIG. 5 is a physical layer in which supply controls relating to streams targeted for processing are implemented. As shown in Layer 1, processing target streams have, as their supply sources, not only BD-ROMs but also various other kinds of recording and communication media including HDs (hard disks), memory cards, and networks. Controls (disk accesses, card accesses, and network communications) directed towards these supply sources, such as HDs, memory cards, and networks, are implemented by Layer 1.

Layer 2 is a decoding format layer. Layer 2 defines a decoding format used for decoding streams supplied by Layer 1. The MPEG-2 decoding format is employed in the present embodiment.

Layer 3 (static scenarios) defines the static scenarios of streams. Static scenarios are playback path information and stream management information defined in advance by the disk creator, and playback controls based on these static scenarios are defined in Layer 3 (static scenarios).

Layer 4 is for realizing the dynamic scenarios of streams. Dynamic scenarios are scenarios for dynamically changing the progress of playback as a result of user operations and the device status, and playback controls based on these dynamic scenarios are defined in Layer 4. In accordance with this layer model, files corresponding to actual streams, static scenarios, and dynamic scenarios are described below.

First, a stream (XXX.M2TS) belonging to Layer 2 is described.

Figure 6:
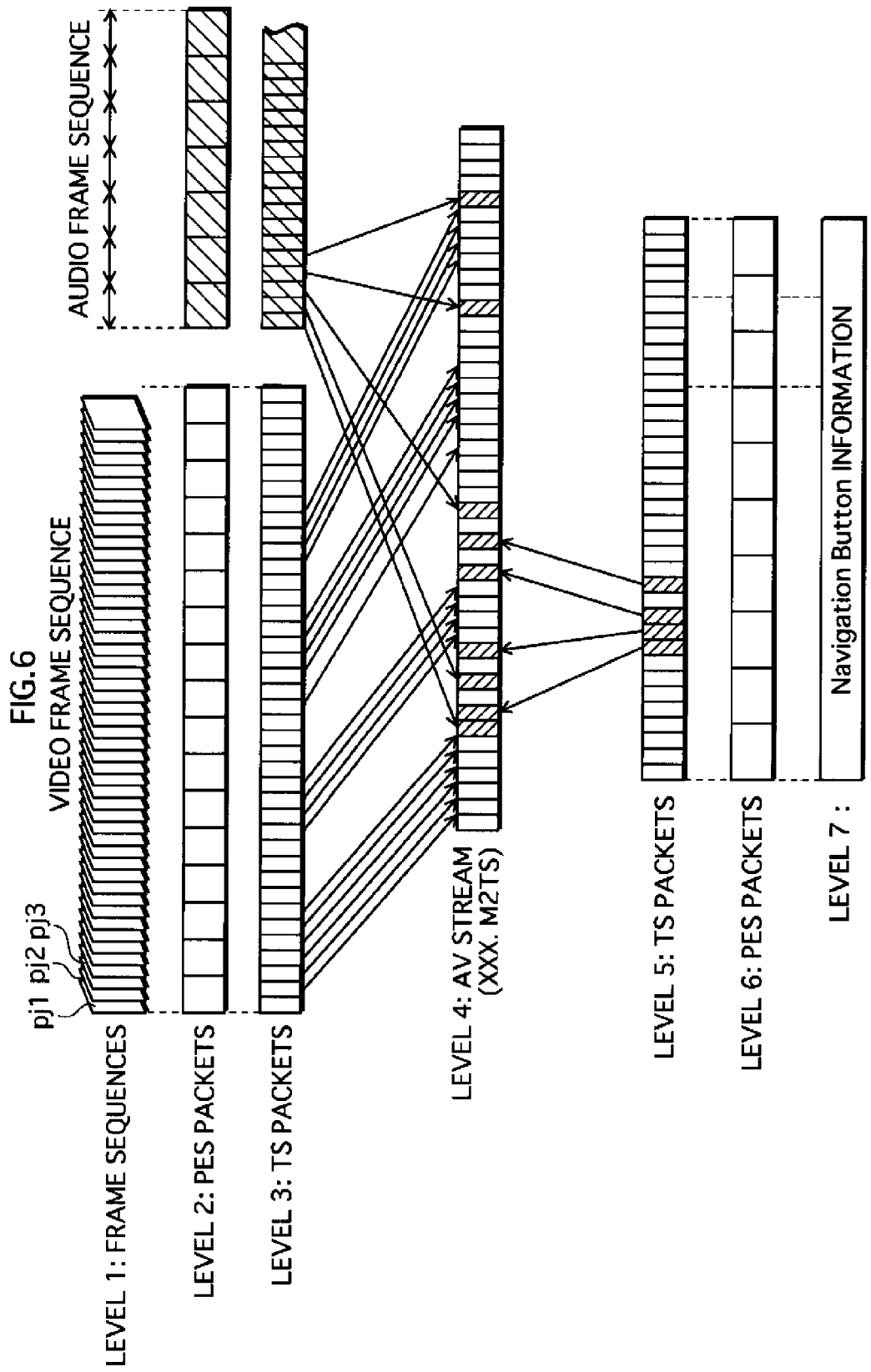
FIG. 6 schematically shows how an AV stream is configured.

An AV stream (XXX.M2TS) is an MPEG-TS (Transport Stream) format digital stream, and is obtained by multiplexing a video stream, one or more audio streams, one or more subtitle streams, and the Navigation Button information. The video stream means a video portion of a movie, the audio streams mean audio portions of the movie, the subtitle streams means subtitles of the movie, and the Navigation Button information means procedures of dynamic playback controls that target menus. FIG. 6 schematically shows how the AV stream is configured.

The AV stream (Level 4) is formed by (i) converting a video stream comprising a plurality of video frames (pictures pj1, pj2, and pj3) and an audio stream comprising a plurality of audio frames (Level 1) respectively into PES packet sequences (Level 2), each of which is then converted to TS packets (Level 3), (ii) likewise converting the Navigation Button information (Level 7) to a PES packet sequence (Level 6), which is then converted into TS packets (Level 5), (iii) and then multiplexing all the TS packets. The multiplexing involves arranging the TS packets storing video frames and the TS packets storing audio frames so that the audio frames are positioned close to the video frames that are to be read from the BD-ROM at the same time as the audio frames. Since the Navigation Button information relates to dynamic playback controls, the explanation is omitted here. In addition, subtitle steams have less to do with the present embodiment, and therefore have been left out from FIG. 6.

Figure 7:
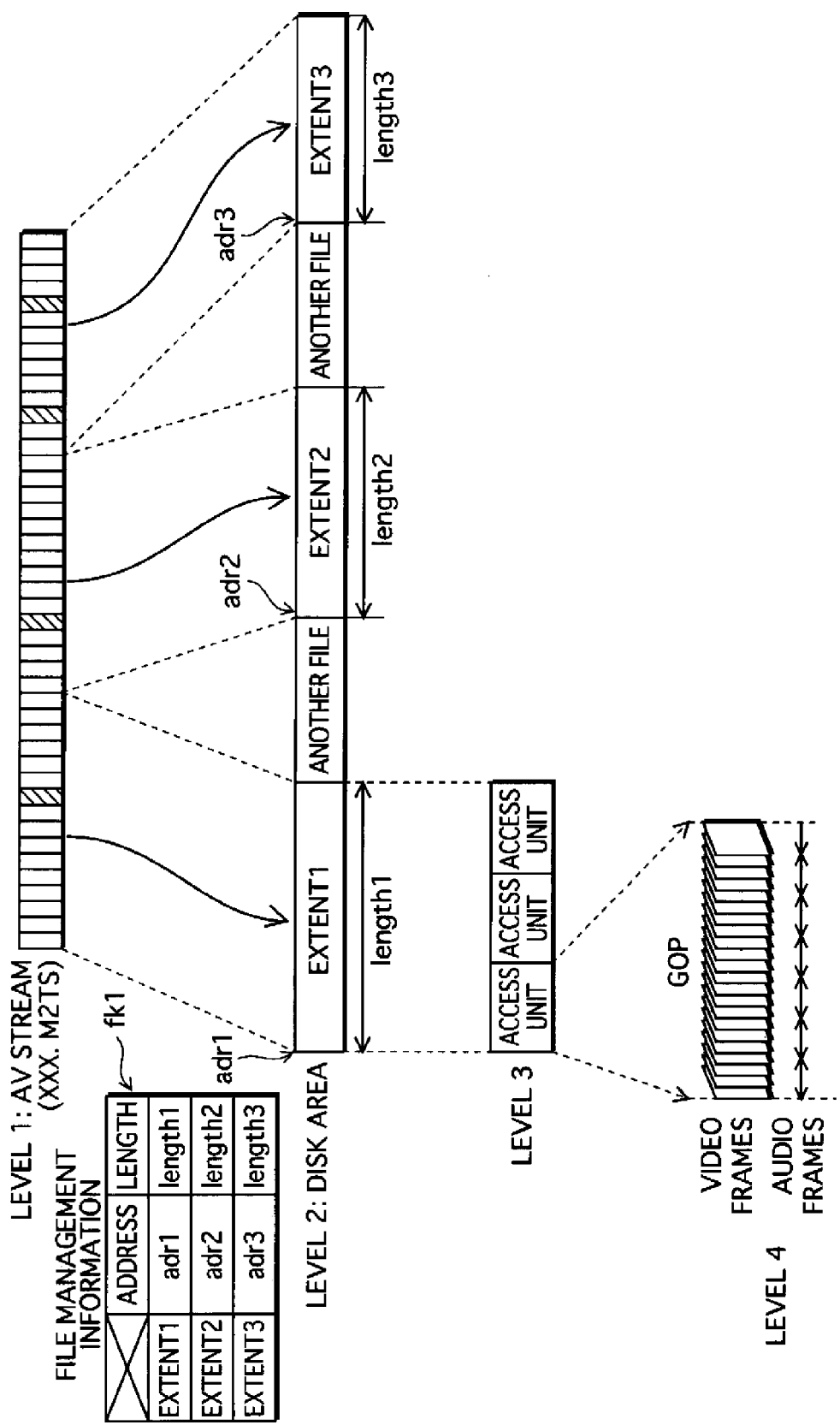
FIG. 7 schematically shows how the AV stream is recorded on the BD-ROM.

The AV stream generated through the above process is portioned into a plurality of extents and recorded in an area of the BD-ROM, as is the case with general computer files. FIG. 7 schematically shows how the AV stream is recorded on the BD-ROM.

A length of each extent constituting the AV stream and an address indicating where, in the BD-ROM, the extent is recorded are described in file management information fk1.

It can be seen that, for each of three extents (Extent 1, Extent 2, and Extent 3) obtained by portioning the AV stream, its address (adr1, adr2, and adr3, respectively) and the length (length1, length2, and length3) are described in the file management information fk1. The AV stream is composed of one or more ACCESS UNITs, and can be cued in these ACCESS UNITs. An ACCESS UNIT is the smallest decoding unit that includes a single GOP (group of pictures) and audio frames to be read at the same time as the GOP. GOPs include: bidirectionally predictive (B) pictures, which are compressed using time-correlation characteristics with images to be played in the past direction and the future direction; predictive (P) pictures, which are compressed using time-correlation characteristics with images to be played in the past direction; and intra (I) pictures, which are compressed using spatial frequency characteristics (i.e. not time-correlation characteristics) in the images of individual frames.

Note that the filename "XXX" in XXX.M2TS is an abstract representation of the 3-digit identification number appended to the AV stream in the BD-ROM. That is, the AV stream in FIG. 7 is uniquely identified with the "XXX". Thus completes the description of the stream (XXX.M2TS). It should be noted that the 3-digit number referred to here is merely exemplary, and any digit number can be used.

1.1 Static Scenarios

Static scenario files (XXX.CLPI and YYY.PL) are described below.

Figure 8:
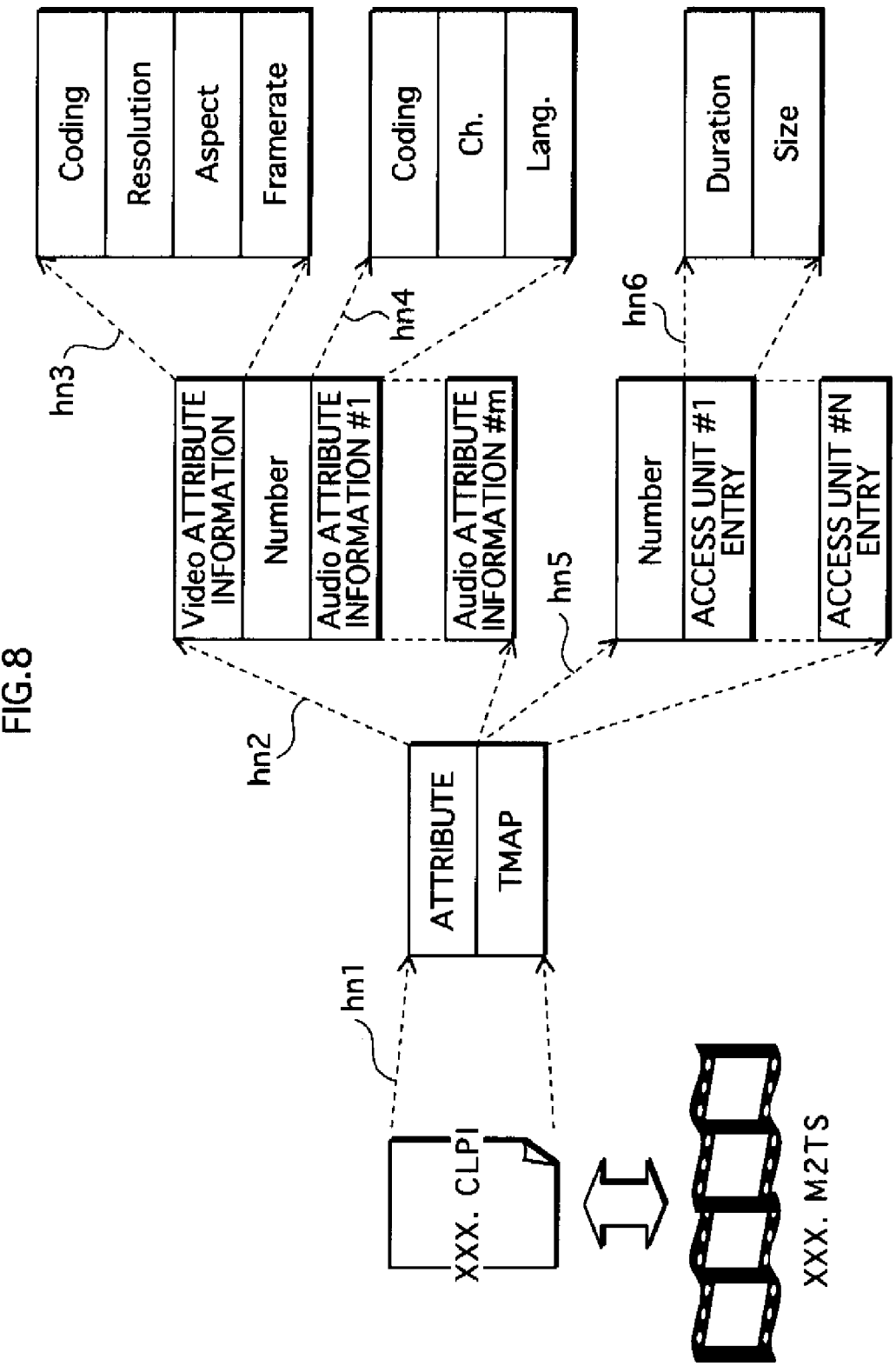
FIG. 8 shows an internal structure of Stream Management Information.

Stream management information (XXX.CLPI) is management information relating to an individual AV stream. FIG. 8 shows an internal structure of the stream management information. Since the AV stream is obtained by multiplexing video and audio streams and can be cued in ACCESS UNITs, management items of the stream management information include the attributes of the video and audio streams and where the cue positions are in the AV stream. The lead-lines in the figure show up-close details of the structure of the stream management information. As shown by the line hn1, the stream management information (XXX.CLPI) is composed of "attribute information" relating to video and audio streams and "TMAP" which is a reference table for cuing ACCESS UNITs.

Attribute information (Attribute), as shown by the dashed line hn2, are composed of attribute information relating to a video stream (Video Attribute Information), the number of pieces of the attribute information (Number), and attribute information relating to each of a plurality of audio streams multiplexed on the AV stream (Audio Attribute Information #1-#m). The management information relating to the video stream, as shown by the dashed line hn3, indicates the compression format used to compress the video stream (Coding), and the resolution (Resolution), aspect ratio (Aspect), and frame rate (Framerate) of individual pieces of picture data structuring the video stream.

On the other hand, the attribute information relating to the audio streams (Audio Attribute Information #1-#m), as shown by the dashed line hn4, indicates the compression format used to compress the respective audio streams (Coding), and the channel number (Ch.) and corresponding language (Lang.) of respective audio streams.

A time map (TMAP) is a reference table for referring indirectly to the addresses of a plurality of cue positions using time information. As shown by the dashed line hn5, TMAP is composed of plural pieces of entry information (ACCESS UNIT#1 entry, ACCESS UNIT#2 entry, ACCESS UNIT#3 entry, . . . ) and the number of pieces of the entry information (Number). As shown by the dashed line hn6, each piece of the entry information is composed of a playback duration (Duration) and a data size (Size) of a corresponding ACCESS UNIT, with the playback duration and the data size being associated with each other. Since a variable-length coding compression format is employed, it is possible to cue from an arbitrary playback time to a piece of picture data in an ACCESS UNIT corresponding to the playback time by referring to the entry of the ACCESS UNIT, even when sizes and playback durations of ACCESS UNITs that include GOPs are not uniform. Note that the filename "XXX" of XXX.CLPI uses the same name as that of the AV stream to which the stream management information corresponds. In other words, the filename of the AV stream in FIG. 8, being "XXX", corresponds to the AV stream (XXX.M2TS). Thus concludes the description of the stream management information. Next is described playlist information (hereinafter referred to as PL information).

Figure 9:
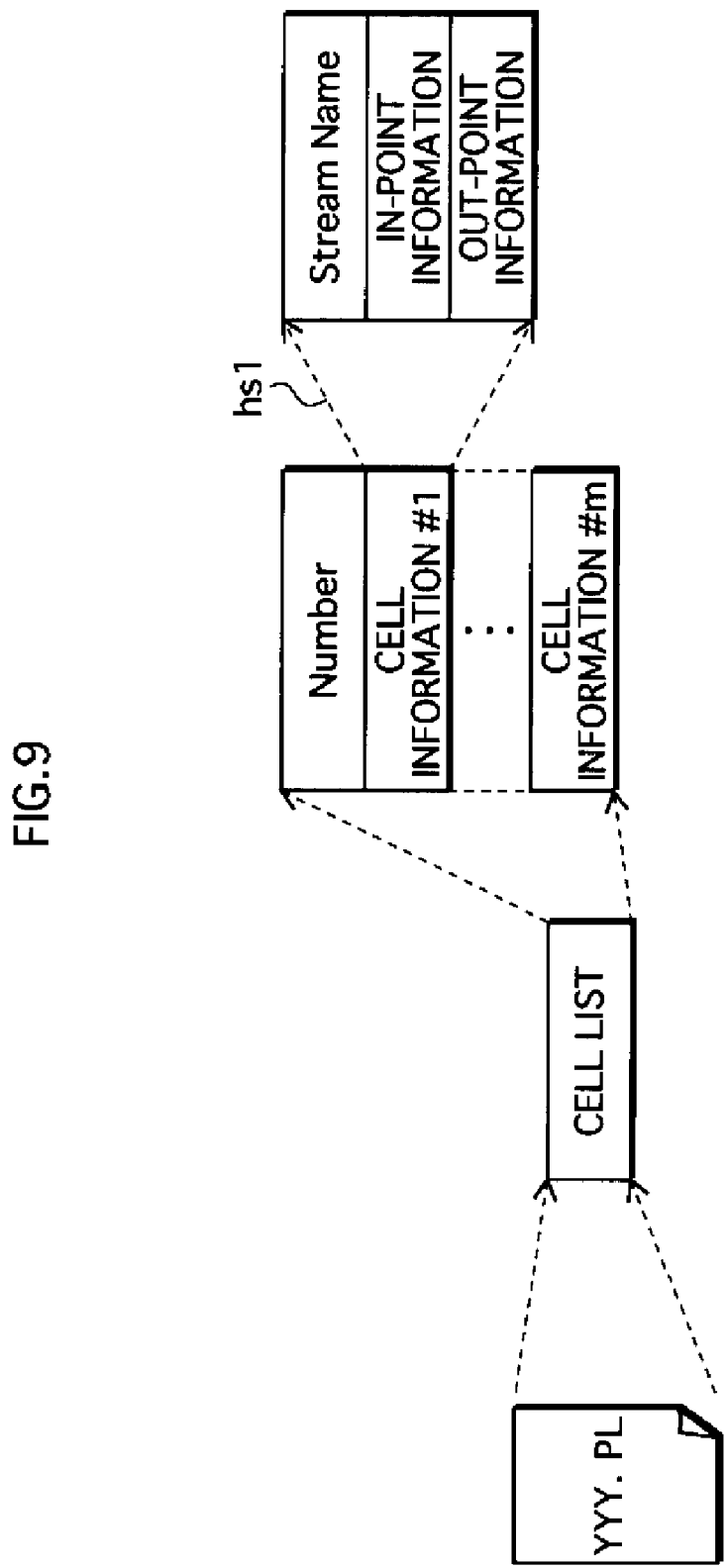
FIG. 9 shows an internal structure of PL information.

YYY.PL (PL information) is a table structuring a playlist, which is playback path information, and is composed of CellList. FIG. 9 shows an internal structure of PL information.

CellList comprises plural pieces of Cell information (Cell Information #1, #2, #3, #n) and the number of pieces of the Cell information (Number). Cell information is pointer information that defines one or more logical playback sections structuring a playlist. The structure of a piece of Cell information is shown in close detail as indicated with the line hs1. As shown by the line, a piece of Cell information is structured from a "Stream Name" indicating the name of the AV stream to which the In-point and Out-point of a playback section belong, and an "In-point Information" which is information showing the start of a playback section, and an "Out-point Information", which is information showing the end of a playback section.

Figure 10:
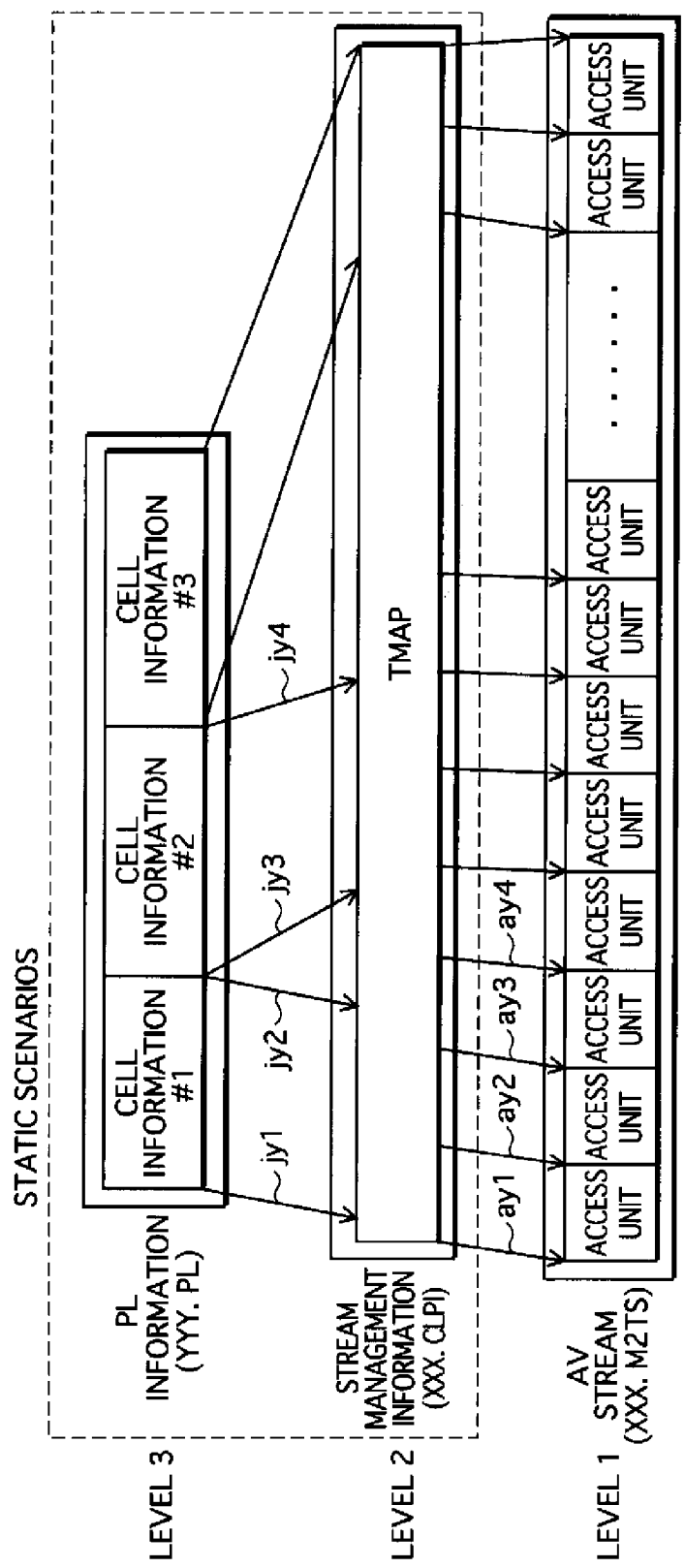
FIG. 10 schematically shows indirect referencing with the use of PL information.

Cell information is characterized by the notation. That is, playback sections are defined by an indirect referencing format that uses a time map as a reference table. FIG. 10 schematically shows indirect referencing with the use of PL information. The AV stream in the figure is structured from a plurality of ACCESS UNITs. The TMAP in the stream management information specifies the sector address of the ACCESS UNITs, as shown by the arrows ay1, ay2, ay3, and ay4. Arrows jy1, jy2, jy3, the figure schematically show the referencing of ACCESS UNITs using the Cell information. In other words, it can be seen that referencing by the Cell information (arrows jy1, jy2, jy3, and jy4) involves indirect referencing in which the addresses of ACCESS UNITs included in the AV stream are specified via the TMAP.

Playback sections on the BD-ROM that are formed from groupings of Cell information, stream management information, and the AV stream are called "CELLS". Logical playback units on the BD-ROM that are formed from groupings of PL information, stream management information, and the AV stream are called "PlayLists" (abbreviated as "PL"). Movie works recorded on the BD-ROM are structured in these logical playback units (PLs). Therefore, it is possible to easily create, as distinct from the actual movie, movie works made of only scenes in which a certain character appears by defining a PL specifying these scenes. FIG. 11 shows an example of when a different PL (PL information #2) to the PL (PL information #1) shown in FIG. 10 is defined.

The greatest merit of static scenarios is being able to increase the range of a moviemaker's expression, since the variations of movie works increase simply by defining various pieces of PL information.

There are, in addition to PLs and CELLs, playback units in the BD-ROM called Chapters. Chapters are structured from one, two, or more CELLs.

Also, the filename "YYY" of the PL information is an abstract representation of the 3-digit identification number appended to PL information in the BD-ROM. That is, the PL information in FIG. 11 is uniquely identified using the identification number, "YYY". Expressing the identification number of the PL information as "YYY" shows that this identification number is a different numbering system to the identification number "XXX" of the AV stream and AV stream management information. It should be noted that the 3-digit number referred to here is merely exemplary, and any digit number can be used.

Thus concludes the description of static scenarios. Next are described dynamic scenarios.

1.2 Dynamic Scenarios

Dynamic scenarios are programs showing playback controls relating to the AV stream. Playback controls by dynamic scenarios change in response to user operations on a device, and are similar to programs in character. Here, dynamic playback controls have two modes. One of the two modes is a mode for playing video data recorded on the BD-ROM (normal mode) in a playback environment specific to AV devices, and the other mode is for enhancing the added value of video data recorded on the BD-ROM (enhanced mode). FIG. 12 shows playback modes on Layer 4 of the layer model. One normal mode and two enhanced modes are shown on Layer 4 in the figure. The normal mode, called a MOVIE mode, is a playback mode for a DVD-like environment (i.e. a mode similar to a playback mode used for DVDs). Of the two enhanced modes, the first, called a Java mode, is a playback mode used mainly with Java Virtual Machines. The second enhanced mode, called a Browser mode, is a playback mode used mainly with browsers.

Figure 13B:
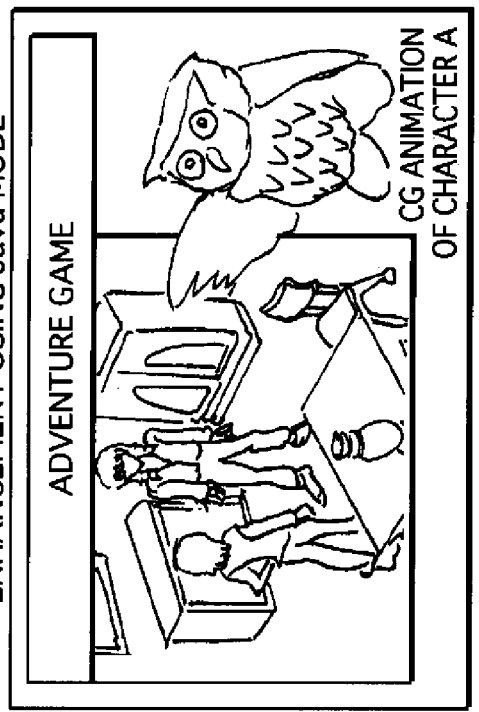
FIG. 13 shows movie works created through dynamic playback controls of three modes.
Figure 13A:
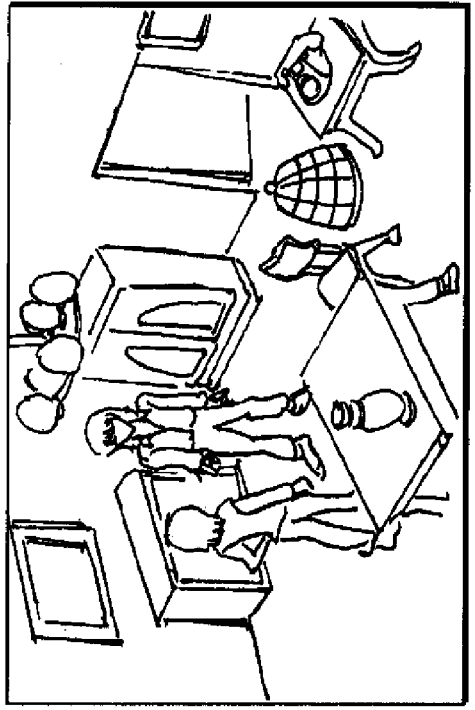
Figure 13C:
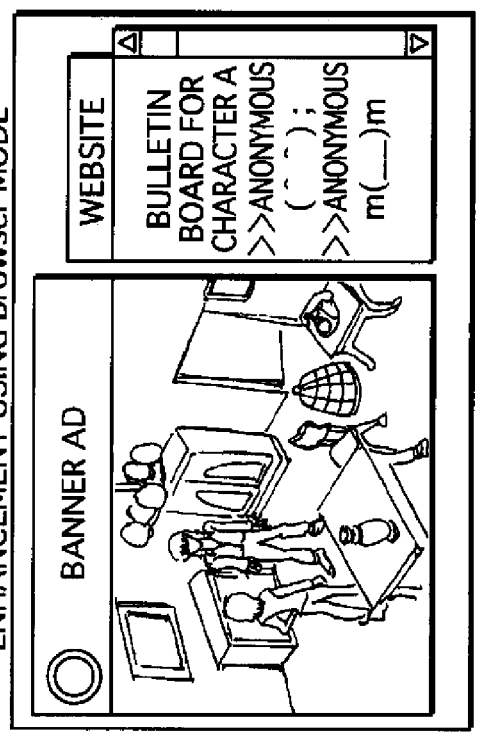

Since there are three modes on Layer 4 (i.e. the MOVIE mode, Java mode, and Browser mode), it is preferable to describe dynamic playback controls so as to be executed in either one of the modes. When control procedures are described in commands that closely resemble DVD player-oriented commands, it is possible to have a playback device execute playback controls that closely resemble those in existing DVD playback devices. When control procedures are described using a page-description language, it is possible to describe control procedures for accessing network sites and downloading files, for example. FIGS. 13A-13C show movie works created through dynamic playback controls of three modes.

FIG. 13A shows one scene from a movie work created by defining dynamic playback controls in the MOVIE mode. Since the MOVIE mode allows to describe playback controls in commands that closely resemble those comprehensible to DVD playback devices, it is possible to define playback controls similar to those used for DVDs, that is, playback controls that allow the progress of playback according to a selection made on a menu.

FIG. 13B shows a movie work created by defining dynamic playback controls in the Java mode. The Java mode allows a description of control procedures in the Java language comprehensible to Java Virtual Machines. In the case where playback controls are for controlling motion of computer graphics (CG), it is possible to define a playback control, in the Java mode, for a CG image moving around (an owl in the figure) next to a window showing videos, for example.

FIG. 13C shows a movie work created by defining dynamic playback controls in the Browser mode. The Browser mode allows a description of playback controls in the HTML language comprehensible to browsers. In the case where playback controls are for controlling accesses to websites and window operations, it is possible to define a playback control in the Browser mode for displaying online data retrieved from a website (the bulletin board for Character A and banner advertising in the figure) next to a window showing videos, for example.

Thus concludes the general description of dynamic scenarios. The following describes files that define playback controls of individual modes, with respect to each mode.

1.3 Dynamic Scenarios in MOVIE Mode

The following description relates to dynamic scenarios in the MOVIE mode. Dynamic scenarios in the MOVIE mode include the Navigation Button information in transport streams and MOVIE objects.

Figure 14:
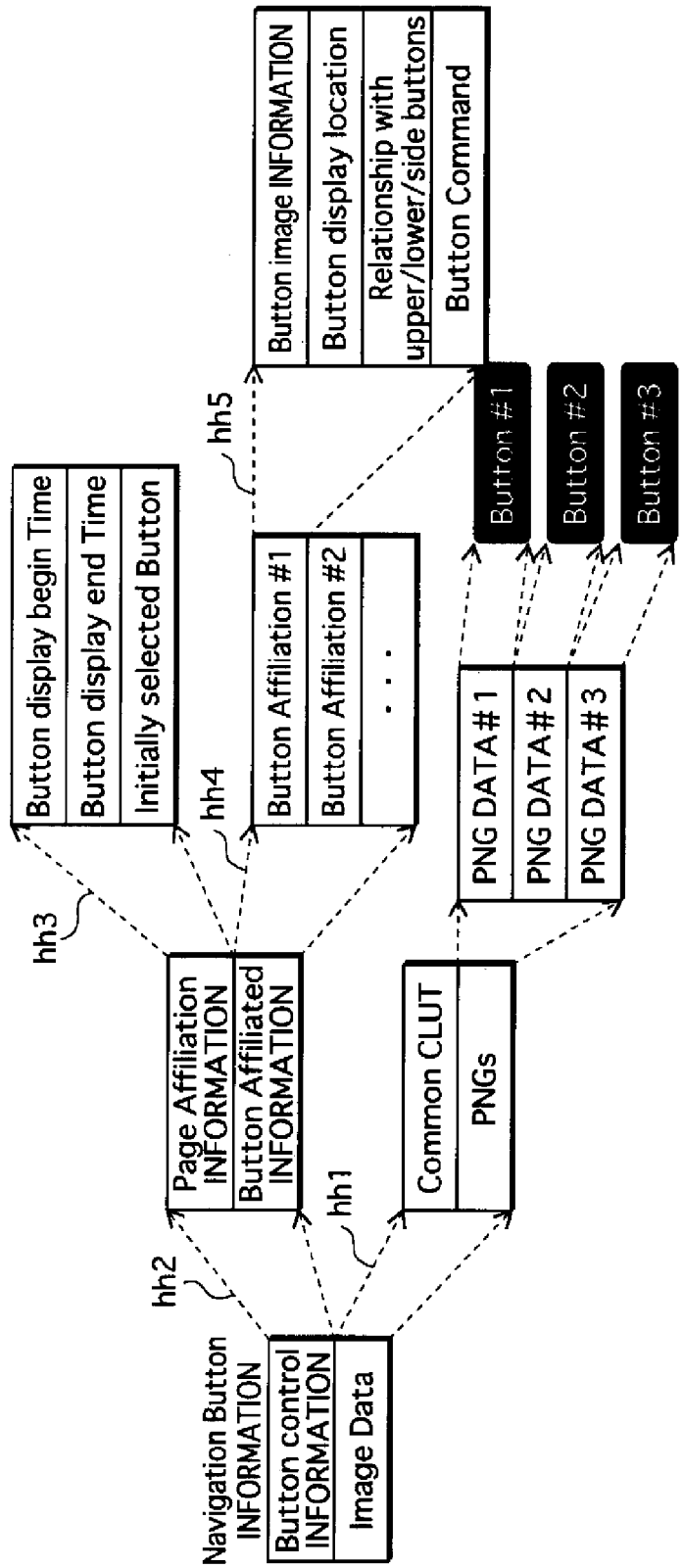
FIG. 14 shows a structure of Navigation Button information.

The Navigation Button information, which is one of streams multiplexed on the AV stream, controls the behavior of buttons on a menu, and executes playback controls in response to a confirmed button. The menu behavior includes (i) changing a button status on the menu in response to a push down of an arrow key on the remote control, (ii) updating a register value in a playback device according to a button confirmation on the menu, and (iii) realizing branching in response to a button confirmation on the menu. Controlling the behavior and having a playback device execute commands according to buttons are roles of the Navigation Button information. FIG. 14 shows a structure of the Navigation Button information. The Navigation Button information is composed of Button control information and Image Data. Image data comprises, as indicated by the dashed line hh1, plural pieces of PNG data (PNGs) and a look up table (Common CLUT) to which all pieces of PNG data make reference. Individual pieces of the PNG data (PNG data #1, PNG data #2, and PNG data #3) in Image Data are image data for rendering each button (Button #1, Button #2, and Button #3) on the menu.

The Button control information comprises, as indicated by the dashed line hh2, Page Affiliation information and Button Affiliated information. The Page Affiliation information is, as indicated by the dashed line hh3, structured from "Button display begin Time", which indicates a beginning time for displaying buttons, "Button display end Time", which indicates an ending time for the display, and "Initially selected Button", which indicates a button to be in selected state at the initial condition.

The Button Affiliated information is, as indicated by the dashed line hh4, structured from plural pieces of Button Affiliation #1, Button Affiliation #2, ... and so on. Each piece of the Button Affiliations is, as indicated by the dashed line hh5, composed of "Button image information" that indicates, from among plural pieces of the PNG data, which is an image for a corresponding button, "Button display location" that indicates a location of the button image, "Relationship with upper/lower/side buttons" that indicates which buttons are located on the left, right, above and below of the button, respectively, and "Button Command" to be executed when the button is confirmed.

In the Button Affiliated information related to individual buttons on a menu, which buttons are located on the left, right, above and below of each button is described. Therefore, it is possible to, in response to a push down of an arrow key on the remote control by a user, identify a button located along the direction indicated by the pushed arrow key by referring to the Relationship with upper/lower/side buttons in Button Affiliated information, and then change a state of the button. Thus, according to the push down of an arrow key, the state of a button in the direction indicated by the key is changed. Subsequently, when the confirmation operation is performed by a user, it is possible to execute a dynamic playback control according to the pushed button by implementing Button Command of the Button Affiliated information corresponding to the button.

Since the Navigation Button information is incorporated in the AV stream, it is convenient in the description of playback controls for having a playback device execute specific processing according to a timing at which a particular frame of videos appears on a screen, that is, playback controls synchronized precisely with the video contents. In addition, since the Navigation Button information is multiplexed on the actual AV stream, even when there are hundreds of sections needing to perform playback controls, there is no need to store all the Navigation Button information corresponding to the sections in memory. The Navigation Button information is read from the BD-ROM for every ACCESS UNIT along with video packets. Therefore, it is preferable to have pieces of the Navigation Button information corresponding to a video section for the current playback reside in memory, and then to delete these pieces of the Navigation Button information from memory when playback of this video section is over and store pieces of the Navigation Button information corresponding to the next video section in memory. Since the Navigation Button information is multiplexed on the AV stream, the installed memory can be kept to a minimum required amount even when, for instance, there are hundreds of pieces of the Navigation Button information.

Figure 15:
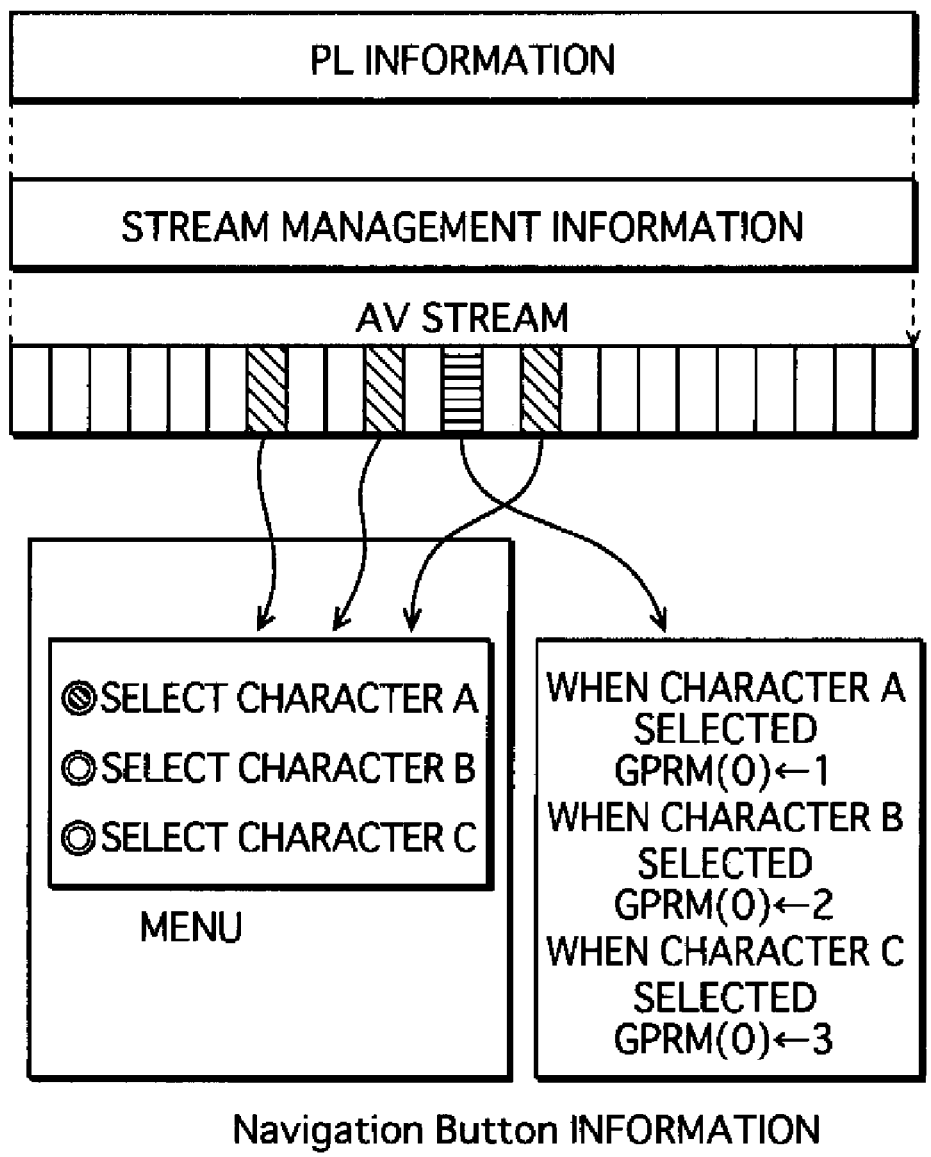
FIG. 15 shows an example of when button controls are implemented using the Navigation Button information multiplexed on the AV stream.

An exemplified description of commands related to the Navigation Button information is explained with reference to FIG. 15. FIG. 15 shows an example of when button controls are implemented using the Navigation Button information multiplexed on the AV stream.

The AV stream in FIG. 15 is a movie, and multiple buttons in the figure are displayed, being combined with one frame of the movie. Buttons A, B, and C in the figure each correspond to characters appearing in the movie works, and the state of each button is switched between selected and confirmed states through a selection operation for selecting one of Characters A, B, and C appearing in the movie.

In FIG. 15, the Navigation Button information is placed, in the video stream, ahead of a period where an interactive operation is required. When a button on a menu is confirmed, the Navigation Button information multiplexed on the AV stream in the figure sets GPRM(0) to a value unique to the button. GPRM(0) is a register setting value managed on Layer 3 (static scenarios) in the layer model. Specifically speaking, GPRM(0) is set to "1" when the button for Character A is confirmed, and GPRM(0) is set to "2" when the button for Character B is confirmed. When the button for Character C is confirmed, GPRM(0) is set to "3". Rendering the Navigation Button information in this way allows for saving, in GPRM (0), information on which button was selected at the time of the menu rendered. Thus completes the description of the Navigation Button information.

A MOVIE object (XXX.MOVIE) is a dynamic scenario described in commands that resemble those comprehensible to DVD playback devices. The MOVIE object is composed of a playback command for instructing PL playback, a command to be executed prior to the PL playback (PRE command), and a command to be executed after the PL playback (POST command). Pairings of one or more MOVIE objects with PLs whose playback is instructed with individual MOVIE objects is called Titles. Titles are units that correspond to an entire movie work on the BD-ROM. "MOVIE object" is sometimes shortened to "M-OBJ" below.

Figure 16:
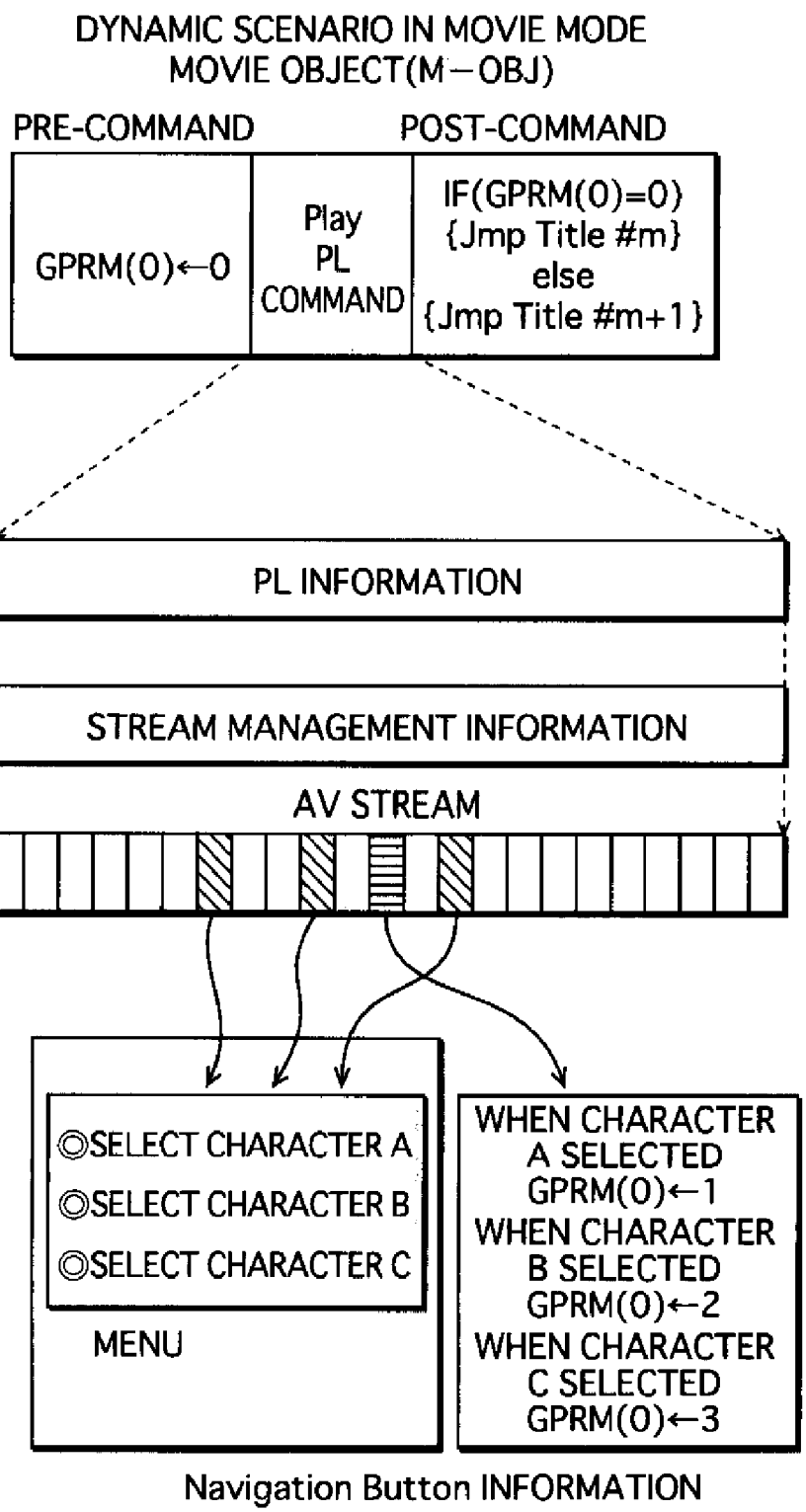
FIG. 16 shows an example of a MOVIE object in the case where the Navigation Button information in the AV stream is set as shown in FIG. 15.

FIG. 16 shows an example of the MOVIE object in the case where the Navigation Button information in the AV stream is set as shown in FIG. 15. The MOVIE object in the figure is composed of: a PRE command for setting GPRM(0) to "0"; a command for instructing a playback device to perform PL playback, (PlayPl(PL#1)); and a POST command for instructing the playback device to perform branching to another dynamic scenario, (IF(GPRM(0)=0){Jump Title#m}else{Jump Title#m+1}). As a result of the PRE command, GPRM(0) is initialized prior to PL playback. Branching to MOVIE object #m+1 is performed if GPRM(0) shows "0", which is a value at the initialization. On the other hand, if a button selection is performed when a menu is displayed and GPRM(0) is set to a value other than then "0", then branching is performed to another Title (Title#m).

If commands for changing the register setting value according to user operations are incorporated in the Navigation Button information, and conditional branching using the register setting value in a playback device is described as the POST commands, it is possible to easily create a multi-story movie, namely a movie work whose progress of playback can be changed according to user operations.

Since there are two types of scenarios in the MOVIE mode (Navigation Button information and MOVIE objects), processing needing to synchronize precisely with the button behavior on a menu can be described in Navigation Button information, and integrative processing such as pre- and post-processing for PL playback can be described in MOVIE objects. Thus, the command description can be changed depending on whether processing to be synchronized with buttons or integrative processing, which increases the range of expression for playback controls. Furthermore, the description of playback controls does not require playback devices to have large capacity memory by writing new Navigation Button information over old one, even if the number of playback controls needing to synchronize with buttons increases.

1.4 Dynamic Scenarios in Java Mode

The following explains dynamic scenarios used in the Java mode.

ZZZ.CLASS is a class file in which application programs (Java objects) specifying dynamic playback controls in the Java mode are defined. Since a Java Virtual Machine is a main execution body of scenarios in the Java mode, Java objects are described in the Java language. In late years, the Java language (registered trade name) that is a middleware-oriented description language developed by SUN Microsystems, Inc., has been increasingly in widespread use in consumer appliances, such as Japanese cellular phones and DVB-MHPs (Digital Video Broadcasting-Multimedia Home Platform) for European digital broadcasting. As with C++, the Java language is an object-oriented programming language. The difference from C++ is that, while C++ is implemented in operating systems, the Java language defines Java Virtual Machines and is implemented in main operating systems, such as Windows and Linux. Therefore, the use of the Java language allows descriptions of processing procedures independent of operation systems. The reason the Java language has been adopted for cellular phones and STBs (set-top boxes) is that, even if the execution environments differ from maker to maker, the Java language is able to describe execution environment-independent processing procedures. "Java object" is sometimes shortened to "J-OBJ" below.

FIG. 17 shows an exemplified description of a Java object in the case where branching is performed by a command of the MOVIE object shown in FIG. 16. The Java object performs procedures of (i) rendering a CG, and (ii) playing a CELL in a PL, according to a value in GPRM(0). Such procedures realize creating a combined image as shown in FIG. 13B, that is, a combined image where a CG of a character is set in motion next to video data structuring the PL being played. Note that the IF statement of the exemplified description changes a character to be rendered and a CELL to be played according to GPRM(0).

The following explanation is given focusing attention on a CG to be rendered. In an example shown in FIG. 17, "A.drawCharacter( )" means that the Object of Character A is rendered on the screen using one of the methods (i.e. the drawCharacter function in the figure) of the Class "Character A". Likewise, "B.drawCharacter( )" and "C.drawCharacter( )" mean respectively that the Objects of Characters B and C are rendered on the screen using one of the methods (i.e. the drawCharacter function in the figure) of the Classes "Character B" and "Character C".

Figure 18:
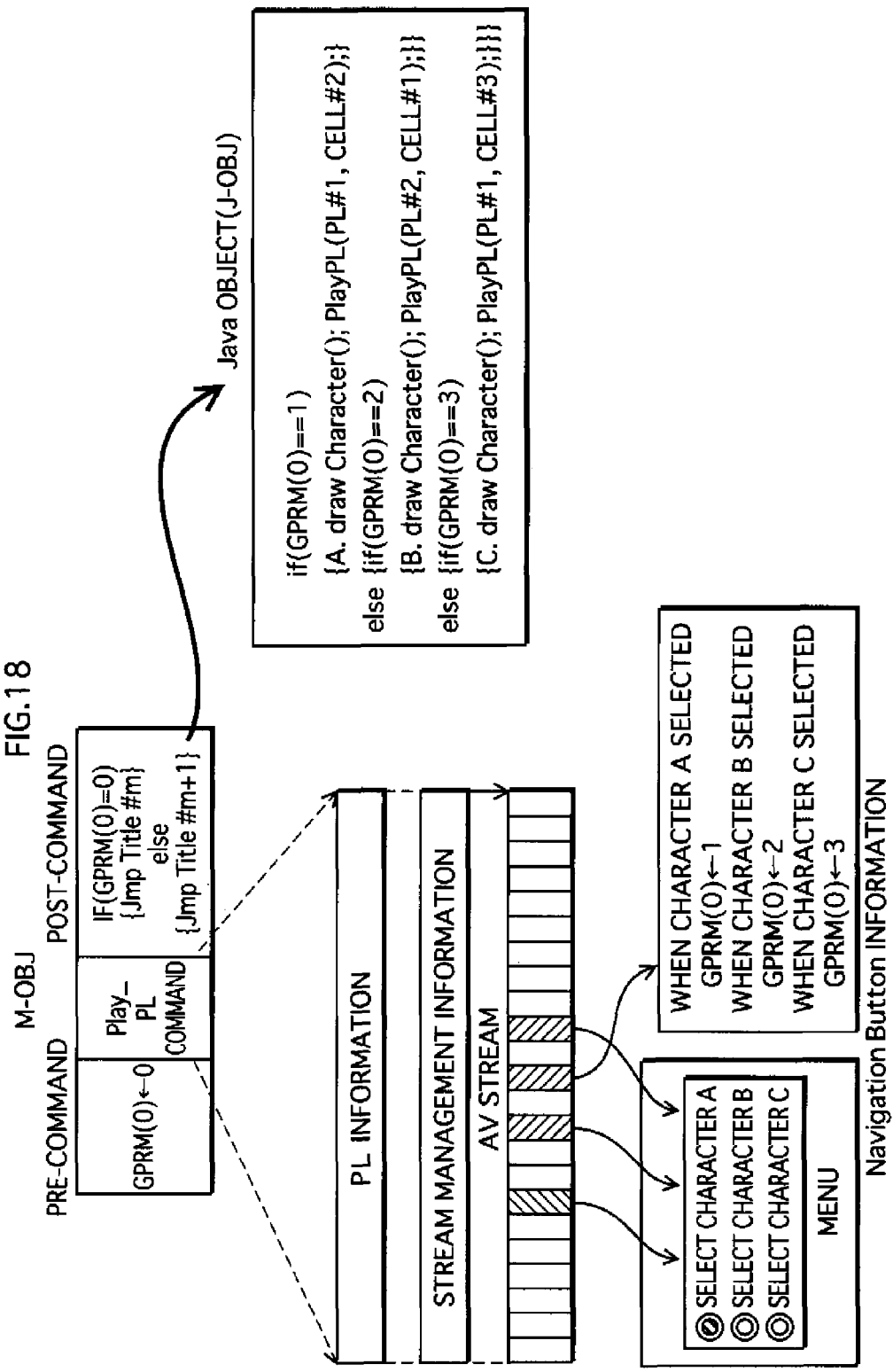
FIG. 18 shows a relationship between a MOVIE object and a Java object.

Since "A.drawCharacter( )", "B.drawCharacter( )", and "C.drawCharacter( )" are executed exclusively depending on the value of GPRM(0) (IF statements in FIG. 17), the CG of Character A is rendered if GPRM(0) is "1", the CG of Character B is rendered if GPRM(0) is "2", and the CG of Character C is rendered if GPRM(0) is "3". FIG. 18 shows a relationship between a MOVIE object and a Java object. The left half of the figure is identical to the exemplified description of the MOVIE object shown in FIG. 16. GPRM(0) in the figure is set by the Navigation Button information incorporated in the AV stream. GPRM(0) is a parameter managed on Layer 3 (static scenarios) in the layer model. Since GPRM(0) can be referred to in any mode of the MOVIE mode, Java mode, and Browser mode, processing of a Java object can be switched according to GPRM(0) that has been set in the MOVIE mode. The value in GPRM(0) can be changed by the Navigation Button information in the MOVIE mode, and a CG to be rendered can be switched in the Java mode. With cooperation between a MOVIE object and a Java object through GPRM(0), it is possible to create a new style of movie works where playback of video data and processing performed by Java Virtual Machines are integrated.

Figure 19:
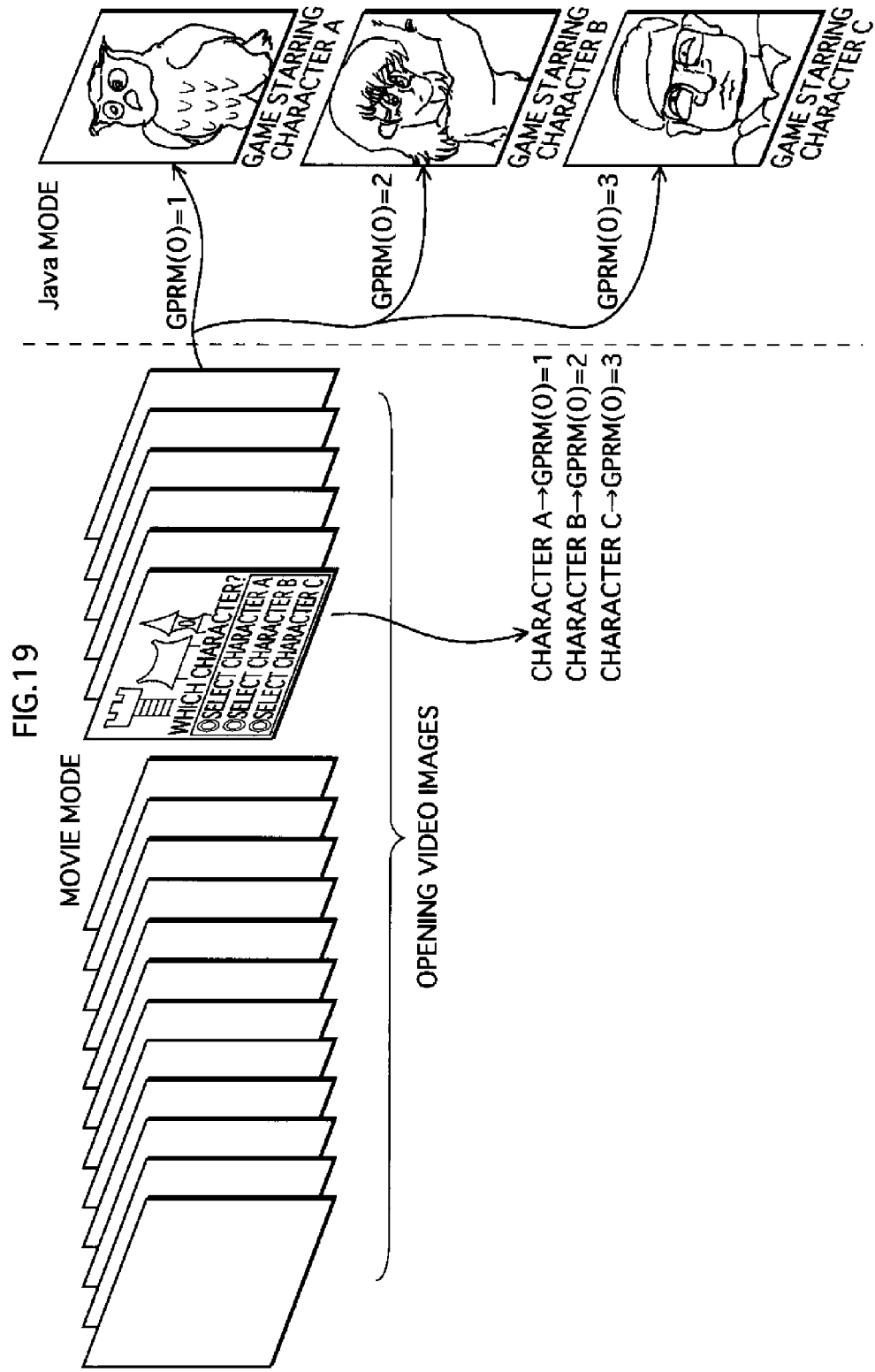
FIG. 19 schematically shows a Title composed of a character introduction in the MOVIE mode and a game in the Java mode.

If the Java object processing according to a value of GPRM(0) is, for example, a game starring one of Characters A, B, and C, the procedures of: (1) introducing characters with videos in the MOVIE mode; (2) accepting a character selection from a user; and (3) executing, in the Java mode, the game starring a character selected by a user (such procedures can be commonly found in today's game software) can be readily described using video data of a movie. FIG. 19 schematically shows a Title composed of a character introduction in the MOVIE mode and a game in the Java mode. As a result of the cooperation between the MOVIE mode and Java mode via GPRM(0), a series of procedures from the character introduction to the execution of the game starring a character can be easily described using a movie in the MOVIE mode.

On the other hand, in the light of a CELL to be played, CELL#1 of PL#1 is rendered when GPRM(0) is "1", CELL#1 of PL#2 is rendered when GPRM(0) is "2", and CELL#1 of PL#3 is rendered when GPRM(0) is "3".

Figure 20:
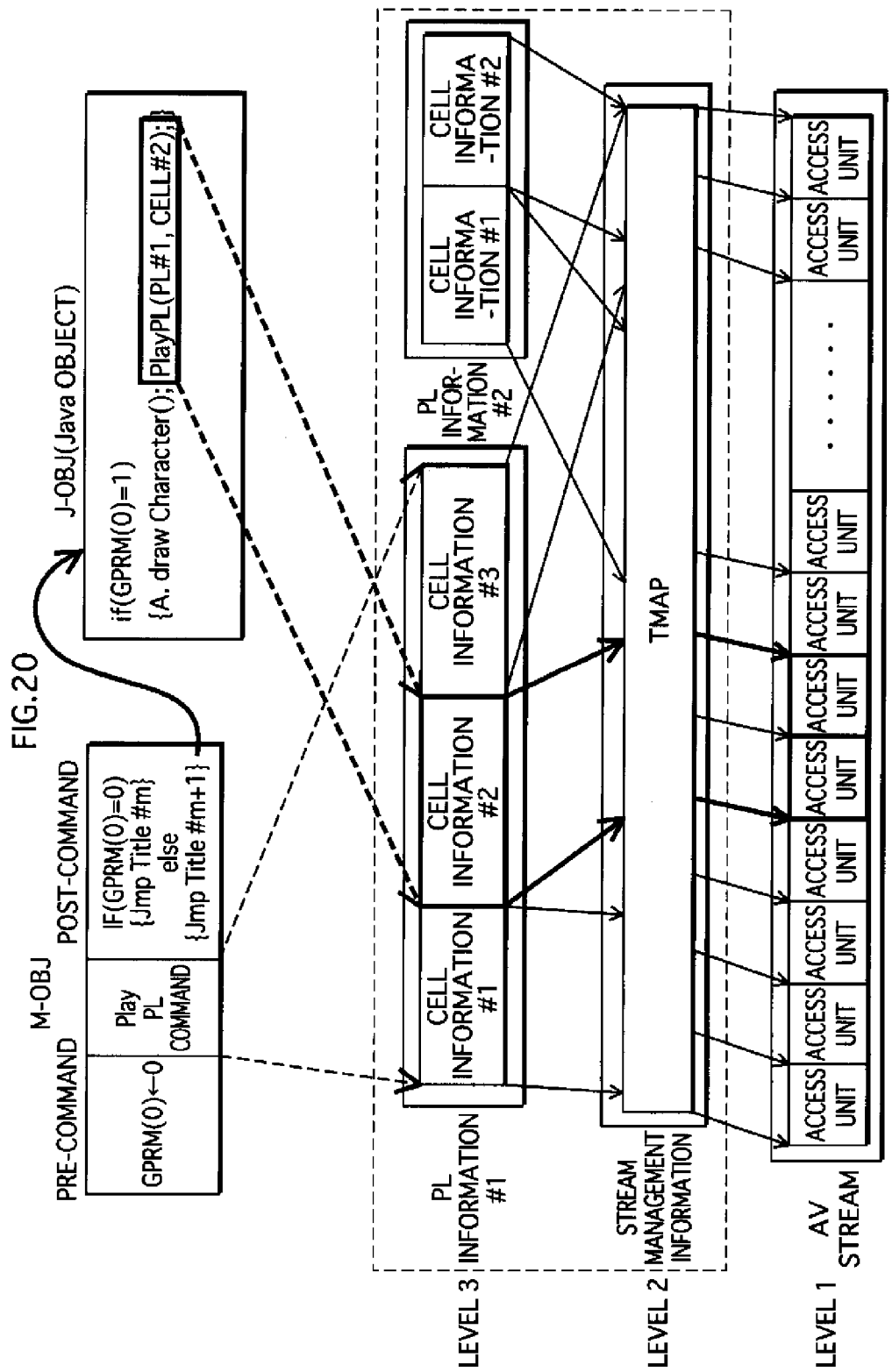
FIG. 20 schematically shows PL playback performed with the Java object.

Here, for example, CELL#2 of PL#1 is a playback unit specifying, in the AV stream, only a section in which Character A appears. By playing this CELL together with a CG of Character A, it is possible to display a combined image (FIG. 13B) where the CG of Character A is moving around next to Character A in videos being displayed. FIG. 20 schematically shows PL playback performed by a Java object. The Java object in the figure includes a function call which instructs playback of CELL#2 of PL#1. In response to the function call, one of the CELLs structuring a PL is played. If PL#1 in the figure has been instructed to perform playback in the MOVIE mode, here only a section of CELL #2 is extracted for use in the Java object. Such a function call of the Java object achieves a straightforward "scene extraction" in which, of a movie work (PL#1) to be played in the MOVIE mode, only a specific scenes (CELL#2) are used for the Java-mode game. The example of FIG. 20 illustrates a scene extraction assuming PL sharing where a PL used in the MOVIE mode is used in the Java mode. Alternatively, a scene extraction can be performed using a PL different from one used in the MOVIE mode. FIG. 21 shows a scene extraction performed by using a different PL from one used in the MOVIE mode.

These extractions of FIGS. 20 and 21 allow to easily create flashback scenes used for the Java mode game in the context of scenes from a movie being recalled in the game. Such extractions lead to an expansion of the range of expressions involved with producing movie works, and thus enhance the commercial value of BD-ROMs. Note that the examples of FIGS. 20 and 21 perform extractions with respect to each CELL, however a section that is instructed by the Java object for playback can be specified by time. Likewise, extractions can be performed in the Browser mode. Since game software that is incorporated with movie works or that uses scenes from a movie can be programmed in the Java language, it is possible to have a number of software houses set their entry into BD-ROM producing businesses.

1.5 Dynamic Scenarios in Browser Mode

A WebPage object (ZZZ.HTM) is a scenario described in a page-description language, such as HTML, XML, and BML. "WebPage object" is sometimes shortened to "WP-OBJ" below. Since WebPage objects can be described in HTML, the Browser mode realizes descriptions of control procedures with the inclusion of accesses to websites. FIG. 22 shows an example of description of a WebPage object. This exemplified description is based on FIG. 18. The WebPage object in FIG. 22 differs in making access to different websites according to the value in GPRM(0). In other words, access is made to a website pertaining to Character A when GPRM(0) is "1", access is made to a website pertaining to Character B when GPRM(0) is "2", and access is made to a website pertaining to Character C when GPRM(0) is "3". GPRM(0) in FIG. 22 is set by the Navigation Button information incorporated in the AV stream. In addition, since GPRM(0) is in Layer 3 (static scenarios) in the layer model, and can be referred to in any mode of the MOVIE mode, Java mode, and Browser mode, processing of a WebPage object can be switched according to GPRM(0) that has been set in the MOVIE mode. In the case where online data from websites is news and BBSs (bulletin board systems), which are updated on a daily or weekly basis, and banner advertisings, having these online data on display ensures keeping the impression of the video data always fresh. Additionally, because WebPage objects allow descriptions of access procedures to web servers, it is possible to obtain the latest versions of PLs and VOBs (DVD Video Objects) from web servers, and to have a playback device perform playback controls with the inclusion of these PLs and VOBs. Cooperation between a MOVIE object and a WebPage object through GPRM(0) leads to creating a new type of movie works where video data playback and browser processing are integrated.

A filebody "ZZZ" in the filenames, ZZZ.MOVIE, ZZZ.CLASS, and ZZZ.HTM, is an abstract representation of a 3-digit identification number appended to the individual dynamic scenarios in the BD-ROM. That is, the scenarios in FIG. 23 are uniquely identified with the identification number "ZZZ". Expressing the identification number of the scenarios as "ZZZ" shows that this identification number is a different numbering system to the identification number "XXX" of the AV stream and the identification number "YYY" of the PL information. It should be noted that the 3-digit number referred to here is merely exemplary, and any digit number can be used.

1.6 Technique for Describing Scenarios

Here is explained a technique for describing control procedures of MOVIE, Java, and WebPage objects. In a layer model that these scenarios target, a DVD virtual player implementing MOVIE objects, a Java Virtual Machine implementing Java objects, and a browser implementing WebPage objects are all in Layer 3 (static scenarios). In Java objects and Webpage objects, intrinsic processing to be performed in the Java and Browser modes, such as CG rendering and website accesses, can be preferably described in the Java language and HTML, respectively. Any other processing, i.e. playback controls of the BD-ROM, can be described using programming functions supplied from Layer 3 (static scenarios).

The following description relates to functions supplied from Layer 3 (static scenarios).

(a) Playback Functions: Starting Playback of a PL Specified by a First Argument from a Position Specified by a Second Argument Format: PlayPL (First Argument, Second Argument)

The first argument is able to specify a PL for playback using the PL number. The second argument is able to specify a playback start position using a CELL included in the PL, and an arbitrary time, Chapter, and Mark in the PL.

A PlayPL function specifying a playback start position using a CELL is called a "PlayPLatCELL( )";

a PlayPL function specifying a playback start position using a Chapter is called a "PlayPLatChapter( )";

a PlayPL function specifying a playback start position using a Mark is called a "PlayPLatMark( )"; and a PlayPL function specifying a playback start position using time information is called a "PlayPLatSpecified Time( )".

(b) Functions for Status Acquisition and Status Setting of a Playback Device

The status of a playback device is shown in 32 individual Player Status Registers (the setting values of these registers are called System Parameters (SPRM)), and 32 individual General Purpose Registers (the setting values of these registers are called General Parameters (GPRM)).

MOVIE objects, Java objects, and WebPage objects are able, for example, to set values in and acquire values from these registers by using the following functions (i) to (iv).

(i) "Get Value of Player Status Register" Function

Format: Get value of Player Status Register (argument)

This function acquires setting values of Player Status Registers specified by arguments.

(ii) "Set value of Player Status Register" Function

Format: Set value of Player Status Register (first argument, second argument)

This function causes values specified by the second argument to be set in Player Status Registers specified by the first argument.

(iii) "Get value of General Purpose Register" Function

Format: Get value of General Purpose Register (argument)

This function acquires setting values of General Purpose Registers specified by the argument.

(iv) "Set Value of General Purpose Register" Function

Format: Set value of General Purpose Register (first argument, second argument)

This function causes values specified by the second argument to be set in General Purpose Registers specified by the first argument.

The setting values (SPRM) of the Player Status Registers have the following meanings. The notation "SPRM(x)" below refers to the setting value of the $x^{th}$ Player Status Register.

SPRM(0): Reserved
SPRM(1): stream number of audio stream targeted for decoding
SPRM(2): stream number of subtitle stream targeted for decoding
SPRM(3): number showing angle setting made by user
SPRM(4): number of Title currently targeted for playback
SPRM(5): number of Chapter currently targeted for playback
SPRM(6): number of PL currently targeted for playback
SPRM(7): number of CELL currently targeted for playback
SPRM(8): time information showing current playback point
SPRM(9): count value of navigation timer
SPRM(10): number of button currently in selected state
SPRM(11)-(12): Reserved
SPRM(13): setting of parental level by user
SPRM(14): setting related to image playback of playback device
SPRM(15): setting related to audio playback of playback device
SPRM(16): language code showing audio setting in playback device
SPRM(17): language code showing subtitle setting in playback device
SPRM(18): language setting for rendering menu
SPRM(19)-(31): Reserved

[SPRM(1) and SPRM(2)]

SPRM(1) and SPRM(2) are set by a PRE command prior to PL playback, and updated by a Button Command in Navigation Button information during playback of the AV stream. The following application is made possible by referring to SPRM(1) and SPRM(2). Here, for example, PL playback is being performed in the MOVIE mode with the audio and the subtitle set to English and Japanese, respectively. If branching from the MOVIE mode to the Java mode is performed during the playback, a Java object is able to set the audio to English and set the subtitle to Japanese by referring to SPRM(1) and SPRM(2), and then able to execute software of the Java object. If the software of the Java object is a learning material for listening English, the synergy between watching a movie and learning through the listening material will improve the efficiency of language learning.

[SPRM(3)]

SPRM(3) is set by a PRE command prior to PL playback, and updated by a Button Command in the Navigation Button information during playback of the AV stream. In the case where multiangle sections are included in the AV stream, it can be found that video data in which angle is a target for decoding by referring to SPRM(3).

The following application is possible by referring to SPRM (3). Here, for example, a movie work is a video showing scenery from a train, and contains multiangle sections. The multiangle sections include plural pieces of video data taken from multiple angles, such as angles from passenger seats on the right and left sides of the train and an angle from the driver's seat. In this case, SPRM(3) shows the angle of playback. Therefore, at the time of branching from the MOVIE mode to the Java mode, a Java object is able to realize a driving game involving playback of images taken from an angle set by an user by referring to SPRM(3).

[SPRM(4)-SPRM(7)]

SPRM(4) is updated when a Title is selected by a user via a menu operation. SPRMs(5)-(7) are updated whenever the current playback point proceeds. That is, SPRM(7) is updated if the current playback point moves from one CELL to another CELL, SPRM(6) is updated if one PL is switched to another PL, and SPRM(5) is updated if one Chapter is switched to another Chapter.

In this way, which Title, which PL, which CELL or which Chapter in the PL, or which CELL that a playback device is currently playing can be found by referring to SPRMs(4)-(7). It should be noted that SPRMs(4)-(7) are not directly updated by PRE commands, POST commands, and Button commands, but they are updated by commands for PL playback. Although thus performed indirectly, the updates are implemented with dynamic scenarios, and therefore it can be said that SPRMs(4)-(7) are updated with dynamic scenarios.

[SPRM(10)]

SPRM(10) is updated whenever each piece of picture data belonging to the AV stream is displayed. That is, if a playback device displays new piece of picture data, SPRM(10) is updated to a value indicating a display start time (Presentation Time) of the new piece of picture data. In the case where a Button Command in Navigation Button information has been described so that a transition from the MOVIE mode to the Java mode is performed during PL playback, a Java object in the Java mode is able to find a point to which a user has finished watching the movie work on the BD-ROM where the Button Command is stored. Additionally, in the Java mode, game software can be described so that appearing characters will be changed depending on the watching point in the movie work, which makes games in the Java mode more exciting. It should be noted that SPRM(10) is not directly updated by PRE commands, POST commands, and Button commands, but it is updated by commands for PL playback. Although thus performed indirectly, the updates are implemented with dynamic scenarios, and therefore it can be said that SPRM (10) is updated with dynamic scenarios.

Java objects and WebPage objects are able to find the status of a playback device in detail by referring to the Player Status Registers using the "Get value of Player Status Register" function and the "Get value of General Purpose Status Register" function.

(c) There also exist branches from one dynamic scenario to another dynamic scenario, although these are not programming functions supplied from Layer 3 (static scenarios). Functions for executing branches from one dynamic scenario to another dynamic scenario include the following JMP and CALL functions.

JMP Function
Format: JMP argument
CALL Function
Format: CALL argument

The JMP function is a branch for discarding the current dynamic scenario during operation, and executing a branch-destination dynamic scenario specified by the argument. JMP commands include direct reference commands that specify branch-destination dynamic scenarios directly, and indirect reference commands that specify branch-destination dynamic scenarios indirectly.

The Call function is a branch for causing a branch-destination dynamic scenario specified by the argument to operate after suspending the operation of the current dynamic scenario, and then resuming the operation of the suspended scenario once the branch-destination dynamic scenario has ended. A Resume command is placed at the end of the dynamic scenario which is a branch destination of the Call command. The Resume command, which is the so-called Return command of a subroutine, is for reactivating the dynamic scenario that have been in a suspended state due to the execution of the Call function. Call commands, as with JMP commands, include direct reference commands that specify branch-destination dynamic scenarios directly, and indirect reference commands that specify branch-destination dynamic scenarios indirectly.

Thus concludes the description of functions and variables supplied by Layer 3 (static scenario).

1.7 Information for Integrated Management

The following gives an account of information for integrating and managing dynamic scenarios in the MOVIE mode, Java mode, and Browser mode. INFO.BD-ROM shown in FIG. 3 is such information for integrated management.

Figure 23A:
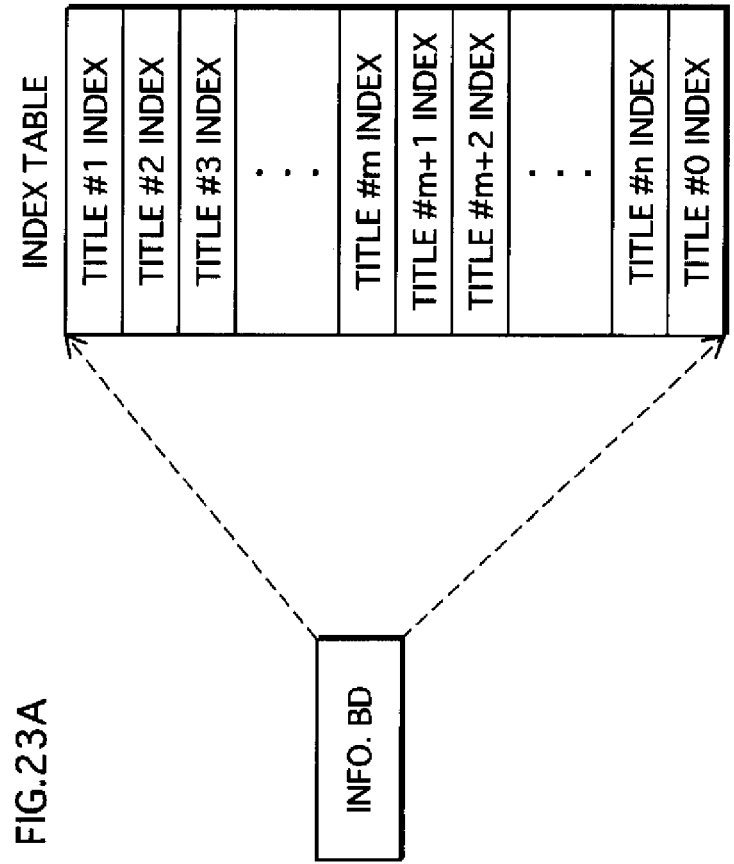
FIG. 23A shows an internal structure of INFO.BD-ROM.

FIG. 23A shows an internal structure of INFO.BD-ROM. As shown in the figure, INFO.BD-ROM includes an Index Table. The Index Table is an indirect reference table that is referenced when branching from one dynamic scenario to another dynamic scenario is performed, and comprises Indexes corresponding one-to-one with a plurality of labels. In each Index, a filename of a dynamic scenario corresponding to the label of the Index is described. As shown in FIG. 23B, each filename comprises a filebody and an extension. The labels include TITLE#1-#m, TITLE #m+1-#n, and TITLE#0. The Index Table is referred to from dynamic scenarios of any of the three modes. Branching from a MOVIE object to a Java object, or from a MOVIE object to a WebPage object is only possible when via the Index Table. To rephrase, it is not possible to branch from a MOVIE object to a Java or WebPage object that does not have an Index in the Index Table.

TITLE#1-#m INDEXES are Indexes for the $1^{st}$ to $m^{th}$ Titles entered in the BD-ROM. In these Indexes are described the filenames of MOVIE objects that are to be branch destinations when the $1^{st}$ to $m^{th}$ Title numbers are selected. FIG. 23B shows the content of the TITLE#1-#m INDEXES. As shown in the figure, the filenames of MOVIE objects are described in the TITLE#1-#m INDEXES. Each filename comprises a filebody (ZZZ) and an extension (.MOVIE).

The TITLE#m+1-#n INDEXES are Indexes for the $m+1^{th}$ to $n^{th}$ Titles entered in the BD-ROM. In these Indexes are described the filenames of WebPage objects/Java objects that are to be branch destinations when the $m+1^{th}$ to $n^{th}$ Titles numbers are selected. FIG. 23C shows an internal structure of the TITLE#m+1-#n INDEXES. As shown in the figure, in each of the TITLE#m+1-#n INDEXES is stored either the filebody (ZZZ) and extension (.CLASS) of a Java object or the filebody (ZZZ) and extension (.HTM) of a WebPage object.

TITLE#0 INDEX is an Index for storing the filename of a MOVIE mode scenario that is executed, instead of an enhanced mode scenario, in the case when the BD-ROM is loaded in a playback device inoperable to execute the enhanced mode, and branching to the enhanced mode is instructed by the playback device.

Figure 25A:
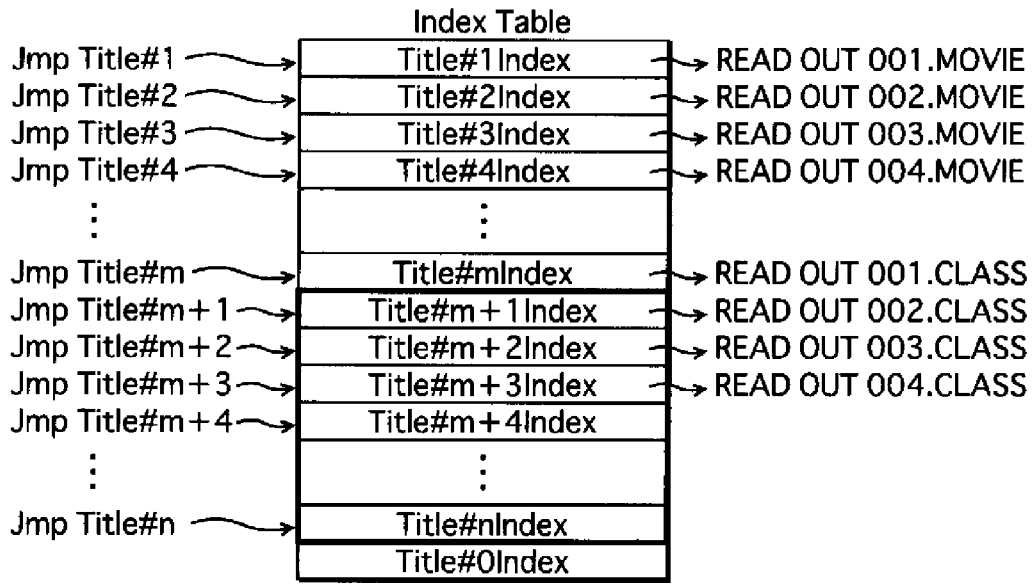
FIG. 25A shows indirect referencing in a full system of when the Index Table is described as in FIG. 24B.

Here, inoperability of the enhanced mode execution arises when (1) a Java Virtual Machine to implement the Java mode or a browser to implement the Browser mode is not installed, (2) they have been uninstalled, or (3) although they have been installed, the playback device is off from a network and used in a stand-alone configuration. A playback device in which the enhanced mode execution is not possible for any of the three reasons above is called a core system. On the other hand, a playback device in which program execution using a Java virtual machine and a browser is possible is called a full system. Indirect referencing of a BD-ROM by a core system and a full system is described below with reference to FIGS. 24A-24B. Here, the description of indirect referencing assumes a BD-ROM on which a plurality of dynamic scenarios is recorded (001.MOVIE, 002.MOVIE, 003.MOVIE, . . . , 001.CLASS, 002.CLASS, 003. CLASS, . . . ), as shown in FIG. 24A. FIG. 24B shows an exemplified description of an Index Table when the plurality of dynamic scenarios shown in FIG. 24A is described in the BD-ROM. In the exemplified description shown in FIG. 24B, the filenames of the MOVIE mode scenarios (001.MOVIE, 002.MOVIE, 003.MOVIE, . . . ) are described in Title#1Index to Title#mIndex. On the other hand, the filenames of enhanced mode scenarios (001.CLASS, 002.CLASS, 003.CLASS, . . . ) are described in Title#m+1Index to Title#nIndex. FIG. 25A shows indirect referencing in a full system when the Index Table is described as in FIG. 24B. Because of the Index Table being described as such, filenames "001.MOVIE, 002.MOVIE, 003.MOVIE, . . . " are retrieved from Title#1Index to Title#mIndex when executing branch commands specifying labels Title#1 to Title#m as branch destinations, and filenames "001.CLASS, 002.CLASS, 003.CLASS, . . . " are retrieved from Title#m+1Index to Title#nIndex when executing branch commands specifying labels Title#m+1 to Title#n as branch destinations. Dynamic scenarios specified by these filenames are then read to memory and executed. Thus concludes the description of indirect referencing by a full system.

Figure 25B:
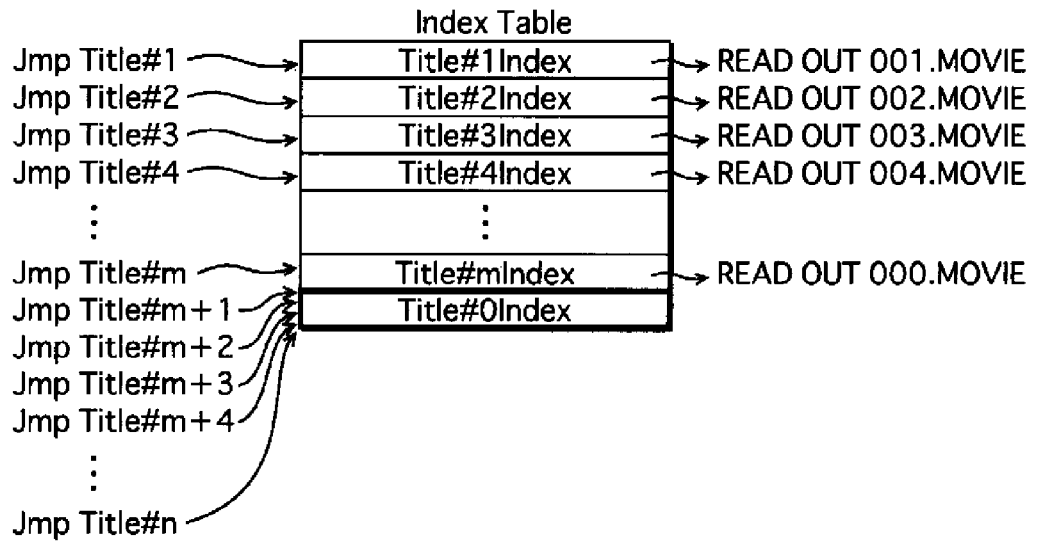
FIG. 25B shows indirect referencing in a core system.

FIG. 25B shows indirect referencing in the core system. Filenames "001.MOVIE, 002.MOVIE, 003.MOVIE, . . . " are retrieved from Title#1Index to Title#mIndex when executing branch commands specifying labels Title#1 to Title#m as branch destinations. However, when executing branch commands specifying labels Title#m+1 to Title#n as branch destinations, filename "000.MOVIE" is retrieved from Title#0Index in place of Title#m+1Index to Title#nIndex. The playback device then executes the dynamic scenario specified by the filename. Thus concludes the description of indirect referencing by both a full system and a core system.

Figure 26:
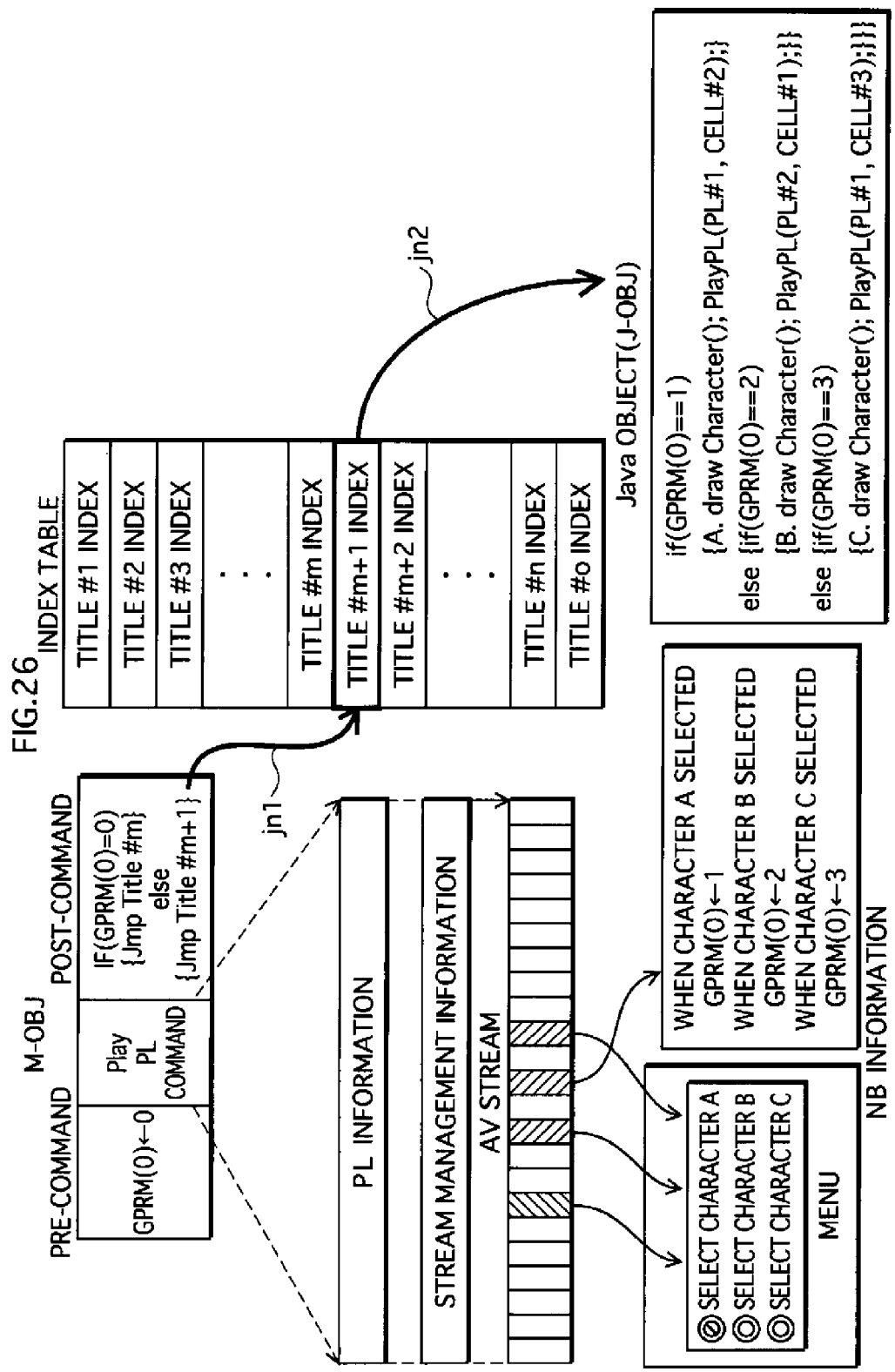
FIG. 26 schematically shows how branching from the MOVIE object shown in FIG. 18 to the Java object is performed.

FIG. 26 schematically shows how branching from a MOVIE object shown in FIG. 18 to a Java object is performed. The arrows jn1 and jn2 in the figure symbolically indicate the branching from a MOVIE object to a Java object. "Jmp Title#m+1" in the figure is a branch command for branching to a Java object, and specified the Java object as a branch destination using an indirect referencing format via the Index of label Title#m+1. The filename of the Java object is described in the Index of label Title#m+1, and the playback device is able to find which file to read as the Java object by referring to this Index.

Figure 27:
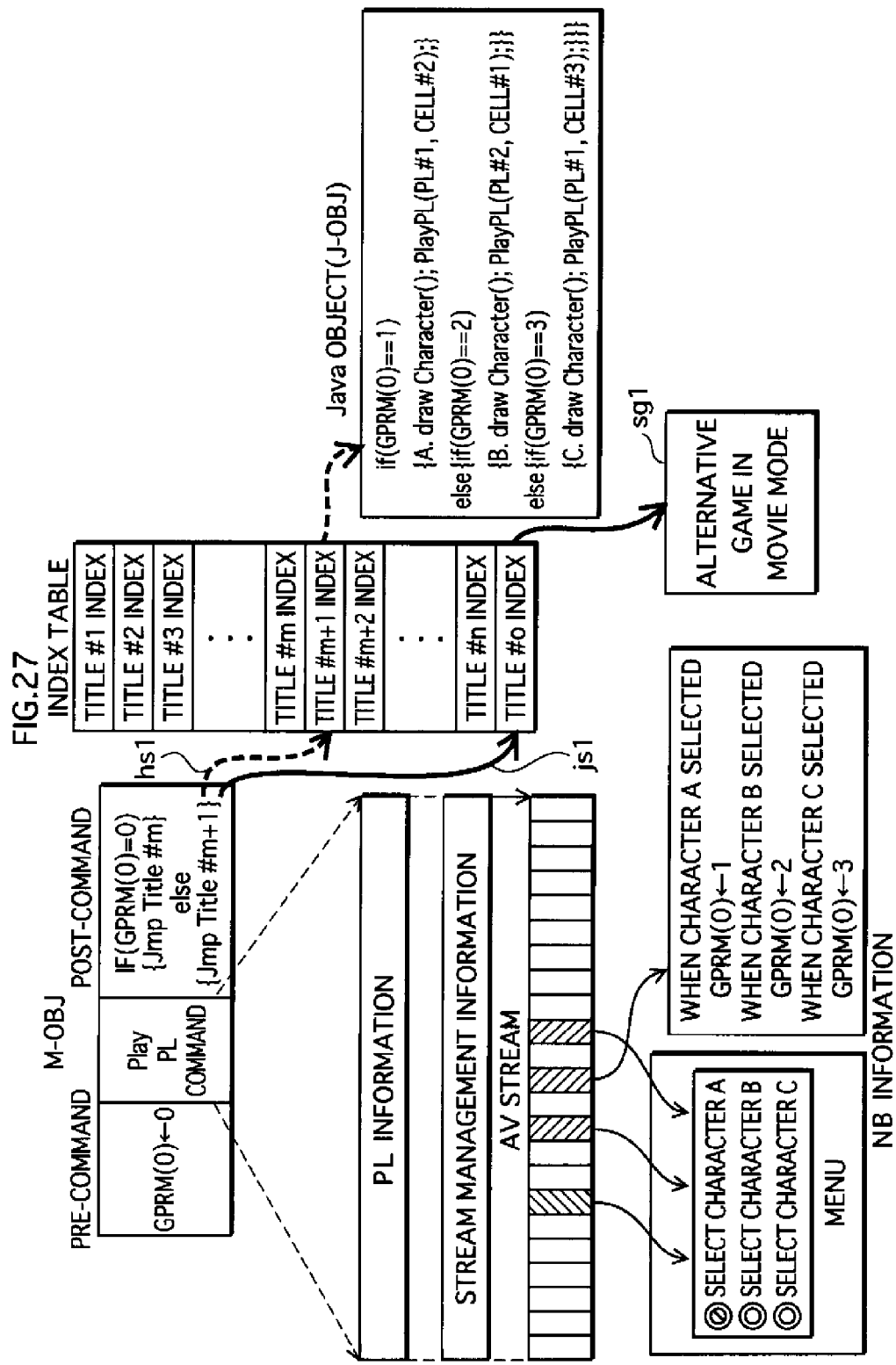
FIG. 27 shows what kind of branching is performed when a BD-ROM having the scenarios shown in FIG. 18 recorded thereon is loaded in a core system playback device.
Figure 28:
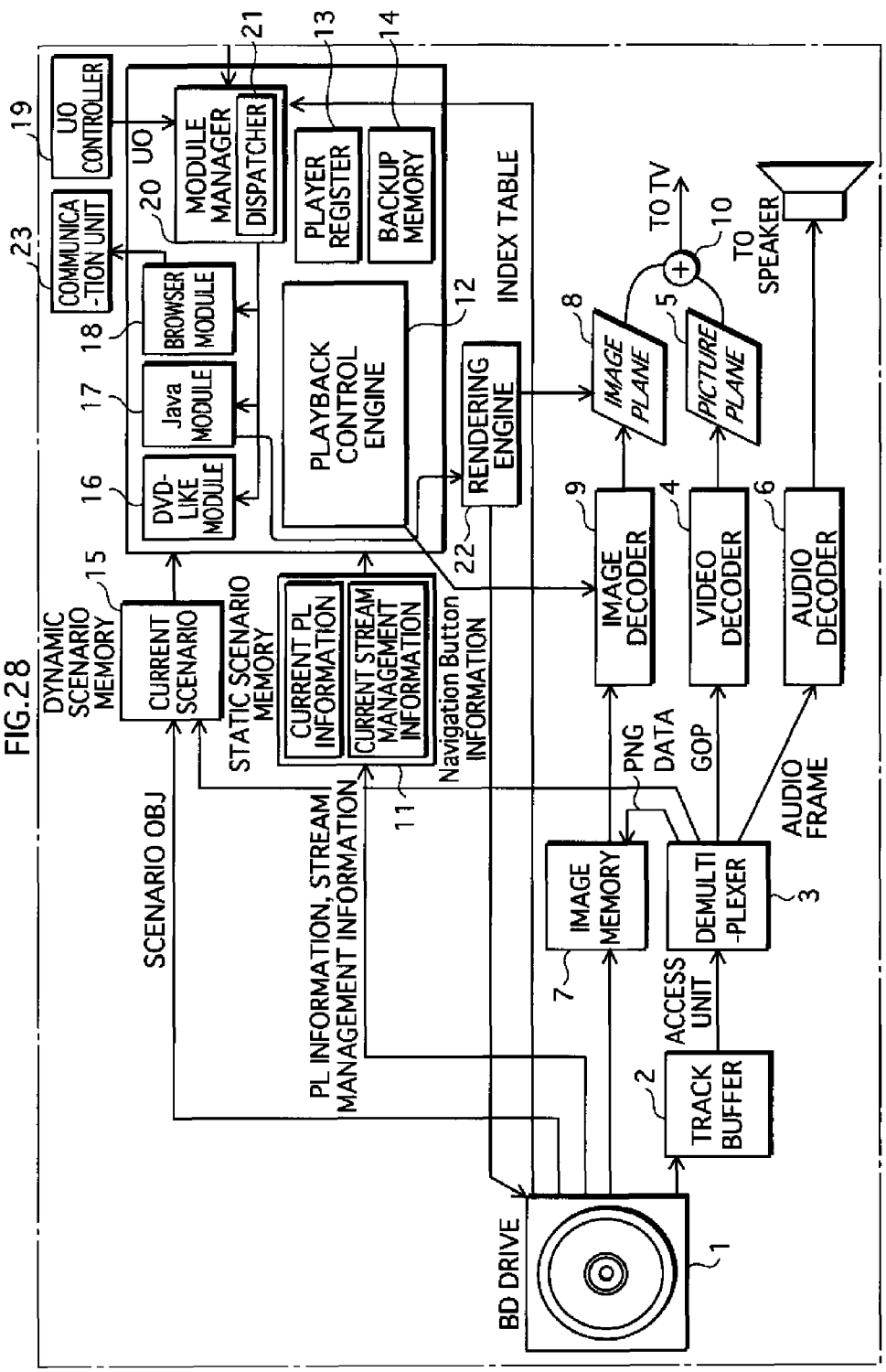
FIG. 28 shows an internal structure of a playback device according to the present invention.

FIG. 27 shows what kind of branching is performed when a BD-ROM having the scenarios, shown in FIG. 18, recorded thereon is loaded in a core system playback device. Depicting the arrows in FIG. 18 using the broken line hs1 in FIG. 27 shows that the branching in FIG. 27 is no longer valid because the core system lacks an element for executing Java objects. The arrow js1 in the figure shows alternative branching in place of the invalid branching. The alternative branching is performed with indirect referencing via the Index of Title#0. The filename of MOVIE object 0 is stored in the Index of Title#0, and MOVIE object 0 is read by the playback device and executed in this branching. Sg1 is a MOVIE object which is executed when branching to MOVIE object 0 is performed. Because a user can implement a game in the MOVIE mode when the BD-ROM is loaded in a core-system playback device, it is possible to avoid causing the user disappointment about Java/Browser modes not being implemented.

Thus concludes an embodiment of the recording medium according to the present invention. The following gives an account of an embodiment of a playback device according to the present invention. FIG. shows an internal structure of the playback device according to the present invention. As shown in the figure, the playback device comprises: a BD-ROM drive 1; a track buffer 2; a demultiplexer 3; a video decoder 4; a picture plane 5; an audio decoder 6; an image memory 7; an image plane 8; an image decoder 9; an adder 10; a static scenario memory 11; a playback control engine 12; a player register 13; a BACKUP memory 14; a dynamic scenario memory 15; a DVD-like module 16; a Java module 17; a BROWSER module 18; a UO controller 19; a module manager 20; a dispatcher 21; a rendering engine 22 and a communication unit 23.

The BD-ROM drive 1 performs loading/ejecting of a BD-ROM, and accesses the loaded BD-ROM.

The track buffer 2 is a FIFO memory that stores ACCESS UNITs read from the BD-ROM on a first-in first-out basis.

The demultiplexer 3 retrieves ACCESS UNITs from the track buffer 2 and demultiplexes these to obtain video and audio frames structuring GOPs, and the video frames are outputted to the video decoder 4 while the audio frames are outputted to the audio decoder 6. A subtitle stream is stored in the image memory 7, and the Navigation Button information is stored in the dynamic scenario memory 15. Demultiplexion performed by the demultiplexer 3 includes conversion processing for converting TS packets into PES packets.

The video decoder 4 decodes the video frames outputted from the demultiplexer 3 and writes pictures in an uncompressed format on the video plane 15.

The picture plane 5 is a memory for storing uncompressed-format pictures.

The audio decoder 6 decodes the audio frames outputted from the demultiplexer 3 and outputs uncompressed-format audio data.

The image memory 7 is a buffer for storing subtitle streams read from BD-ROMs, PNG data in the Navigation Button information, and image files.

The image plane 8 is a memory having a single screen capacity area where expanded subtitle streams, PNG data, and image files are arranged.

The image decoder 9 expands subtitle streams, PNG data, and image files stored in the image memory 7, and writes these to the image plane 8. Various menus and subtitles appear on a screen as a result of decoding subtitle streams.

The adder 10 combines images expanded in the image plane 8 with uncompressed-format picture data stored in the picture plane 5, and outputs the result. An image display shown in FIG. 13B, i.e., a screen display in which a CG image (an owl in the figure) is moving around next to a window showing videos, is outputted as a result of the adder 10 combining images in the image plane 8 and pictures in the picture plane 5.

The static scenario memory 11 is a memory for storing a current PL and current stream management information. A current PL is a PL currently targeted for processing from among plural pieces of PL information recorded on the BD-ROM. Current stream management information is a piece of the stream management information currently targeted for processing from among plural pieces of the stream management information recorded on the BD-ROM.

The playback control engine 12 executes various functions, such as (1) AV playback function, (2) PlayList playback functions, and (3) status-acquisition/setting functions in the playback device. The AV playback functions in the playback device, which consist of a function group similar to that found in DVD and CD players, refer to the execution in response to user operations of processing, such as starting playback (Play); stopping playback (Stop); pausing (Pause-On); releasing a pause (Pause-Off); releasing a still (Still-Off); speed specified fast-forwarding (Forward Play (speed)); speed specified fast-rewinding (Backward Play (speed)); changing audio settings (Audio Change); changing subtitle settings (Subtitle Change); and changing angle settings (Angle Change). The PL playback functions refer to the execution of Play, Stop, and other of the AV playback functions in accordance with PL information. The playback control engine 12 functions as Layer 3 (playback controls based on static scenarios) in the layer model by executing these PL playback functions. The playback control engine 12 executes the AV playback functions in response to user operations. On the other hand, the playback control engine 12 executes functions (2) and (3) in accordance with function calls from the DVD-like module 16, a Java module 17, and a BROWSER module 18. That is, the playback control engine 12 executes its own functions in response to instructions resulting from user operations and instructions from higher-level layers in the layer model.

The player register 13 comprises 32 individual System Parameter Registers and 32 individual General Purpose Registers. The stored values of these registers are used in programming as variables SPRMs and GPRMs. System Parameter Registers and General Purpose Registers are managed by playback control engine 12, which is separate from the DVD-like module 16, Java module 17, and BROWSER module 18. Therefore, it is possible, even when switching in playback modes occurs, for the module that implements the playback mode after the mode-switch to find the playback status of the playback device simply by referring to SPRMs(0)-(31) and GPRMs(0)-(31) in the playback control engine 12.

The BACKUP memory 14 is a stack memory for saving stored values of the playback device register when one of modules 16 to 18 executes Suspend. The stored values of the BACKUP memory 14 are restored to the stored values of the register possessed by the playback device when one of modules 16 to 18 executes Resume in a dynamic scenario. The stored values of the register are stored on a first-in first-out basis in the event that one of modules 16 to 18 performed Suspend more than two times. If the number of stored values is greater than or equal to the number of slots in the stacks, stored values that have been saved are overwritten. SPRMs saved to the BACKUP memory 14 include language codes (Language Code), a number of the current-decoding-target audio stream (Audio Stream Number), a number of the current-decoding-target subtitle stream (Subtitle Stream Number), a number of the angle set by a user (Angle Number), a number of the currently-being-played Title (Title Number), a number of the currently-being-played Chapter, a number of the currently-being-played PL (PlayList Number), a number of the currently-being-played CELL (PlayItem Number), a number of the button in a selected state (SelectedButton), and time information showing the current playback point.

The dynamic scenario memory 15 is a memory storing the current dynamic scenario, and is used for processing by the DVD-like module 16, Java module 17, and BROWSER module 18. The current dynamic scenario is the dynamic scenario currently targeted for processing from among the plurality of scenarios recorded on the BD-ROM.

The DVD-like module 16, which is a DVD virtual player that is the main execution body of the MOVIE mode, executes current MOVIE objects read to the dynamic scenario memory 15.

The Java module 17, which is a Java platform, comprises a Java Virtual Machine, a configuration, and a profile. The Java module 17 creates current Java objects from ZZZ.CLASS in the dynamic scenario memory 15, and executes the current Java Objects. The Java Virtual Machine converts Java objects described in the Java language into native codes for the CPU in the playback device, and has the CPU execute the native codes.

The BROWSER module 18 is a browser that is the main execution body of the Browser mode, and executes current WebPage objects read to the dynamic scenario memory 15. Protocols that the BROWSER module 18 can use include HTTP, IP, ARP, RARP, TCP, telnet, SMTP, and ftp. The DVD-like module 16, Java module 17, and BROWSER module 18 are all resident programs that are preimplemented in the playback device.

The UO controller 19 detects user operations performed with respect to a remote controller and a front panel of the playback device, and outputs detected user operations (hereinafter, "UO") to the module manager 20.

The module manager 20 holds an Index Table read from the BD-ROM and performs mode management and branch controls. The mode management performed by the module manager 20 refers to the allocation of modules; namely which of modules 16 to 18 is to execute dynamic scenarios. The principle of module allocation is that DVD-like module 16 executes dynamic scenarios. This principle is upheld even if in the case of branches resulting from intra-modes (i.e. branches within the same mode). An exception is when inter-mode branching occurs (i.e. branching between different modes). When branching from a MOVIE object to a Java object or a Webpage object occurs, the Java module 17 or BROWSER module 18, respectively, executes the current object.

Branch controls performed by the module manager 20 include identifying branch-destination dynamic scenarios, reading the specified dynamic scenarios to memory, and having one of the DVD-like module 16, Java module 17, and BROWSER module 18 execute the dynamic scenarios. Identification is necessary particularly when branch-destination dynamic scenarios are specified using an indirect referencing format. The identification is carried out by referring to the branch-destination labels of branch commands and retrieving filenames from indexes corresponding to the labels. A judgment as to whether mode switching is necessary is conducted in conjunction with this identification. The judgment on the mode-switching necessity is performed by referring to a file extension stored in the Index corresponding to the branch-destination label. The extension has been set to "MOVIE" when the branch-destination dynamic scenario is the MOVIE mode, the extension has been set to "CLASS" when the branch-destination dynamic scenario is the Java mode, and the extension has been set to "HTML" or "XML" when the branch-destination dynamic scenario is the Browser mode. Thus, the extension stored in the Index reveals whether mode switching is necessary. If mode switching is necessary, the branch-destination dynamic scenario is read to memory, and a mode-transition request is outputted to the module that implements the post-switching mode. As a result of the mode-transition request being outputted, the module implementing the post-switching mode executes the branch-destination dynamic scenario in memory.

The dispatcher 21 chooses only UOs appropriate to the current mode of the playback device, and passes chosen UOs on to the module for implementing the mode. For example, if UOs of "left", "right", "up", "down" or "activate" are received during the execution of the MOVIE mode, the dispatcher 21 outputs those UOs to the module executing the MOVIE mode. This is because these UOs are only required for menu behavior in the MOVIE mode, and are not required by Java and Browser modes.

The rendering engine 22 that has infrastructure software, such as Java3D and OPEN-GL, renders CGs according to instructions from the Java module 17, and outputs the rendered CGs to the image plane 8.

The communication unit 23 executes communication procedures based on TCP/IP according to instructions from BD-ROMs, and accesses websites. Thus concludes the description of the playback device elements. The module manager 20 will now be described in detail.

Figure 29:
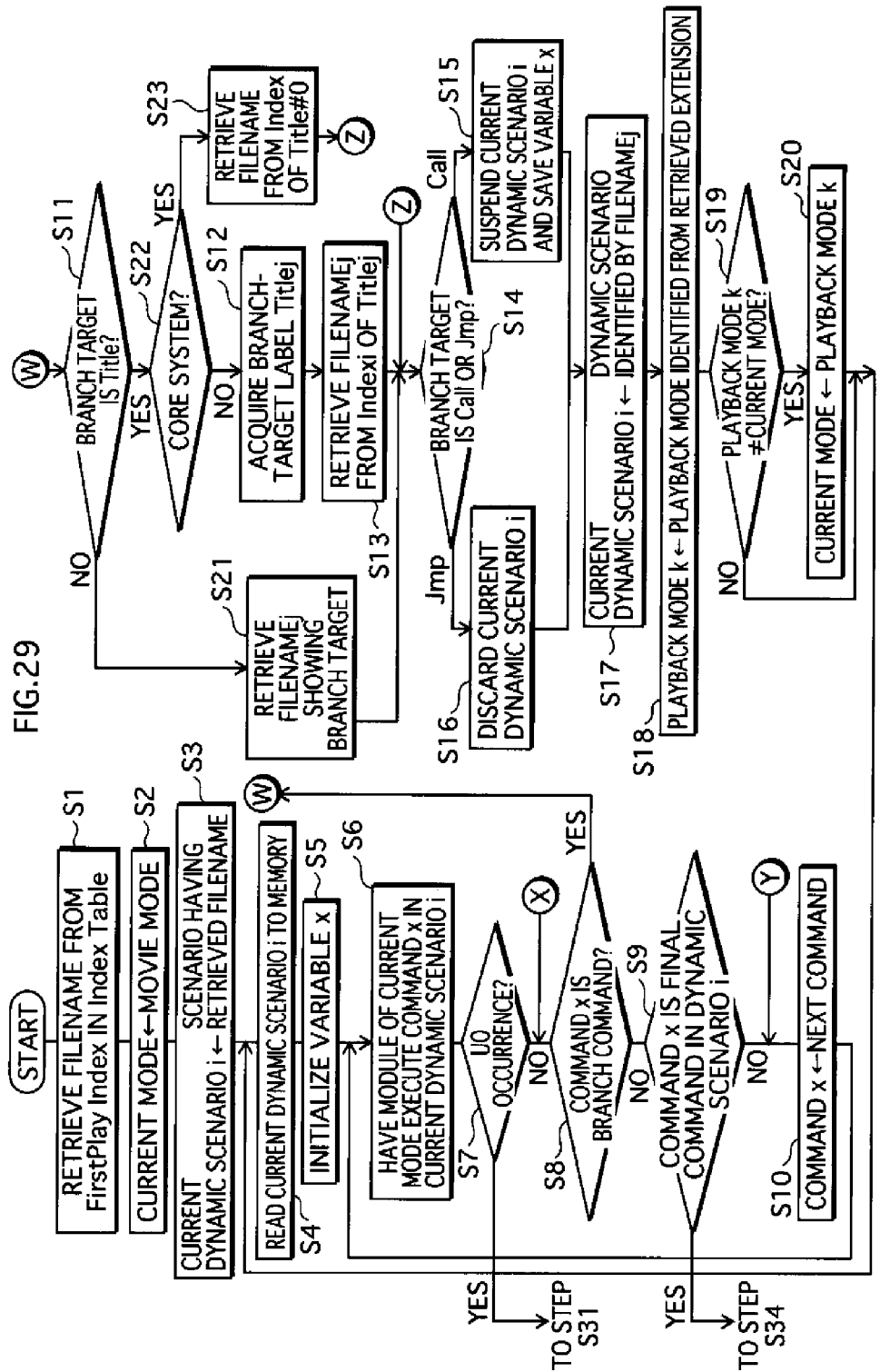
FIG. 29 is a flowchart showing processing procedures performed by a module manager 20.
Figure 30:
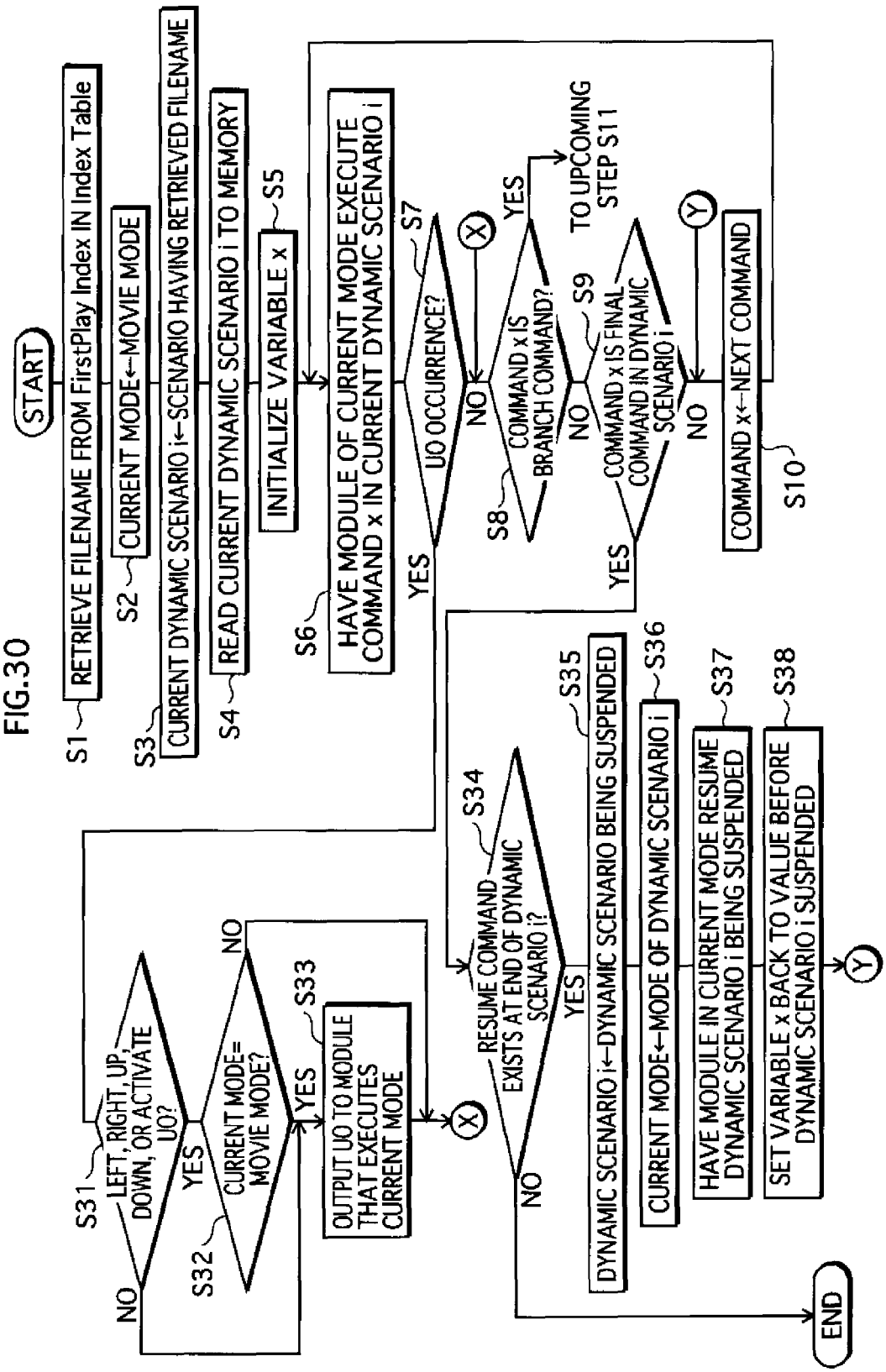
FIG. 30 is another flowchart showing processing procedures performed by the module manager 20.

The module manager 20 can be implemented by having a general purpose CPU read programs for performing the processing procedures shown in FIGS. 29 and 30. FIGS. 29 and 30 are flowcharts showing the processing procedures performed by the module manager 20. Branch controls performed by the module manager 20 will now be described with reference to these flowcharts. In the FIG. 29 flowchart, the module manager 20 retrieves a filename from the FirstPlay Index in the Index Table (Step S1), sets the current mode to the MOVIE mode (Step S2), sets the dynamic scenario having the retrieved filename as the current dynamic scenario (Step S3), reads the current dynamic scenario i to memory (Step S4), and executes the current dynamic scenario in memory (Steps S5 to S10).

Steps S4 to S10 are executed whenever the current dynamic scenario is newly set.

Steps S5 to S10 form a loop process in which the processing of Steps S6 to S10 is repeated for each command structuring a scenario. The "x" in the flowcharts is a variable that identifies processing targets from among the commands structuring a dynamic scenario. The loop process involves initializing variable x (Step S5), having the module of the current mode execute the command x in the current dynamic scenario i (Step S6), performing the judgment processing defined in Steps S7 and S8, and then incrementing the variable x (Step S10), before returning to Step S6. Since processing of returning to Step S6 with an increment of the variable x is repeated, the processing of Steps S6 to S10 is repeated for all of the commands structuring the scenario. If a UO occurs during execution of the loop process (Step S7), the module manager 20 executes UO dispatch processing (Steps S31 to S33 in FIG. 30), and then returns to Step S8. UO dispatch processing is that, when a UO occurred during command execution is one of "left", "right", "up", "down" or "activate" (Step S31) and the current mode is the MOVIE mode (Step S32), the UO is outputted to the module that executes the current mode. When a UO occurred during command execution is a UO other than "left", "right", "up", "down" and "activate", the UO is directly outputted to the module that executes the current mode (Step S33). When a UO occurred during command execution is a UO other than "left", "right", "up", "down" and "activate", but the current mode is not the MOVIE mode, the occurred UO is not outputted to the module. Thus concludes the description of dispatch processing.

While the dispatch processing is performed, processing of Steps S6 to S10 is repeated. In the loop process of Steps S6 to S10, switching of the current dynamic scenario that is a processing target is performed when judgment in Step S8 is YES. Step S8 is a judgment of whether the command x is a branch command. If Step S8 is YES, the module manager 20 returns to Step S4 after setting the current dynamic scenario to a new dynamic scenario in Steps S11 to S20. Herewith, the new dynamic scenario will be read to memory and executed.

Processing of Steps S11 to S23 will be now described below. This processing involves branch controls, and differs depending on the judgment results of Steps S11, S14, S19, and S22. Step S11 is a judgment of whether a branch destination shown by a branch command is described using a Title label. If YES, the module manager 20 acquires the branch-destination label Titlej (Step S12) after going through the Step S22 judgment, and retrieves filenamej from Indexi of Titlej in the Index Table (Step S13). If NO, the module manager 20 retrieves filenamej showing the branch destination (Step S21).

Step S14 is a judgment of whether the branch command is a Call command or a Jmp command. If a Call command, the module manager 20 suspends the current dynamic scenario i and saves the variable x (Step S15). If a Jmp command, the module manager 20 discards the current dynamic scenario i (Step S16).

Having passed through the above processing, the module manager 20 sets the dynamic scenario identified from filenamej as the current dynamic scenario i (Step S17), and sets the playback mode identified from the retrieved extension as playback mode k (Step S18). After these settings, the module manager 20 executes Step S19. Step S19 is a judgment of whether the playback mode k is the current mode. If not the same, the module manager 20 set the playback mode k as the current playback mode (Step S20), and transfers to Step S4. After that, the processing of Steps S4 to S10 is repeated with respect to the newly set current dynamic scenario. Step S22 is a judgment of whether the playback device is a core system or a full system, and if a core system, the module manager 20 retrieves the filename from Index of Title#0, and sets this as the branch destination (Step S23).

The requirement for ending the loop process of Steps S4 to S10 is that a judgment in Step S9 be YES. If the command x is the final command in the dynamic scenario i (Step S9: YES), a judgment is conducted as to whether a Resume command exists at the end of the dynamic scenario i (Step S34). If NO, the processing shown in the flowcharts is terminated. If there is a Resume command attached at the end of the dynamic scenario i, the module manager 20 sets the suspended dynamic scenario as dynamic scenario i (Step S35), sets the mode of the dynamic scenario i as the current mode (Step S36), has the module in the current mode resume the dynamic scenario i being suspended (Step S37), sets the variable back to a value before the dynamic scenario i suspended (Step S38), and then transfers to just before Step S10 of the loop process composed of Steps S6 to S10. Thus concludes the description of processing procedures performed by the module manager 20.

Figure 31:
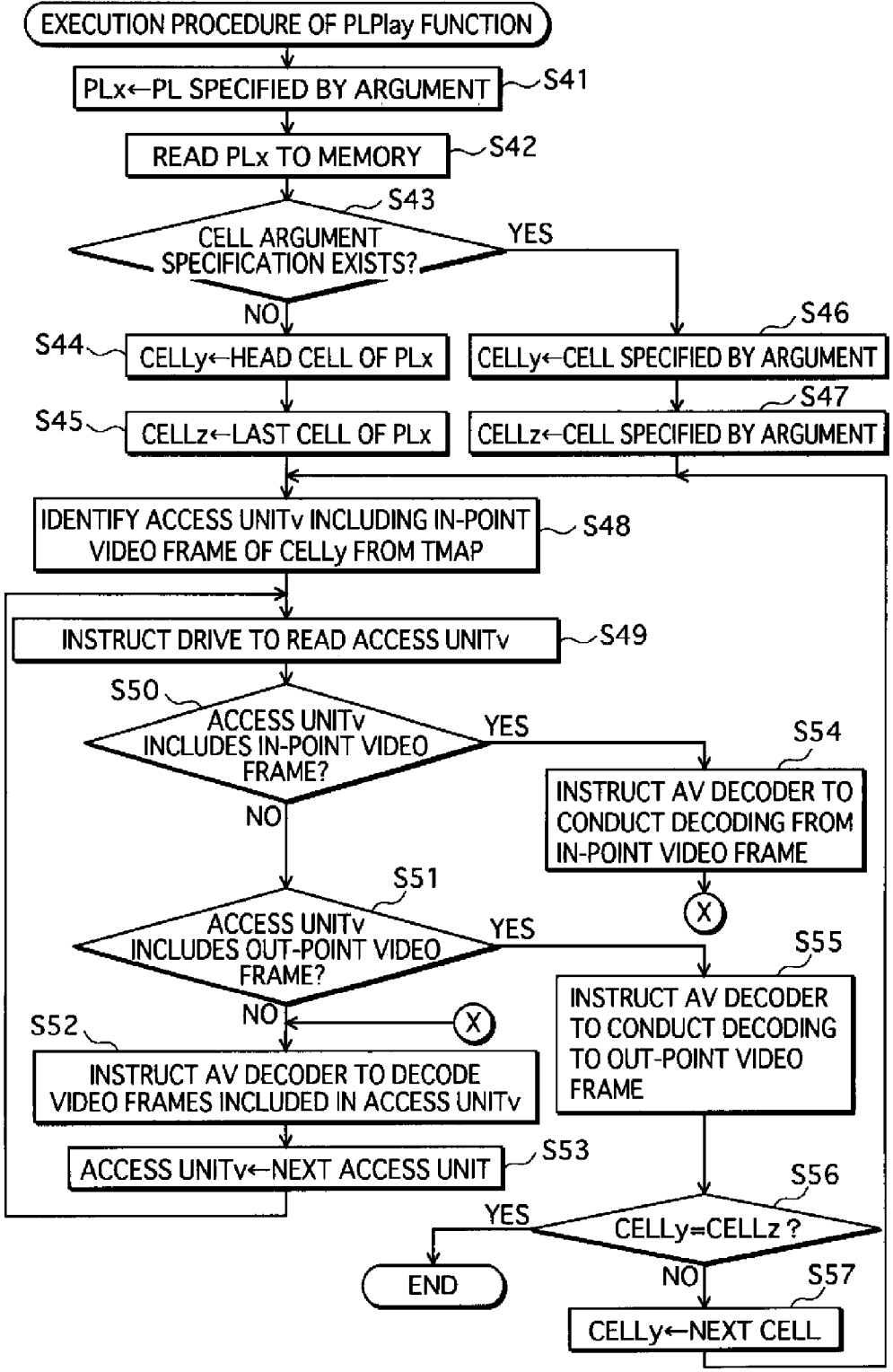
FIG. 31 is a flowchart showing an execution procedure of a PLPlay function performed by a playback control engine 12.

The playback control engine 12 can be implemented by having a general purpose CPU read programs for performing the processing procedures shown in FIG. 31. FIG. 31 is a flowchart showing execution procedures of a PLPlay function performed by the playback control engine 12. In the flowchart, a processing target PL is denoted as "PLx", a processing target CELL is denoted as "CELLy", a processing target ACCESS UNIT as "ACCESS UNITv". The flowchart comprises the following procedures: setting the PL specified by an argument of the PLPlay function as PLx (Step S41), reading PLx to memory (Step S42), identifying the processing target CELL (Steps S43 to S47), and reading the ACCESS UNITs structuring the CELL (Steps S48 to S51).

Step S43 is a judgment of whether there is a CELL argument specification. If there is no argument specification, the playback control engine 12 sets CELLy as the head CELL of PLx (Step S44), and sets CELLz as the last CELL of PLx (Step S45). CELLz is a CELL for specifying the end of the reading range.

If there is an argument specification, the playback control engine 12 sets CELLy to the argument specified CELL (Step S46), and sets CELLz to the same argument specified CELL (Step S47). Both CELLy and CELLz are set to the argument specified CELL because it is only necessary to read this CELL in the case of a CELL being specified by an argument.

Steps S48 to S53 show the reading of ACCESS UNITs structuring CELLy, and a decoding procedure. This procedure involves: identifying ACCESS UNITv including the In-point video frame of CELLy from TMAP (Step S48); instructing the BD-ROM drive 1 to read ACCESS UNITv (Step S49); instructing the video decoder 4 to decode the video frames included in ACCESS UNITv (Step S52) after going through judgments of Steps S50 and S51; and setting ACCESS UNITv to the next ACCESS UNIT (Step S53). After that the processing of Steps S49 to S53 is repeated for all of the ACCESS UNITs belonging to CELLy.

Step S50 is a judgment of whether ACCESS UNITv includes the IN-point video frame. If the In-point video frame is included (Step S50: YES), the playback control engine 12 directs the video decoder 4 to conduct decoding from the In-point video frame to the last vide frame of ACCESS UNITv (Step S54), and transfers to Step S52.

Step S51 is a judgment of whether Out-point v includes the Out-point video frame of CELLy. If the Out-point video frame is included (Step S51: YES), the playback control engine 12 instructs the video decoder 4 to conduct decoding from the head video frame to the Out-point video frame in ACCESS UNITv (Step S55), and conducts a judgment of Step S56. Step S56, which is the final judgment in the flowchart, judges whether CELLy is now CELLz. If Step S56 is YES, the playback control engine 12 terminates the flowchart. Otherwise, the playback control engine 12 sets CELLy to the next CELL (Step S57) before returning to Step S48. After that, the processing of Steps S48 to S57 is repeated until the judgment of Step S56 becomes YES. Thus concludes the description of the processing procedures performed by the playback control engine 12.

Since it is possible to have playback devices execute, in the enhanced modes, games and the like that harnesses characteristic features of Java Virtual Machines and browsers, the present embodiment as described above is able to enhance the added value of actual video data. In addition, since the branch destination is specified by indirect referencing via a table in the event of branching from the MOVIE mode to the enhanced mode, it is possible to realize the operation of changing branch destinations of when BD-ROMs are loaded on playback devices having a Java Virtual Machine and a browser from those of when they are loaded on playback devices not having those applications by designing description contents of the table. As a result of the change in branch targets, it is possible to close a path for branching to enhanced-mode programs when the BD-ROM is loaded on core system playback devices not having a Java Virtual Machine and a browser, and thus operation assurance of the recording medium according to the present invention can be realized for any type of playback devices.

2. Second Embodiment

The first embodiment provides an explanation of the Java object that takes over a register setting value set in a MOVIE object and performs an operation. On the other hand, a second embodiment describes a Java object that executes PL playback and performs various playback controls in synchronization with the PL playback.

Figure 32:
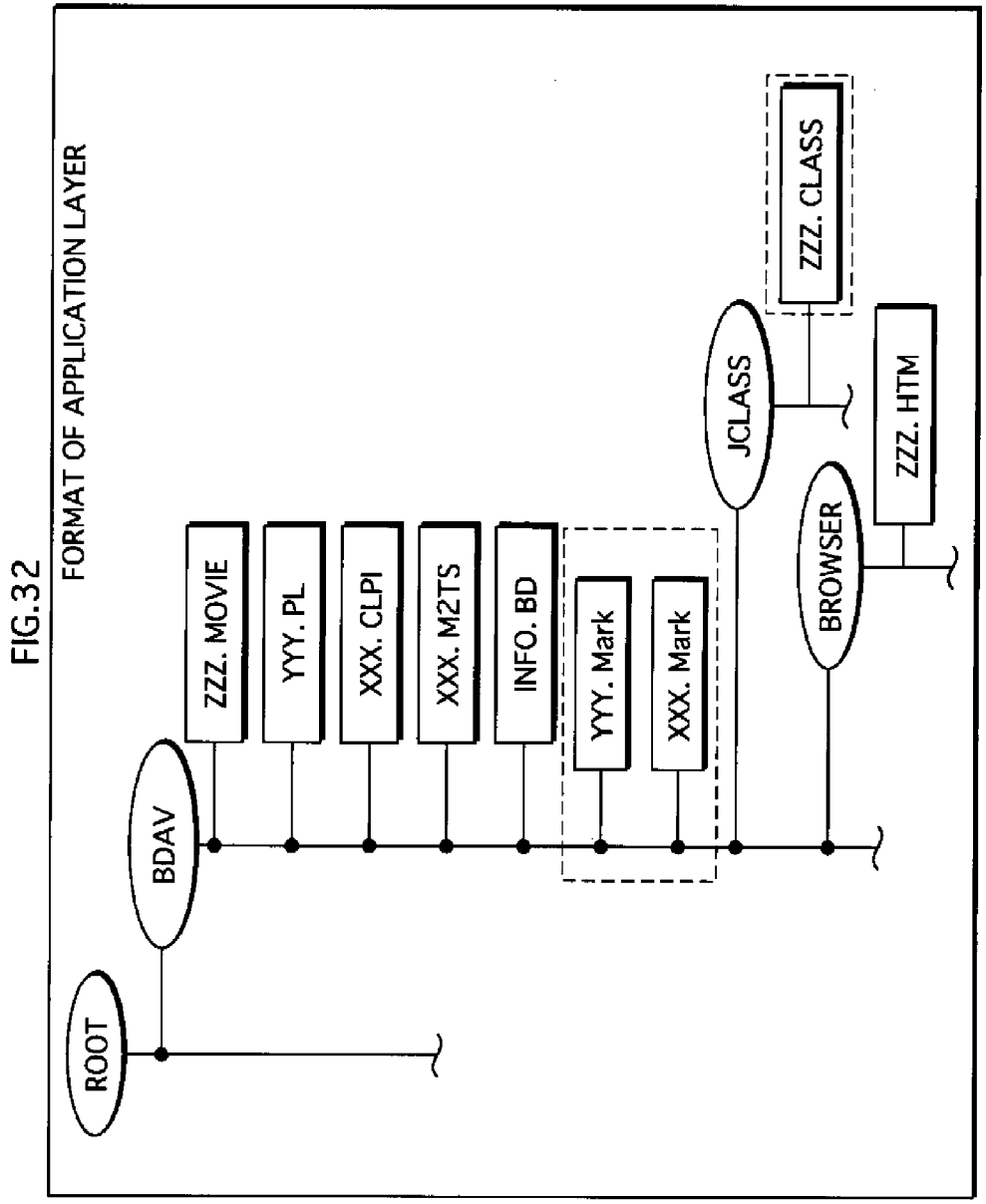
FIG. 32 shows a file structure of a BD-ROM according to a second embodiment.

FIG. 32 shows a file structure of a BD-ROM according to the second embodiment. What is new in the figure is that YYY.Mark (PLMark) and XXX.Mark (ClipMark) have been added.

PLMarks are information indicating sections that a playback device is to perform extended controls during PL playback. For the filename "YYY" in YYY.Mark, a name the same as that of the PL to which the PLMark corresponds is used. That is, the filename of the PLMark in the figure being "YYY" indicates that the PLMark corresponds to the PL (YYY.PL).

ClipMarks are information indicating sections that a playback device is to perform extended controls during AV stream playback. For the filename "XXX" in XXX.Mark, a name the same as that of the AV stream to which the ClipMark corresponds is used. That is, the filename of the ClipMark in the figure being "XXX" indicates that the ClipMark corresponds to the AV stream (XXX.M2TS).

The difference between ClipMarks and PLMarks is described below. ClipMarks specify sections for extended controls with respect to AV streams, while PLMarks specify sections with respect to PLs.

For example, in the case when two pieces of PL information are defined for one AV stream as shown in FIG. 11, if an extended control section is specified by a ClipMark, this specification works on both pieces of the PL information specifying the AV stream. On the other hand, if an extended control section is specified by a PLMark, the extended control specification works only on a PL corresponding to the PLMark. If a PL corresponding to the PLMark is PL#1, the specification works only on PL#1, and does not work on PL#2. In other word, when the extended control section is specified by a ClipMark, all PLs included in the AV stream are subject to the ClipMark, while when the extended control section is specified by a PLMark, only a PL corresponding to the PLMark is subject to the PLMark. This is the difference between ClipMarks and PLMarks.

Figure 33:
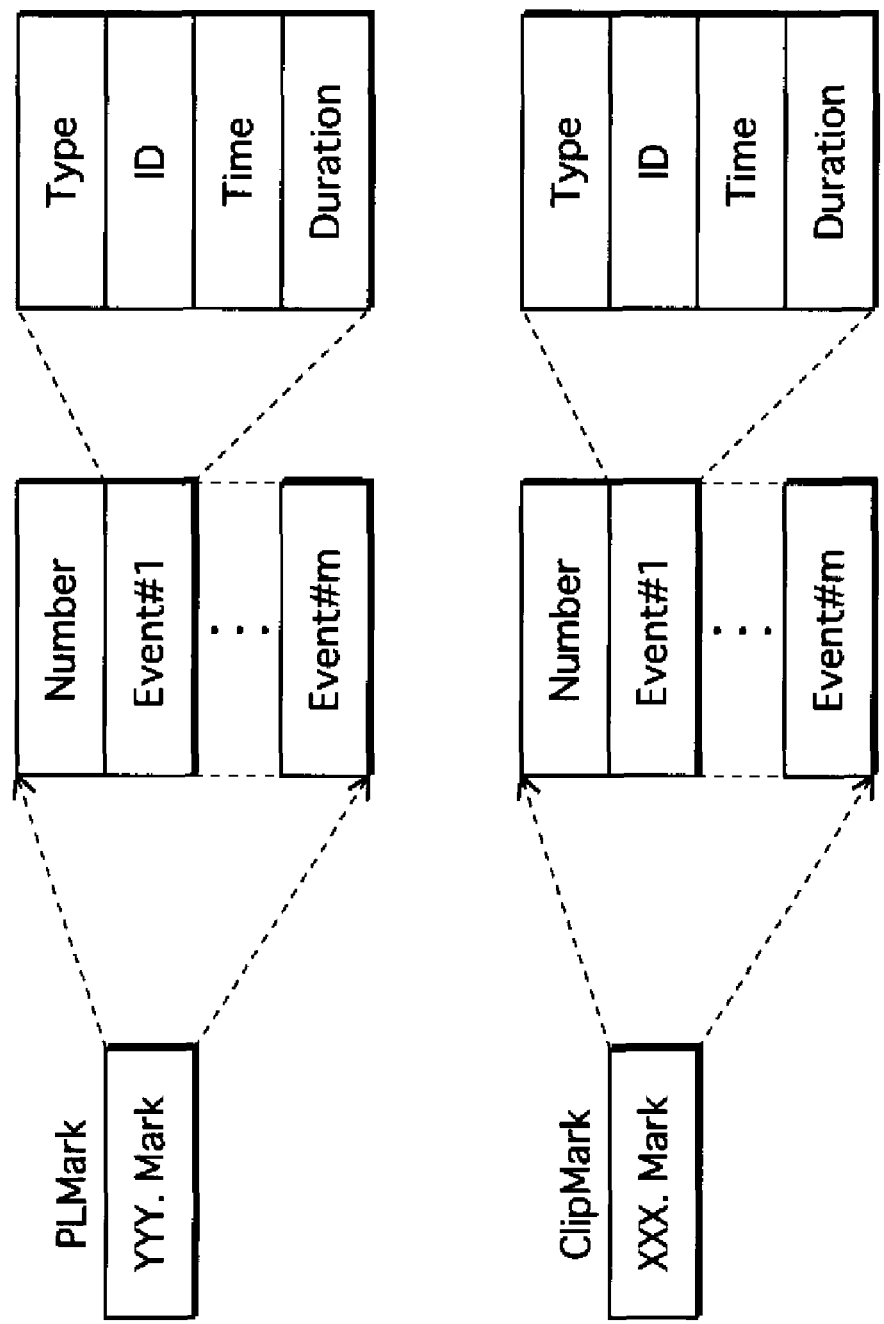
FIG. 33 shows a data structure common to a PLMark and a ClipMark.

Extended controls in the present embodiment involve generating events in a playback device. In order to generate events, PLMarks and ClipMarks have a common data configuration shown in FIG. 33. FIG. 33 shows a data structure common to a PLMark and a ClipMark. As shown in the figure, a PLMark, which comprises the number of events (Number) and individual events (Event#1-Event#m), defines events to be generated during playback. Each event (Event#) shows a type of event (Type), an event ID (ID), a time when the event occurs (Time), and a duration of the time period when the event is valid (Duration).

Events defined with such a data configuration include TimeEvents and UserEvents. A TimeEvent is an event that occurs when the current playback position reaches a predetermined point of time T on the time axis of PL playback. A UserEvent is an event that occurs when the current playback position reaches a predetermined time period and an operation is carried out by a user during the time period.

Figure 34A:
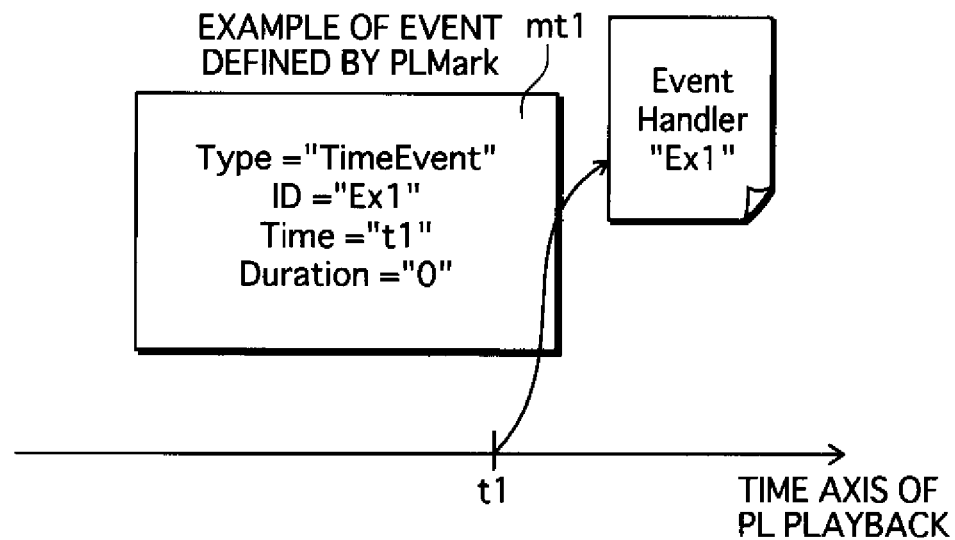
FIGS. 34A and 34B show exemplified descriptions of PLMarks for defining TimeEvents appearing during playback of PL#1.

How to describe a PLMark for defining a TimeEvent that appears during playback of PL#1 is explained with reference to FIG. 34A. The time axis at the bottom of the figure shows a time axis of PL#1 playback. Here, assume the case where TimeEventEx1 that occurs at Time t1 on the time axis is defined. PLMarkmt1 in the figure is an exemplified description of the PLMark for defining a TimeEvent. As to the PLMark, the Type item is described as "TimeEvent", the ID item is described as "Ex1", the Time item is described as "t1", and the Duration item is described as The arrow in the figure shows the TimeEvent occurring when Time t1 is reached. As a result of the TimeEvent occurrence, the event handler in the figure is driven.

Figure 34B:
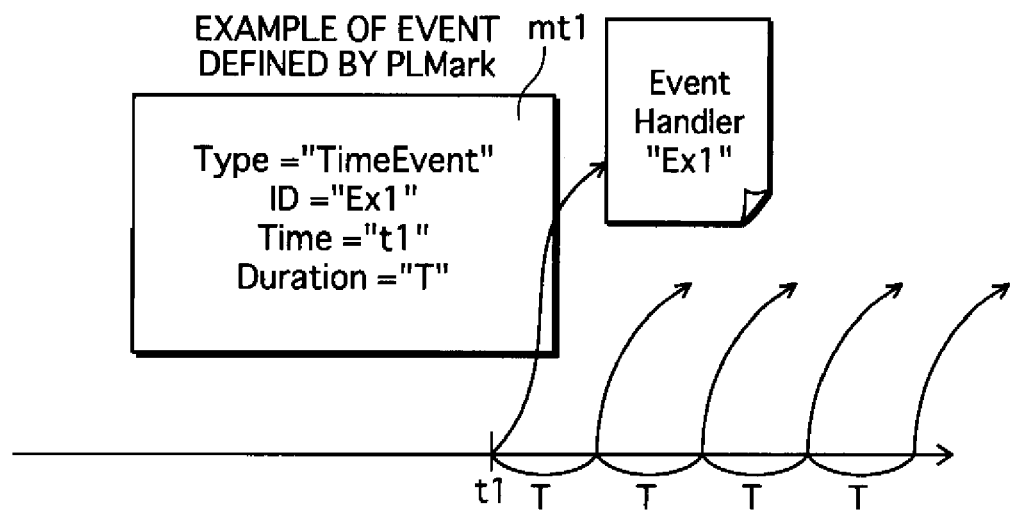

On the other hand, FIG. 34B shows an exemplified description of a PLMark for generating a TimeEvent at intervals of T from Time t1 on the time axis. FIG. 34B differs from FIG. 34A in the Duration item of the PLMark is described as "T". With the description in the Duration item, the TimeEvent is generated at intervals of T after Time t1.

Figure 35:
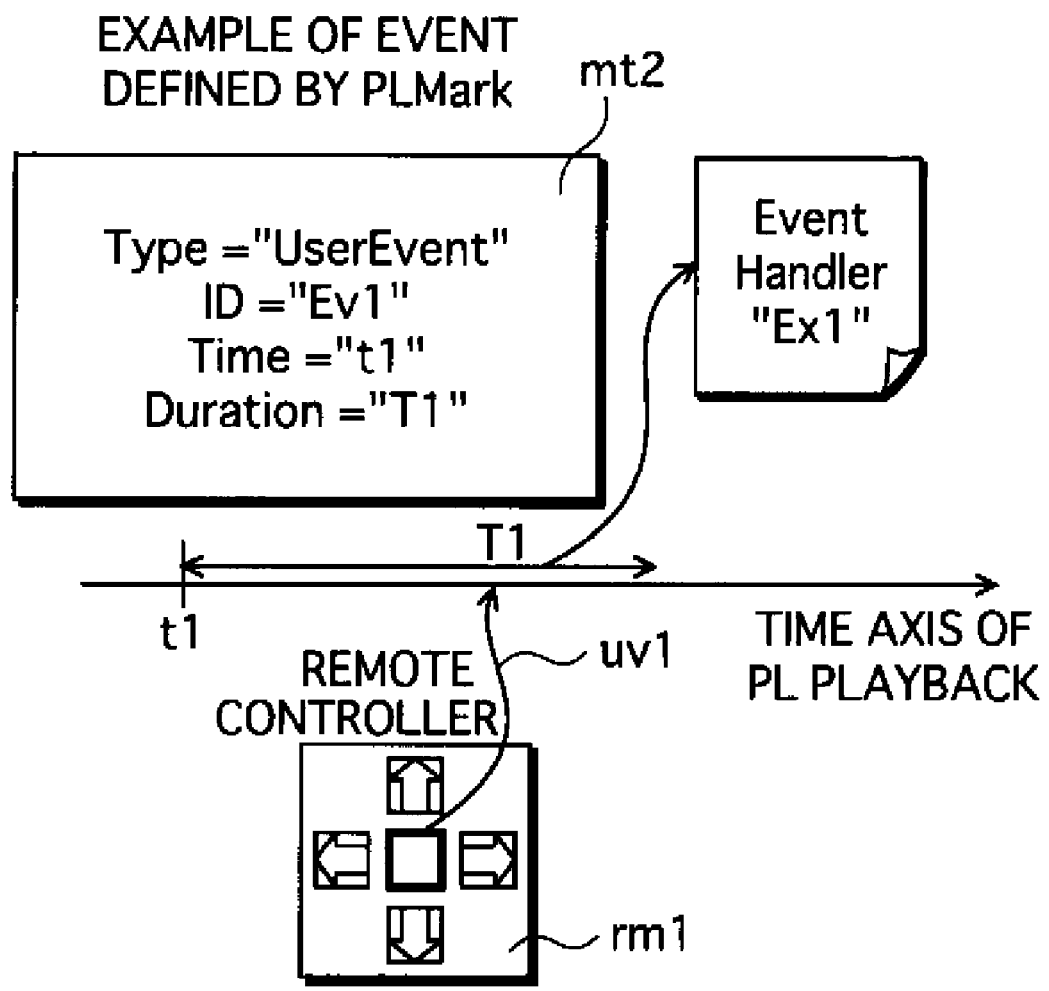
FIG. 35 shows an exemplified description of a PLMark for defining a UserEvent during playback of PL#1.

How to describe a PLMark for defining a UserEvent during PL#1 playback is explained with reference to FIG. 35. The time axis shown in the middle of the figure shows a playback time axis for PL#1 playback. The current playback point on the time axis is shown in SPRM(10). Here, assume a case where UserEventEv1 that becomes valid for a time period T1 from Time t1 on the time axis is defined. PLMarkmt2 in the figure is the PLMark that defines the UserEvent. As to the PLMark, the Type item is described as "UserEvent", the ID item is described as "Ev1", the Time item is described as "t1", and the Duration item is described as "T1". The remote controller rm1 in the figure is a device for receiving user operations, and the arrow uv1 indicates a UO that occurs in response to a push down of the ENTER key on the remote controller. When a UO occurs during the time period T1 from Time t1, UserEventEv1 occurs based on the UO. As a result of the UserEvent, the event handler in the figure is driven. Thus concludes the description of events defined by PLMarks. Here, a description of events defined by ClipMarks is omitted. Because ClipMarks define events that occur during AV stream playback whereas PLMarks defining events that occur during PL playback, event definitions of ClipMarks are not very different from those of PLMarks.

Figure 36:
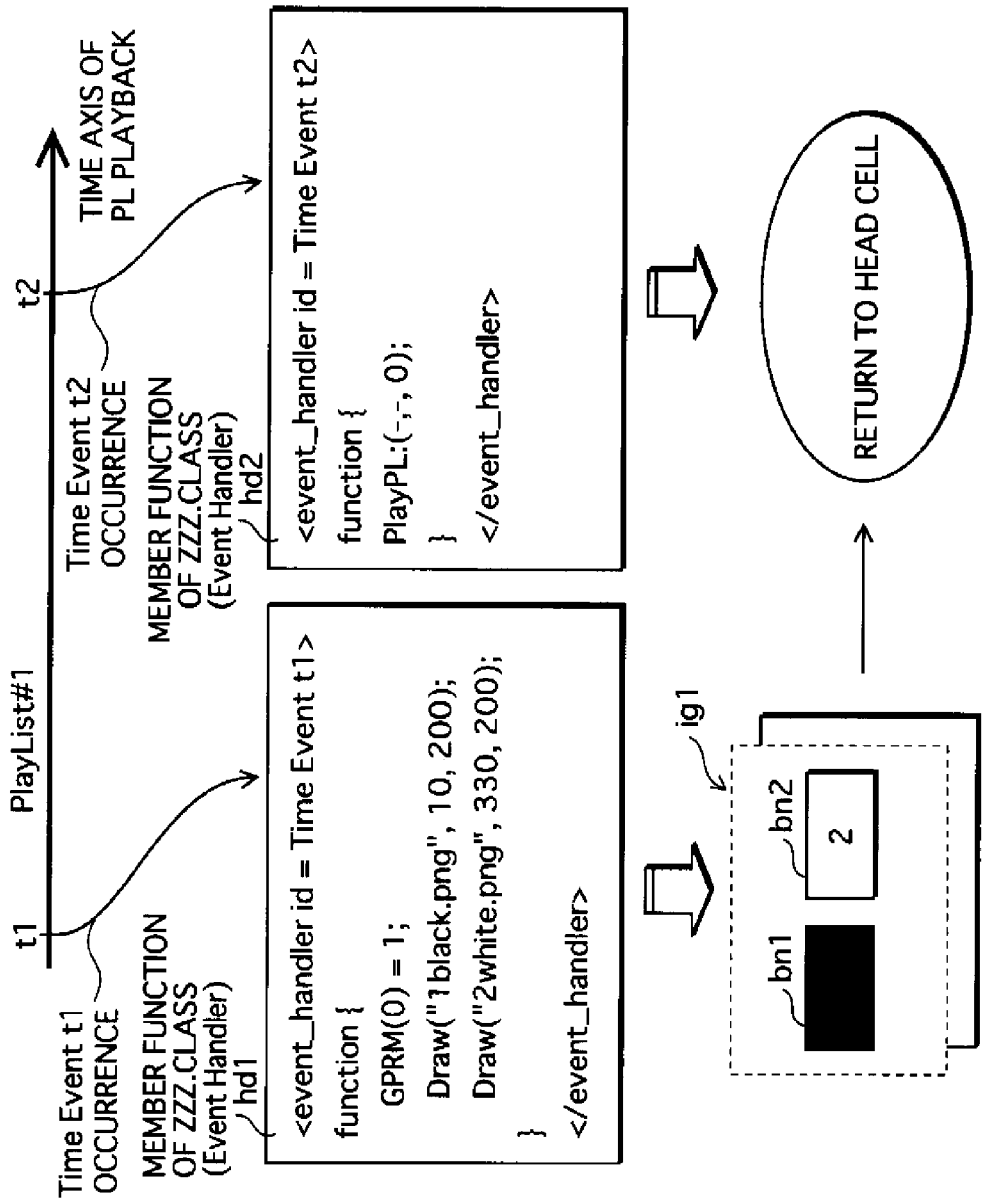
FIG. 36 shows examples of event handlers driven by TimeEvents.

Next is described a Java object according to the second embodiment. A member function of ZZZ.CLASS in the second embodiment is an event handler driven by events generated by a playback device during PL playback. The following describes event handlers, which are member functions of Java objects, with the aid of specific examples. FIG. 36 shows examples of event handlers driven by TimeEvents, while FIG. 37 shows an example of an event handler driven by a UserEvent.

Figure 37:
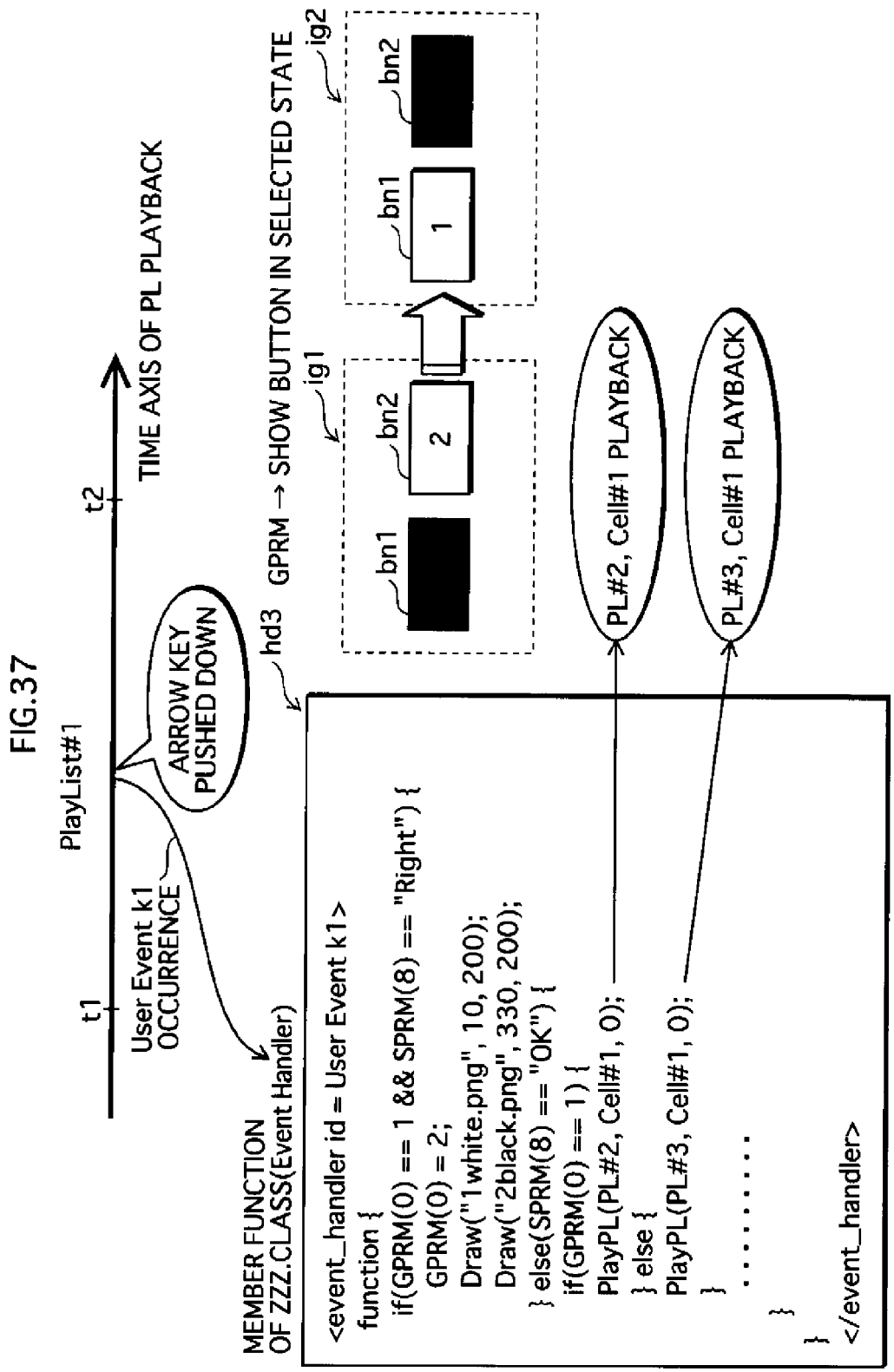
FIG. 37 shows an example of an event handler driven by a UserEvent.

In the exemplified descriptions shown in FIGS. 36 and 37, decoding of image data shall be performed using the following rendering function.

Rendering function: rendering PNG data in the image plane
  Draw(File, X, Y)
  File: a filename storing the PNG data
  X: X-coordinate
  Y: Y-coordinate
Image-plane-clear function: clearing a specified area in the image plane
  Clear (X, Y, W, H)
  X: X-coordinate
  Y: Y-coordinate
  W: width in the X direction
  H: width in the Y direction The handler hd1 in FIG. 36 is a handler for executing function{GPRM(0)=1; . . . Draw("2white.png", 330, 200);} when TimeEvent t1 occurs. TimeEvent t1 is an event that occurs immediately after the start of PL#1 playback (this is called Time t1). The function of the to GPRM(0), (GPRM(0)=1); rendering "1black.png" at the coordinates (10, 200), (Draw(1black.png,10,200)); and rendering "2white.png" at the coordinates (330, 200), (Draw(2white.png.330,200)). "1black.png" is image data of a button in selected state. "2white.png" is image data of a button in normal state. The graphic image ig1 in FIG. 36 is a graphic image rendered by the event handler in the figure. The buttons bn1 and bn2 in the figure are obtained by decoding "1black.png" and "2white.png", respectively. GPRM(0) indicates which button of these two is in selected state. GPRM(0) being set to "1" means that, of the buttons bn1 and bn2, the button bn1 is set in selected state.

The handler hd2 is a handler for executing function{PlayPL:(-,-,0);} when TimeEvent t2 occurs. TimeEvent t2 is an event that occurs immediately before the end of PL#1 playback (this is called Time t2). The function of the handler hd2 involves executing "PlayPL(-,-,0)". "(-,-,0)" means "from the head Cell of the PL being currently played".

The handler hd3 in FIG. 37 is a handler driven when a UserEvent occurs during PL#1 playback. "<event handler id=UserEvent k1>" of the handler hd3 indicates that the content following "function{" is executed when UserEvent k1 occurs.

The content following "function{" is composed of two IF statements. The conditional expression of the first IF statement sets forth a condition of GPRM(0) being "1" and SPRM(8) being Right, (GPRM(0)==1 && SPRM(8)==Right). When the condition is true, "2" will be set to GPRM(0), (GPRM(0)=2;); "1white.png" is rendered at the coordinates (10, 200), (Draw(1white.png,10,200)); and "2black.png" is rendered at the coordinates (330, 200), (Draw(1black.png, 330,200).

The image ig2 in FIG. 37 is an image rendered when the condition is true. When the condition of the IF statement is true, the right button bn2 is set in selected state as the image jg2. The graphic image ig1 of FIG. 36 is shown next to the image jp2. The comparison of these images reveals that the event handler switches buttons in selected state according to the UserEvent occurrence.

The ELSE clause in the IF statement involves judging whether or not the condition of SPRM(8) being OK is true. If the condition is true, the second IF statement will be executed.

The condition of the second IF statement, which is "(GPRM(0)==1)", is true, the IF statement executes playback of Cell#1 in PL#2 from the beginning, (PlayPl(PL#2,Cell#1, 0)). If the condition is false, the IF statement executes playback of Cell#1 in PL#3 from the beginning, (PlayPl(PL#3, Cell#1,0)).

Figure 38:
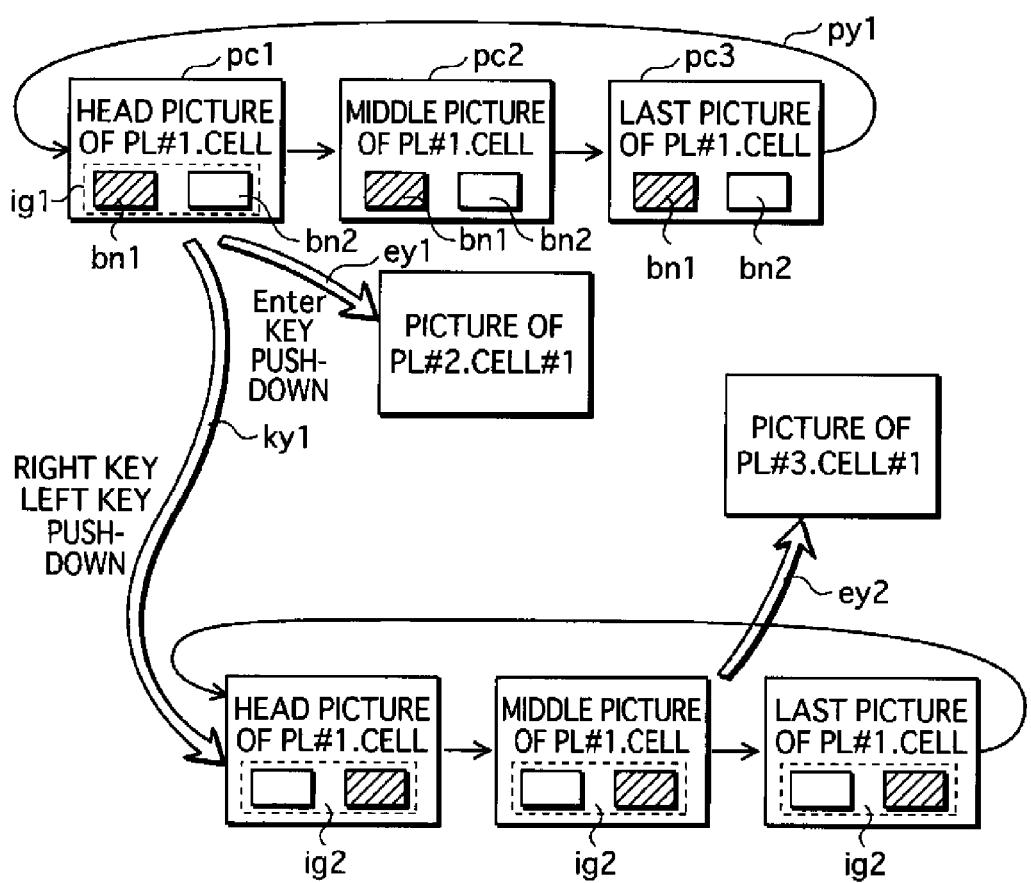
FIG. 38 shows conditional branching as a result of event handlers by combining pictures played in the PLs and images rendered by the event handlers of FIGS. 36 and 37.

FIG. 38 shows conditional branching as a result of event handlers by combining pictures played in the PLs and images rendered by the event handlers of FIGS. 36 and 37. Since the event handler driven by TimeEvent t1 is a handler for combining buttons with pictures, the image ig1 (including the buttons bn1 and bn2) is combined with respect to the first picture pc1, the middle picture pc2, and the last picture pc3 in the PL, and the combined images are displayed. Since the event handler driven by TimeEvent t2 is a handler for returning to the beginning of the Cell after the last picture data of the Cell in the PL is played, the first picture data is displayed, as indicated by the arrow py1, after the last picture data is displayed, and the buttons are combined with the first picture data. Unless there is a user operation, display of such combined images is repeated. If a UserEvent occurs as a result of a push down on an arrow key by a user, as indicated by ky1, the image jg2 is combined with each picture structuring the AV stream, instead of image ig1.

If a user pushes the Enter key down while the image ig1 is displayed, "PlayPL(PL#2,Cell#1,0)" in the event handler hd3 is executed, as indicated by the arrow ey1, to play Cell#1 in PL#2.

If a user pushes the Enter key down while the image ig2 is displayed, "PlayPL(PL#3,Cell#1,0)" in the event handler hd3 is executed to play Cell#1 in PL#3 as indicated by the arrow ey2.

The use of event handlers allows to easily describe a playback procedure in which a single Cell is repeatedly played until a user operation is conducted, and branching is performed according to a button as a result of a user operation.

With the use of such event handlers, controls similar to menu behavior realized in DVDs can be readily described by using the Java language that programmers are used to writing in. With a further development of the event handlers, it is possible to realize elaborated menu display where CGs operate in place of buttons, for example. Accordingly, the range of expressions involved with movie productions will be expanded.

Thus concludes the description of the improvement in Java objects according to the second embodiment. Next are described improvements in the playback device according to the present embodiment. In order to generate TimeEvents and UserEvents described above, it is preferable to have the playback control engine 12 conduct processing procedures as shown in FIG. 39.

Figure 39:
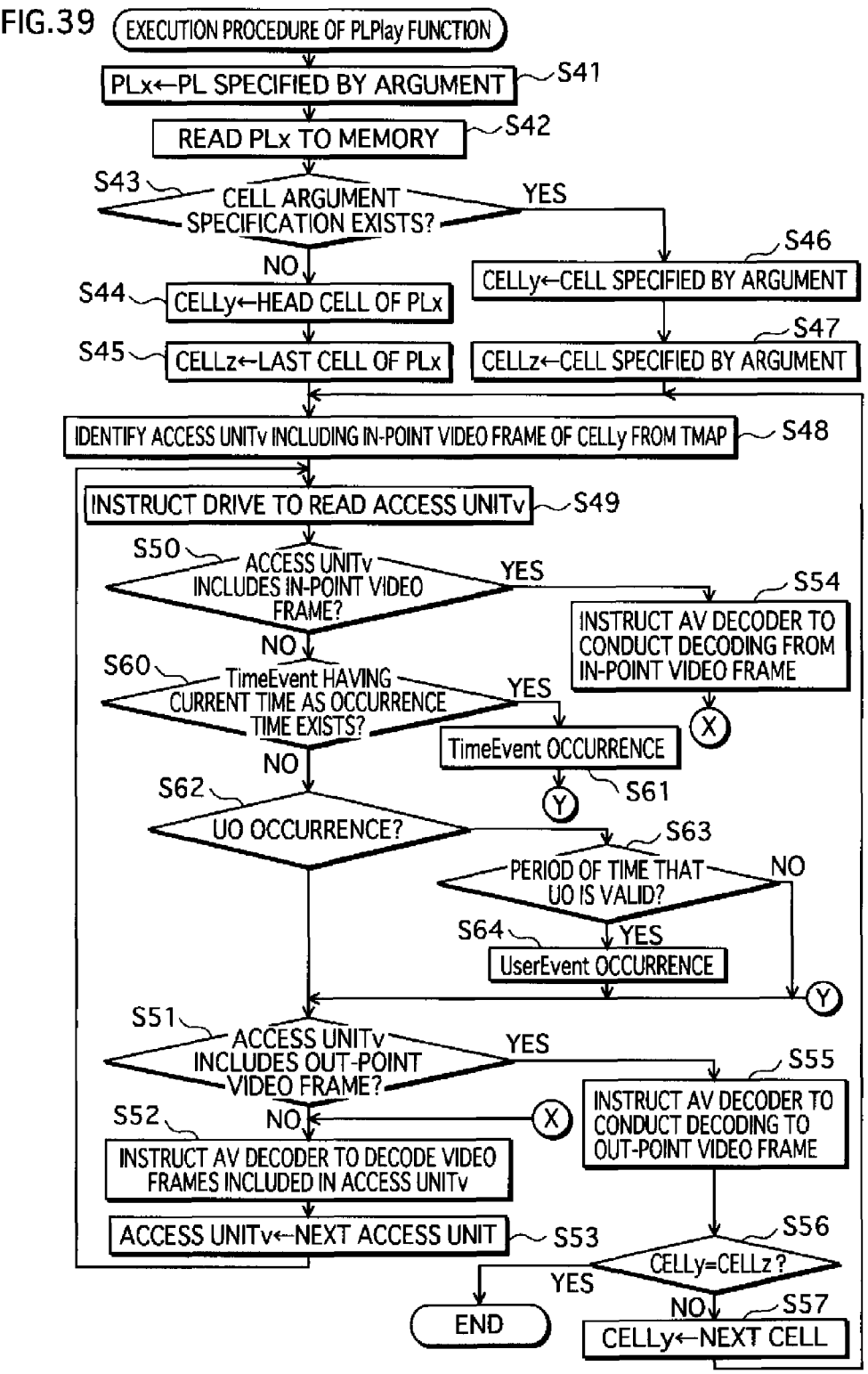
FIG. 39 shows processing procedures of a playback control engine 12 according to the second embodiment.

FIG. 39 shows processing procedures of the playback control engine 12 according to the second embodiment. What is new in the flowchart is that two judging steps of Steps S60 and 62 are placed in a series of processing where ACCESS UNITs structuring a CELL are read and decoded (Steps S49 to S53). Step S60 is a judging step of whether, in PL playback, a TimeEvent having the current playback point as its occurrence time has been defined by a PLMark or a ClipMark. If Step S60 is YES, the TimeEvent is generated (Step S61) before the playback control engine transfers to Step S51. Herewith, an event handler having the TimeEvent as a driving requirement will be driven.

Step S62 is a judging step of whether a UO has occurred. If Step S62 is YES, the playback control engine 12 judges whether or not the current playback point is during the time period where the UO is valid, referring to the PLMark or the ClipMark (Step S63). If it is within the time period, the playback control engine 12 generates the UserEvent (Step S64) and returns to Step S51.

According to the present embodiment as described above, since events are generated according to the progress of playback point while the playback control engine 12 is performing PL playback, event handlers having TimeEvents and UserEvent as the driving requirements can be driven in the Java mode. Herewith, games closely synchronized with the video contents can be described by using the Java language.

3. Third Embodiment

Whereas the second embodiment describes event handlers driven by events defined by PLMarks and ClipMarks, a third embodiment relates to improvements in the case where behaviors of member functions defined by PLMarks and ClipMarks are synchronized with AV playback functions. The AV playback functions in the playback device consist of a function group similar to that found in DVD and CD players, and include starting playback (Play); stopping playback (Stop); pausing (Pause-On); releasing a pause (Pause-Off); releasing a still (Still-Off); speed specified fast-forwarding (Forward Play (speed)); speed specified fast-rewinding (Backward Play (speed)); changing audio settings (Audio Change); changing subtitle settings (Subtitle Change); and changing angle settings (Angle Change).

The playback device generates an event according to a function to be executed when a user instructs such functions cited above. The playback device generates a Backward Event when a user instructs it to execute the fast-rewind function; the playback device generates a Fast-forward Event when a user instructs it to execute the fast-forward function; and the playback device generates a Pause Event when a user instructs it to execute the pause function. Driving event handlers with these events has the following significance. Playback operations are conducted on the time axis of PL playback, while operations performed by a Java Virtual Machine do not have a concept of a time axis. Since Java Virtual Machine's operations are not based on a time axis, it is required to let the Java Virtual Machine know the progress of PL playback with some sort of means in order to synchronize PL playback controls with operations of the Java Virtual Machine. Events to let the Java Virtual Machine know PL playback controls on the time axis are Backward Events, TimeEvents, and Pause Events.

3.1 Backward Events

Figure 40:
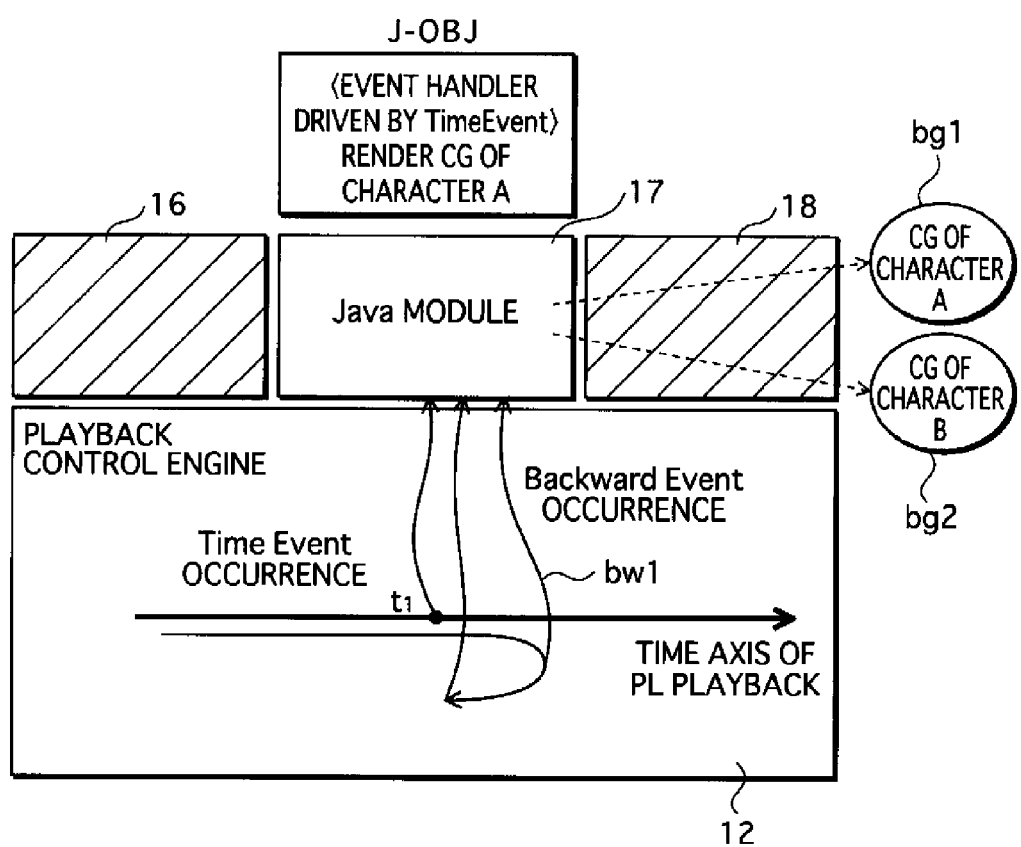
FIG. 40 is a schematic diagram for illustrating the technical significance of Backward Events.

Backward Events are events for driving event handlers, in the case where fast-rewind operations are performed by a user, in response to the fast-rewind operations being made. Technical significance of introducing Backward Events is described below. FIG. 40 is a schematic diagram for illustrating the technical significance of Backward Events. In the figure, assume here that a member function of the Java object is a program for operating a CG of Character A on screen. When it is desired to drive the member function Time t1 after the start of PL playback, a TimeEvent that occurs when Time t1 elapses may be preferably defined with a PLMark, and the above-cited program can be described as an event handler driven by the TimeEvent.

Driving an event handler with such a TimeEvent presents a problem when irregular playback involving a sequence of "rewinding and playing" is repeated any number of times. In this case, the TimeEvent in which the Time t1 elapses occurs over and over, which results in multiple CGs appearing on screen where only one CG should appear. bg1 in FIG. 40 indicates a CG rendered by a handler due to the playback point having reached Time t1, while bg2 indicates a CG rendered by the handler due to the playback point having reached Time t1 again after a rewind. Two CGs are actually rendered where there should be only one CG rendered, and therefore images appearing on the screen become odd. In order to avoid presenting such odd looking images on the screen, it is preferable to have described an operation in the Java object so as to clear the CG appearing on the screen in the event where the playback time once extended beyond Time t1 and has reached Time t1 again after a rewind. This can be realized by causing the playback device to generate a Backward Event (bw1 in the figure) when a rewind operation is performed and having defined, in ZZZ.CLASS, an event handler that is driven by the Backward Event. When a rewind operation is performed and TimeEvent t1 occurs once again, only one CG will appear on the screen as a result of having the event handler to clear the CG on the screen, even when irregular playback involving a sequence of "rewinding and playing" is repeated several times.

Figure 41A:
FIG. 41A is an example of screen display obtained at a time when PL playback in the Java mode is started.
Figure 41B:
FIG. 41B is an example of screen display of when the PL playback point has reached Time t1.

FIGS. 41 and 42 show examples of screen displays related to the case when an event handler driven by a Backward Event is used. FIG. 41A is an example of screen display obtained at a time of PL playback in the Java mode being started, while FIG. 41B is an example of screen display of when the PL playback point has reached Time t1. The PL playback point having reached Time t1 results in the occurrence of the TimeEvent, and the event handler is driven by the TimeEvent. The owl in the figure is a CG rendered as a result of the event handler of the Java object being driven.

Figure 41C:
FIG. 41C is an example of screen display of when the PL playback point has reached Time t2.
Figure 42A:
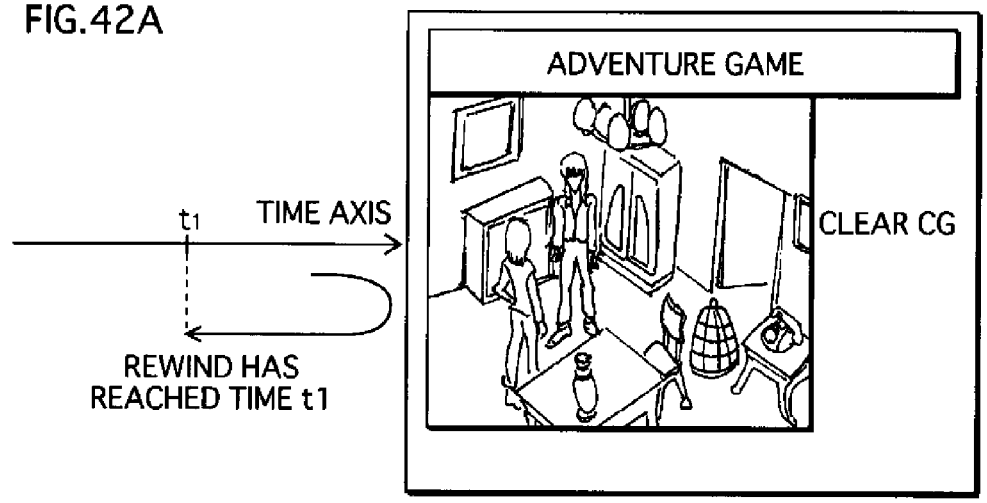
FIG. 42A shows an example of screen display of when the PL playback point has reached Time t1 after a rewind.
Figure 42B:
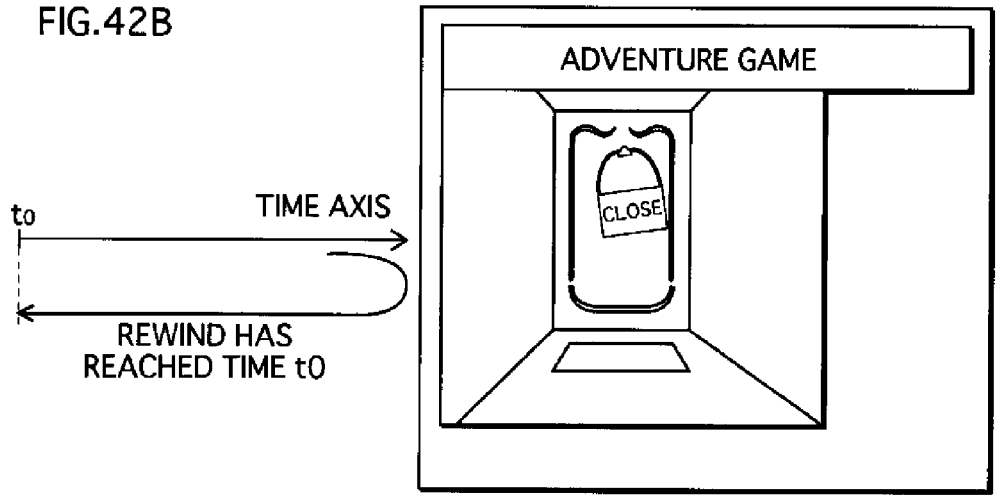
FIG. 42B shows an example of screen display of when the PL playback point has reached Time t0 after the rewind.
Figure 42C:
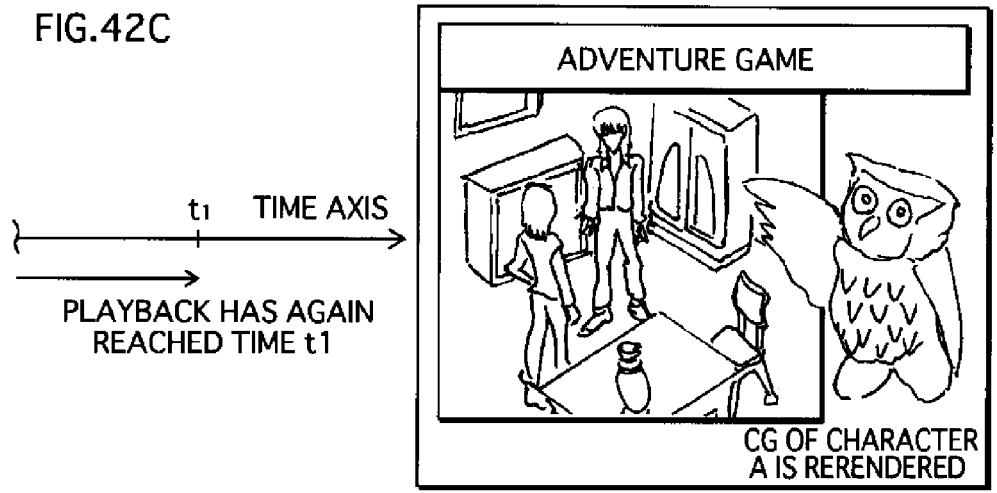
FIG. 42C shows an example of screen display of when the PL playback point has reached Time t1 again.

FIG. 41C is an example of screen display of when the PL playback point has reached Time t2. Assume here that a user performed a rewind when the playback point reached Time t2. FIG. 42A shows an example of screen display of when the PL playback point has reached Time t1 after the rewind. When the PL playback point has reached Time t1, the owl in the figure is cleared. This is for preventing the image of the owl from being rendered over again as described above. Assume that the playback point subsequently reached Time t0 due to the rewind (FIG. 42B), and a user performed normal playback once again. FIG. 42C shows an example of screen display of when the PL playback point has reached Time t1 again. Since the CG was cleared when the rewind was performed, here a CG appearing on the screen is only one even if a CG is re-rendered as a result of the PL playback point having reached Time t1.

Note that, although a CG is cleared by a Backward Event in the present embodiment, the CG of the owl may be alternatively cleared by defining, in a PLMark, a TimeEvent that occurs at Time t2 so that TimeEvents occur in the order of: TimeEventt1→TimeEventt2→TimeEventt1.

3.2 TimeEvents

TimeEvents described in the second embodiment is characterized by occurring at time intervals according to the speed of fast-forward when playback is performed at fast speed. FIG. 43 schematically shows TimeEvent occurrences during fast-forwarding. In the figure, the TimeEvents occur at a time interval dr1. The time interval depends on a user's specification on the fast-forward speed, and the interval becomes shorter as the PL playback speed is faster while the interval becomes longer as the playback speed is slower. Thus, the TimeEvents occur at shorter intervals when the PL playback speed is faster. Contrarily, the TimeEvents occur at longer intervals when the PL playback speed is slower. Java objects are able to find whether the PL playback is proceeding fast or slow from the time interval of the TimeEvent occurrences being longer or shorter. Herewith, a program can be arranged so that CG motion is changed when the PL playback proceeds fast or slow. As a result, it is possible to precisely time-synchronize CG motion with PL playback.

Figure 44A:
FIG. 44A is an example of screen display obtained at a time when PL playback in the Java mode is started.
Figure 44B:
FIG. 44B is an example of screen display of when the PL playback point has reached Time t1.
Figure 44C:
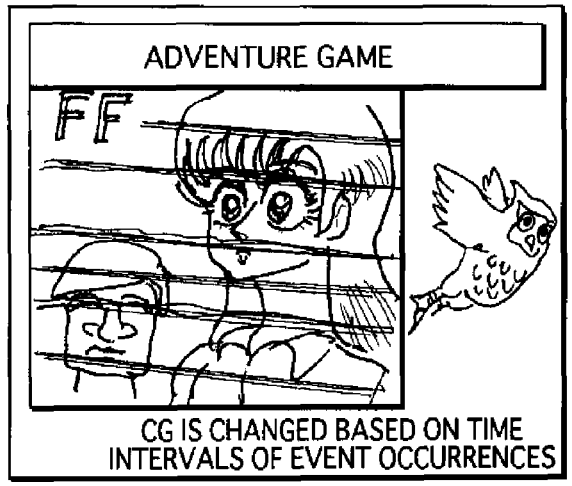
FIG. 44C shows an example of screen display of when a fast-forward is performed at the PL playback point having reached Time t2.

FIG. 44 shows an example of screen display of when an event handler driven by TimeEvents in accordance with a fast-forward. FIG. 44A is an example of screen display obtained at a time of PL playback in the Java mode being started, while FIG. 44B is an example of screen display of when the PL playback point has reached Time t1. The TimeEvent occurs as a result of the PL playback point having reached Time t1, and the event handler is driven by the TimeEvent. The owl in the figure is a CG rendered as a result of the event handler being driven. FIG. 44C shows an example of screen display of when a fast-forward is performed. Due to the fast-forward being performed, the time interval of the TimeEvent occurrences changes. The Java object changes the motion of the CG in the figure according to the change in the interval.

The owl flying in FIG. 44C illustrates one example of changing a method of CG rendering. By changing the CG rendering method according to the interval of TimeEvent occurrences, it is possible to precisely synchronize the Java object operations with PL playback, even if the PL is played at fast speed. Note that the screen display with transverse lines in FIG. 44 exaggeratingly depicts the fast-forward PL playback in progress, likened to VTR playback. In an actual BD-ROM fast-forward, such transverse lines do not appear on screen. Here, it is preferable to clear CGs from the screen when the fast-forward is performed at a high speed, for example, of 10 times faster than the normal playback speed.

3.3 Pause Events

Figure 45:
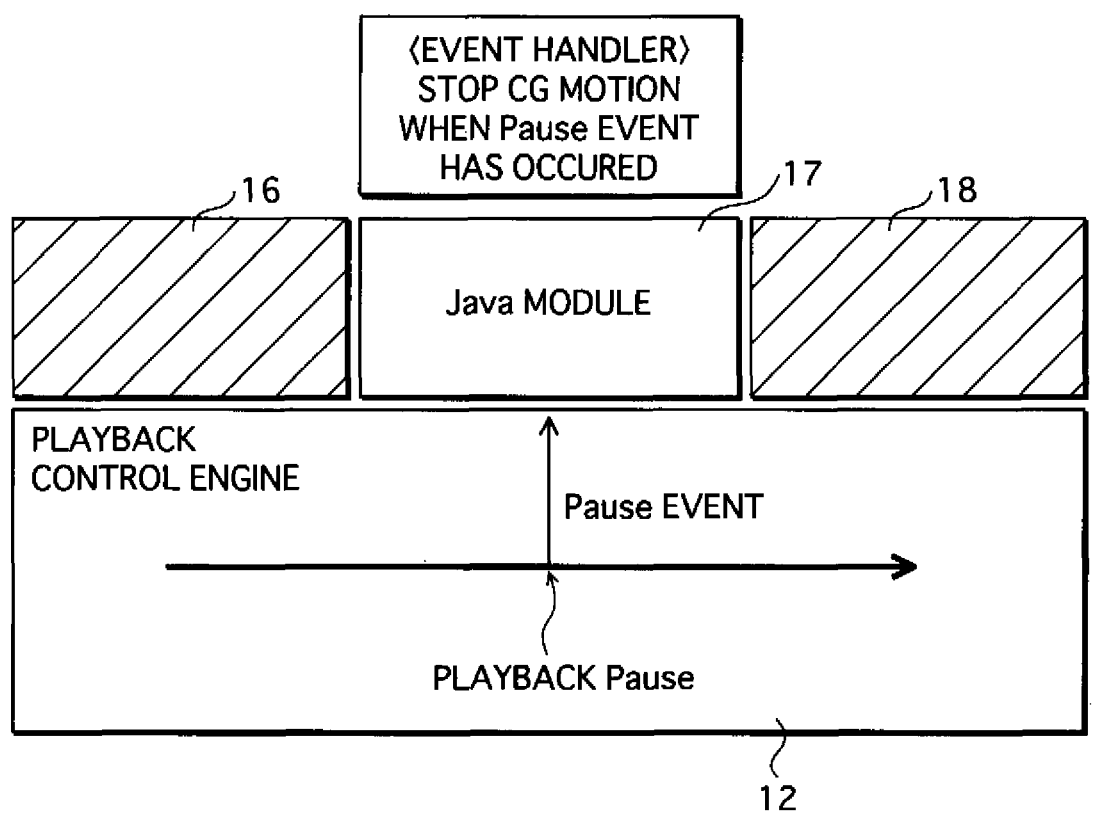
FIG. 45 schematically shows an occurrence of a Pause Event.

Pause Events are events that occur in the playback device when pause operations are performed. FIG. 45 schematically shows a Pause Event occurrence. By describing an event handler so that the playback device operation is stopped at the occurrence of such a Pause Event, it is possible to eliminate discrepancies in operations where, for example, CG motion is in progress while PL playback being stopped.

By defining, as member functions, event handlers that operate as a result of the above-described events, it is possible to supply viewers with high-grade movie works in which operations of Java objects precisely synchronize with PL playback.

According to the present embodiment as described above, since processing of Java objects is changed based on the current playback point on the playback time axis and the speed of the playback progress, it is possible to make motion of CGs rendered by Java objects more realistic.

4. Fourth Embodiment

Figure 46:
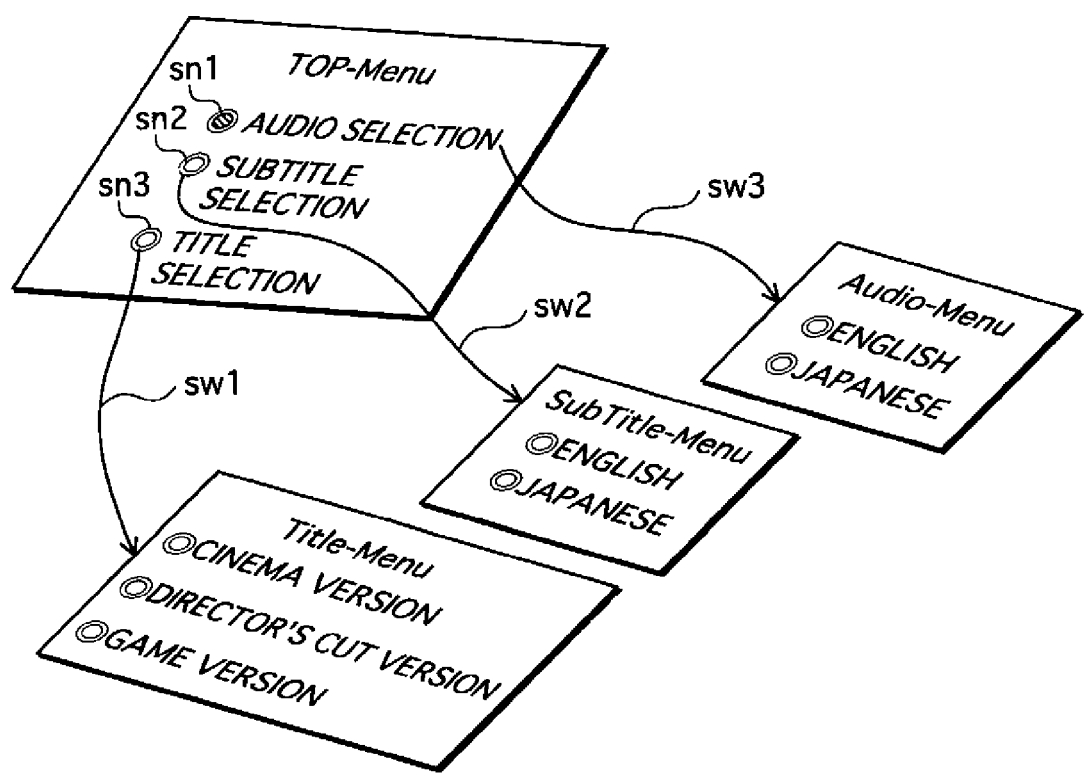
FIG. 46 shows a menu hierarchy realized by a BD-ROM.

A fourth embodiment relates to improvements in realizing, on a BD-ROM, menu controls similar to those of a DVD. FIG. 46 shows a menu hierarchy realized by a BD-ROM. The menu hierarchy in the figure has a structure where TopMenu is at the highest level, and TitleMenu, SubTitleMenu, and AudioMenu, all of which are subordinate menus of the TopMenu, can be selected from the TopMenu. The arrow sw1, sw2, and sw3 in the figure schematically show menu switching by button selection. The TopMenu is a menu having buttons arranged thereon for receiving either an audio selection, a subtitle selection, or a Title selection to perform (buttons sn1, sn2, and sn3 in the figure).

The TitleMenu is a menu having buttons arranged thereon for receiving a selection from movie works (Titles), such as a cinema version, a director's cut version, and a game version. The AudioMenu is a menu having buttons thereon for receiving whether audio playback is to be in Japanese or English, and the SubtitleMenu is a menu having buttons thereon for receiving whether subtitle display is to be in Japanese or English.

Figure 47:
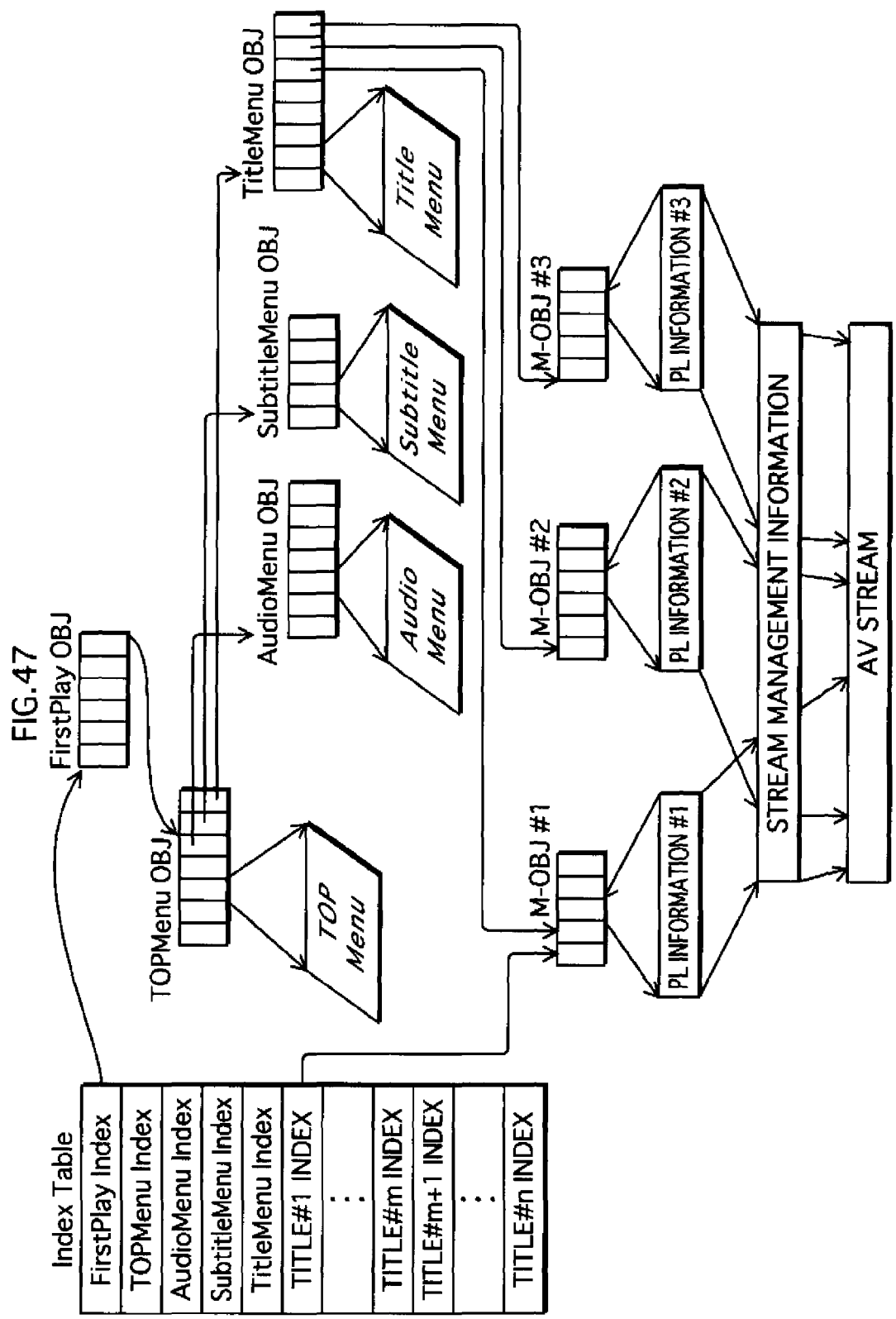
FIG. 47 shows MOVIE objects for operating menus having such a hierarchy.

FIG. 47 shows MOVIE objects for operating menus having such a hierarchy.

A FirstPlay object (FirstPlay OBJ) is a dynamic scenario describing a startup procedure taken when a BD-ROM is loaded in a playback device. The square boxes depicting the FirstPlay object represent commands for executing the setup procedure. The last command of the FirstPlay object is a branch command, and sets a TopMenu object as its branch destination.

The TopMenu object (TOPMenu OBJ) is a dynamic scenario for controlling the behavior of the TopMenu. The square boxes depicting the TopMenu object are schematic representations of individual commands showing the control procedure. These commands include commands for changing a state of buttons in the TopMenu in response to operations from a user, and branch commands for branching in response to confirmation operations made for buttons. The branch commands realize menu switching from the TopMenu to the TitleMenu, from the TopMenu to the SubTitleMenu, and from the TopMenu to the AudioMenu.

An AudioMenu object (AudioMenu OBJ) is a dynamic scenario for controlling the behavior of the AudioMenu. The square boxes structuring the AudioMenu object are schematic representations of individual commands showing the control procedure. These commands include commands for changing a state of buttons in the AudioMenu in response to operations from a user, and commands for updating SPRMs used in audio settings in response to confirmation operations made for buttons.

A SubTitleMenu object (SubtitleMenu OBJ) is a dynamic scenario for controlling the behavior of the SubTitleMenu. The square boxes structuring the SubTitleMenu object are schematic representations of individual commands showing the control procedure. These commands include commands for changing a state of buttons in the SubTitleMenu in response to operations from a user, and commands for updating SPRMs used in subtitle setting in response to confirmation operations made for buttons.

A TitleMenu object (TitleMenu OBJ) is a dynamic scenario for controlling the behavior of the TitleMenu. The square boxes structuring the TitleMenu object are schematic representations of individual commands showing the control procedure. These commands include commands for changing a state of buttons in the TitleMenu in response to operations from a user, and branch commands for branching in response to confirmation operations made for buttons. The branch commands realize branching to individual Titles.

These MOVIE objects relating to the menus allow to realize menu behavior such as that realized in a DVD. Thus concludes the description of MOVIE objects relating to menu controls.

Next are described improvements in the Index Table according to the fourth embodiment. A FirstPlay Index, an AudioMenu Index, a SubtitleMenu Index, and a TitleMenu Index are added to the Index Table of the present embodiment. As described in the first embodiment, these indexes are referred to by dynamic scenarios of any of three modes.

The FirstPlay Index is referred to during BD-ROM startup. The filename of the FirstPlay object is described in this Index.

The TopMenu Index, AudioMenu Index, SubtitleMenu Index, and TitleMenu Index are referred to when user operations are conducted to directly call the Audio Menu, Subtitle Menu, and Title Menu, respectively. A direct call by a user is conducted by the user pushing down an Audio select key, a Subtitle select key, or a Title select key on a remote controller.

Thus concludes the description of improvements in MOVIE objects according to the present embodiment. Next are described improvements in a playback device of the present embodiment. In order to operate MOVIE objects as described above, the module manager 20 needs to perform processing procedures shown in a flowchart of FIG. 48.

Figure 48:
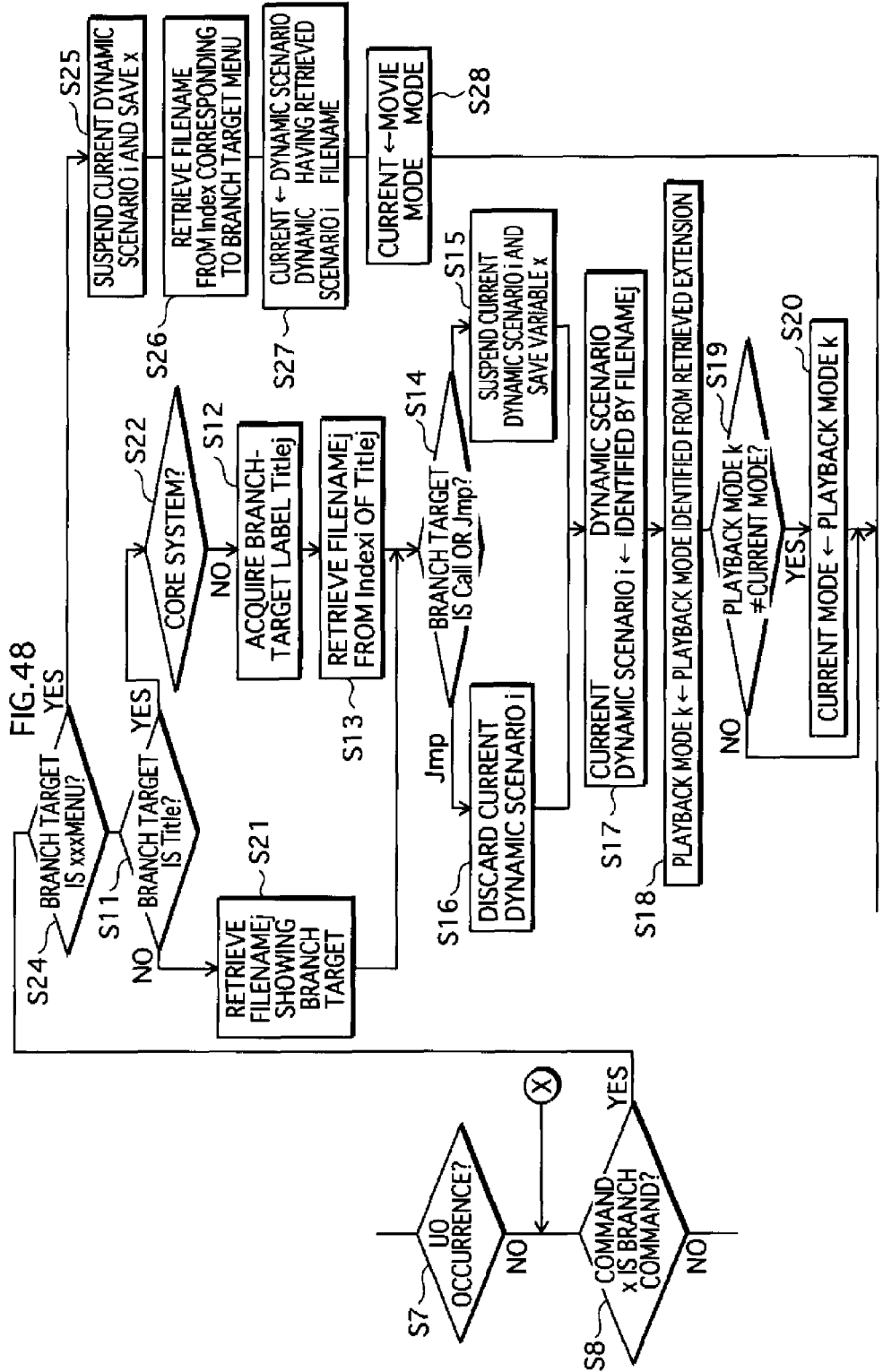
FIG. 48 shows processing procedures performed by a module manager 20 according to a fourth embodiment.

In order to conduct menu controls, the module manager 20 of the present embodiment performs branch controls according to the processing procedures shown in FIG. 48. This flowchart differs in that Step S24 has been inserted between Steps S8 and S11, and the module manager 20 performs processing of Steps S25 to S28 before returning to Step S4 if Step S24 is YES. Steps S25 to S28 involve setting a scenario for conducting menu controls as the current dynamic scenario. That is, if a branch destination of the branch command is xxxMenu (Step S24: YES), the module manager 20 suspends the current dynamic scenario i, saves variable x (Step S25), retrieves a filename from an Index corresponding to the branch-destination menu (Step S26), sets the dynamic scenario of the retrieved filename as the current dynamic scenario i (Step S27), and returns the current mode to the MOVIE mode (Step S28). After that, the module manager 20 proceeds to execute the current dynamic scenario.

According to the present embodiment as described above, since branching to dynamic scenarios for menu controls is realized with indirect referencing via the Indexes of the Index Table, it is possible to branch to dynamic scenarios for menu controls, even when a menu key is pushed during execution of the Java mode or the Browser mode. Audio and subtitle switching from a Java Virtual Machine or from the Browser mode is made possible. Thus, even when playback is performed using a Java Virtual Machine or in the Browser mode, the present embodiment is capable of audio and subtitle switching similar to normal DVDs.

5. Fifth Embodiment

In the first embodiment, application programs in the Java mode describe playback controls targeted for a BD-ROM using programming functions and system variables supplied from the playback control engine. That is, programming functions and system variables supplied from the playback control engine are directly used for describing playback controls. On the other hand, applications in the Java mode according to a fifth embodiment describe controls targeted for a BD-ROM via member functions supplied by the Java module 17.

Figure 49:
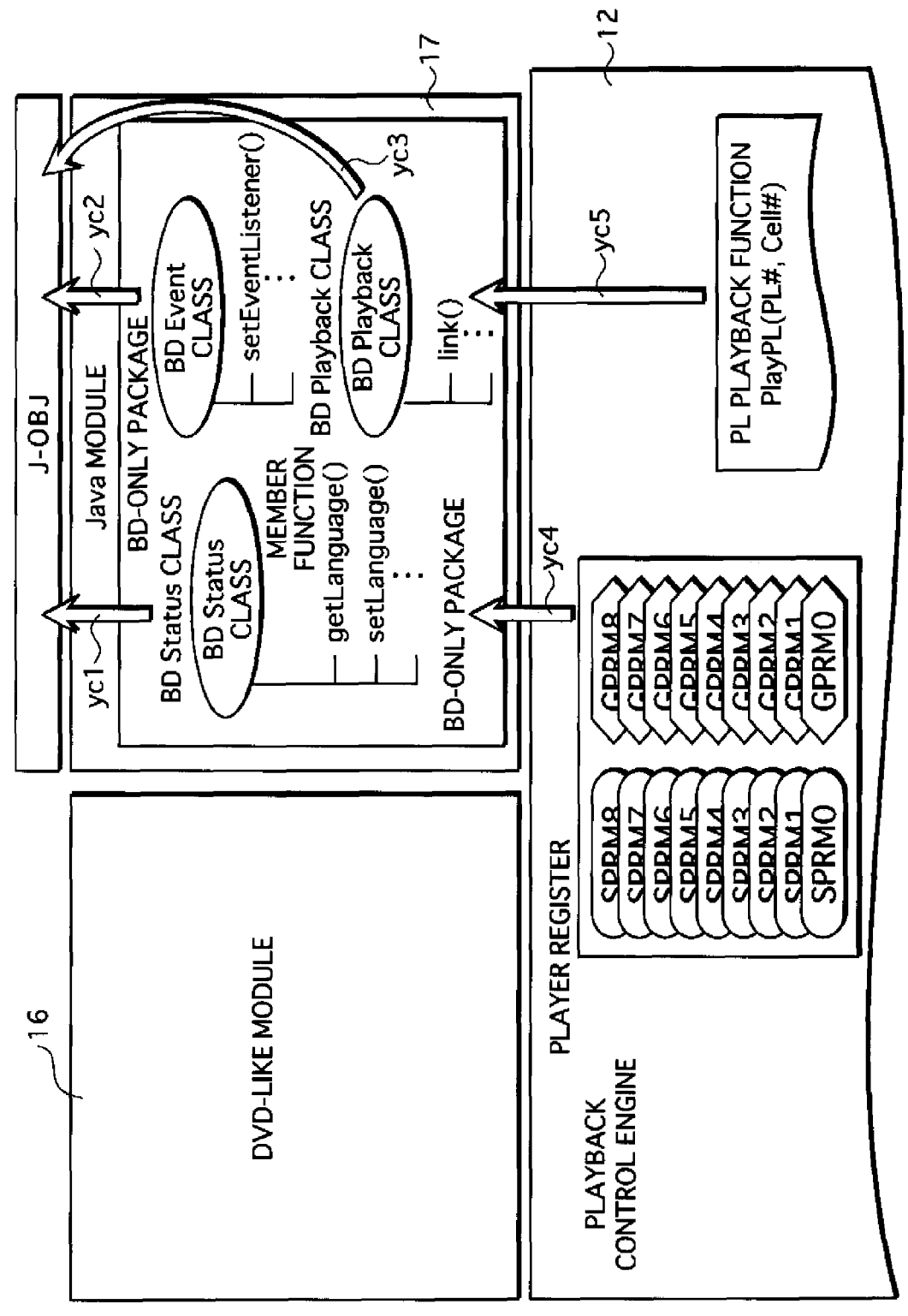
FIG. 49 shows member functions of classes belonging to the Java mode.

Explanation of the kind of member functions playback controls being described is in reference to FIG. 49. FIG. 49 shows member functions of classes belonging to the Java mode. The Java mode, which is Layer 4, has a BD-ROM only package containing classes of BD-ROMStatus, BD-ROMReproduction, and BD-ROMEvent.

The following gives an account of individual classes in the package. The BD-ROMEvent class includes multiple member functions including a setEventListener function. The setEventListener function makes, when an instance of ZZZ.CLASS (a Java object) is generated, a declaration on the use of member functions of the Java object. That is, the use of member functions of the Java object becomes possible only after the declaration of use by the setEventListener function is made. When TimeEvents and UserEvents occur, event handlers whose use has been declared by the setEventListener function are driven.

The BD-ROMReproduction class is a class packaging PlayPL at CELL( ) PlayPL at Mark( ) and PlayPL at Specified Time( ) as member functions.

The BD-ROMStatus class is a class of member functions for status acquisition and status setting. Namely, this is a class packaging, as member functions, (i) Get value of Player Status Register function, (ii) Set value of Player Status Register function, (iii) Get value of General Purpose Register function, and (iv) Get value of General Purpose Register function shown in the first embodiment.

The arrows yc1, yc2, yc3, yc4, and yc5 in the figure schematically show a PL playback function and acquisition/setting of register setting values via member functions of the BD-ROMStatus class, BD-ROMReproduction class, and BD-ROMEvent class. As shown by these arrows, the Java object of the fifth embodiment applies programming functions supplied by the playback control engine 12 and player variables which are register setting values via the package in the Java module 17.

Figure 50:
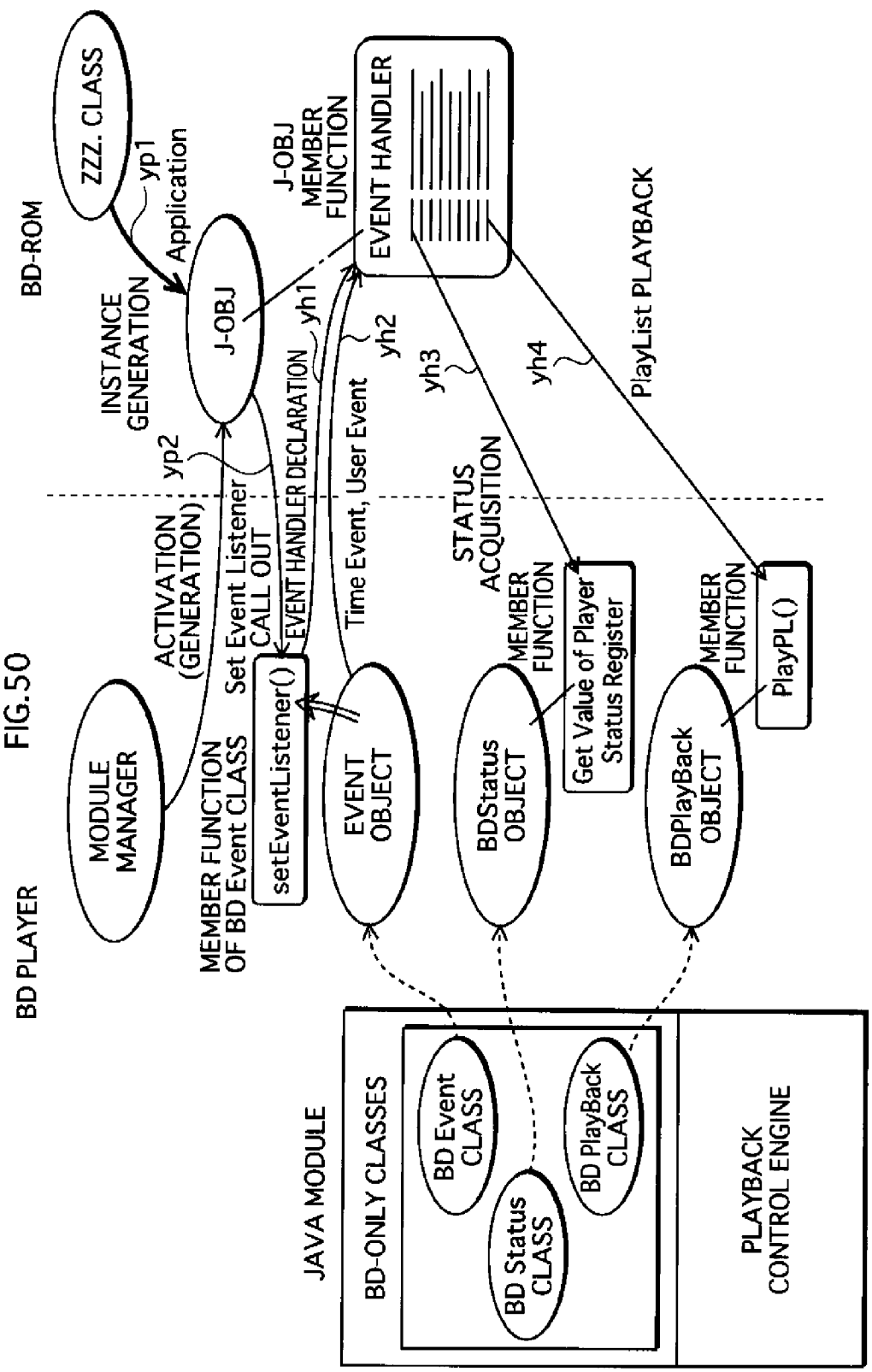
FIG. 50 shows controls via member functions in the Java mode.

FIG. 50 shows controls via member functions in the Java mode.

The arrow yp1 symbolically depicts a generation of a Java object, which is an instance of ZZZ.CLASS. This generation is made by the Java module 17 when branching to the Java object is instructed for the first time. The arrow yp2 symbolically depicts a call of the setEventListener function by the Java object.

The arrow yh1 symbolically shows a declaration on the use of event handlers made by the setEventListener function in the event object. The arrow yh2 symbolically shows an event handler driven by a member function in the event object. That is, event handlers of Java objects are made available in response to the declaration on the use of event handlers made from the member function (setEventListner function) in the event object, and are driven by UserEvents and TimeEvents defined by ClipMarks and PLMarks.

The arrow yh3 symbolically shows status acquisition by a driven event handler. Namely, event handlers, which are member functions of Java objects according to the fifth embodiment, indirectly implement status acquisition and setting of a playback device using a member function (get System Parameter Register) of a class belonging to the Java mode.

The arrow yh4 symbolically shows PL playback by a driven event handler. Namely, event handlers, which are member functions of Java objects, instruct a playback device to perform PL playback using a member function of the BD-ROMReproduction class.

According to the present embodiment as described above, since playback controls targeted for a BD-ROM is described via a package in the Java module 17, it is possible to describe the playback controls targeted for a BD-ROM in the same style as general Java language programming style. This allows to enhance production efficiency of software houses that have entered producing movie works.

Note that it is desirable that the package of the present embodiment is issued by an organization in charge of license management of the BD-ROM standardization under the condition that the organization enters into an official contract with software houses developing application programs. The contract includes a prohibition provision of not developing application programs discreditable to movie works recorded on BD-ROMs. Herewith, it is possible to have software houses develop various applications while curbing the fear of dishonoring movie works.

6. Sixth Embodiment

Figure 51:
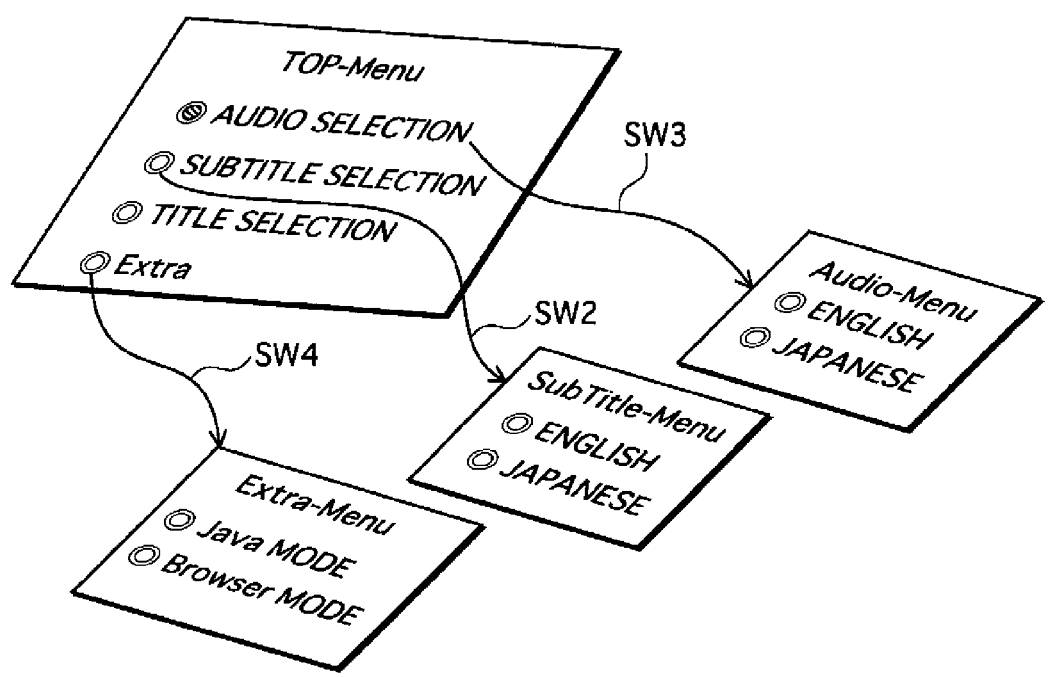
FIG. 51 shows a menu hierarchy according to a sixth embodiment.
Figure 52:
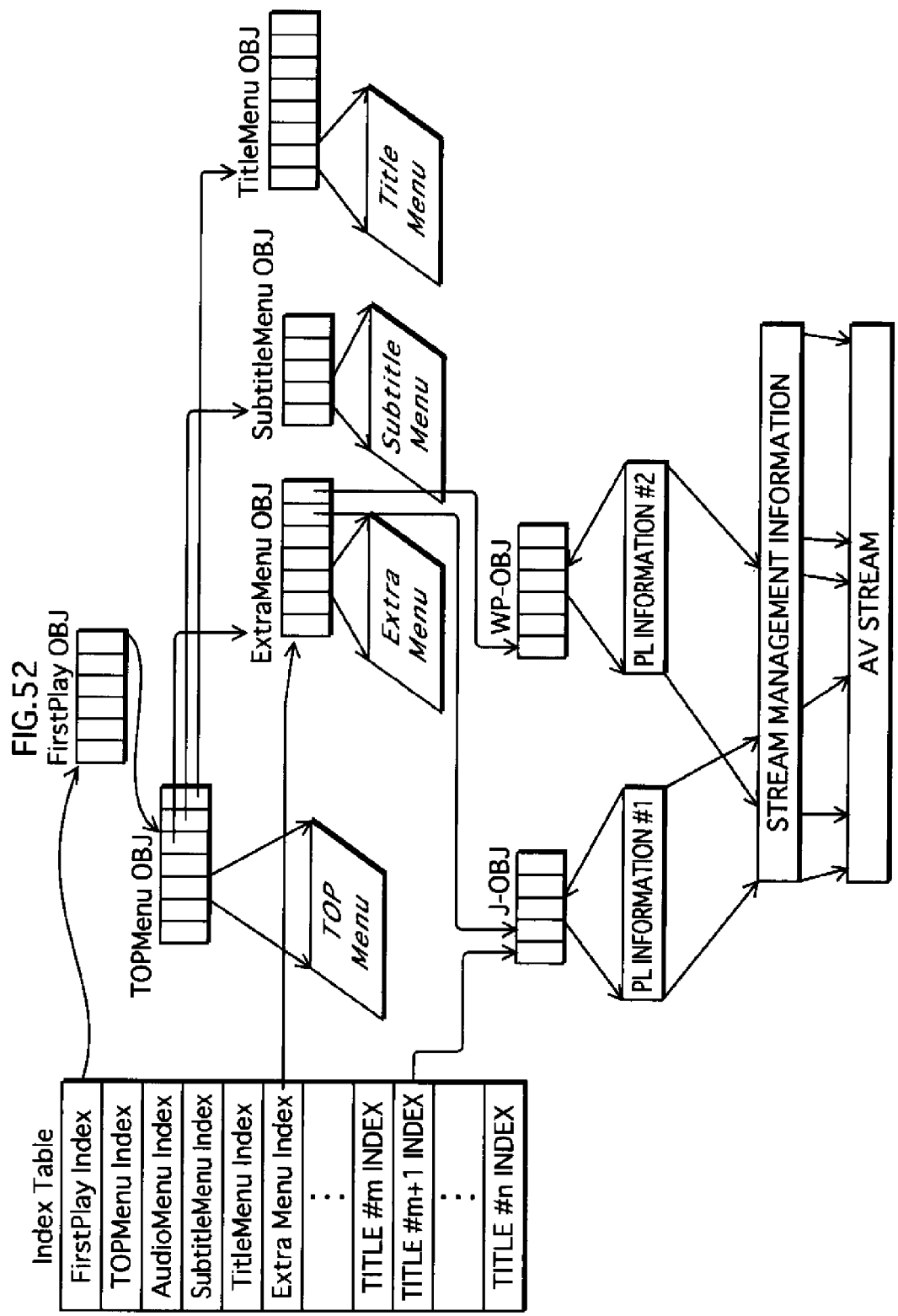
FIG. 52 shows MOVIE objects and an Index Table according to the sixth embodiment.

In the first to fifth embodiments, MOVIE objects perform transitions from the MOVIE mode to the Java mode based on branch commands in the Navigation Button information. Here in a sixth embodiment, transitions from the MOVIE mode to the Java mode are performed via a menu. FIG. 51 shows a menu hierarchy according to the sixth embodiment. This differs from the menu hierarchy images shown in FIG. 46 in that a transition to the Extra Menu from the Top Menu is made possible. The Extra Menu, which receives a selection between the Java mode and the Browser mode from a user, includes a button for receiving a transition to the Java mode and a button for receiving a transition to the Browser mode. FIG. 52 shows MOVIE objects and an Index Table according to the sixth embodiment. The figure differs from FIG. 47 in that (1) there is an ExtraMenu object (ExtraMenu OBJ) that controls the behavior of the Extra Menu, and it is possible to perform branching from the MOVIE object in the TopMenu to this ExtraMenu object, and (2) there is an Index for the Extra Menu within the Index Table, and it is possible to perform branching to the ExtraMenu object by a push down of a menu key on a remote controller.

A transition to the Java mode is performed in response to a push down of the menu key, and this means that the transition to the Java mode is performed irrespective of the current playback point. This is also the case with a transition to the Browser mode.

Thus concludes the description of the improvements in the MOVIE objects and the Index Table according to the present embodiment. Next are described improvements in Java objects of the sixth embodiment. The Java object according to the present embodiment finds that, at a transition from the MOVIE mode to the Java mode, branching to the Java mode has been performed from which playback point in the MOVIE mode by referring to SPRM(10). Then, the Java object conducts processing in the Java mode with referring to SPRM(10) and a pre-equipped schedule table (FIG. 53). The schedule table shows correspondence between characters appearing in the video data and time slots in which the characters are appearing.

The Java objects refer to the table to find character(s) at the current playback point, and execute a game starring the character(s).

According to the present embodiment as described above, branching via the menu allows a transition from the MOVIE mode to the Java mode. In addition, by referring to SPRM(10) that indicates a playback point immediately before the branch, processing can be switched according to a point where a user has finished watching. Such switching enables producing Java language applications that closely relate to the playback of movie works.

7. Seventh Embodiment

In the first embodiment, PL shearing is made possible where a CELL in the PL played in the MOVIE mode is played also in the Java mode. However, the sharing poses an impediment in the case of setting filtering information in PL information. The filtering information specifies, from among a plurality of streams multiplexed on the AV stream, which streams are valid and invalid. The reason of setting the filtering information is described below. The AV stream includes, in addition to video and audio streams, streams such as Navigation Button information and subtitle streams. The Navigation Button information is necessary for the MOVIE mode, but it is not always the case with the Java and Browser modes. This is because, in the Java mode, CGs can be rendered using the Java language, and there is no need to employ the Navigation Button information. In order to treat the Navigation Button information as invalid in the Java mode, such filtering information is required. However, if the filtering information is set in PL information and the above-cited PL sharing is performed, the filtering information that specifies stream validity and invalidity is also shared.

Figure 54:
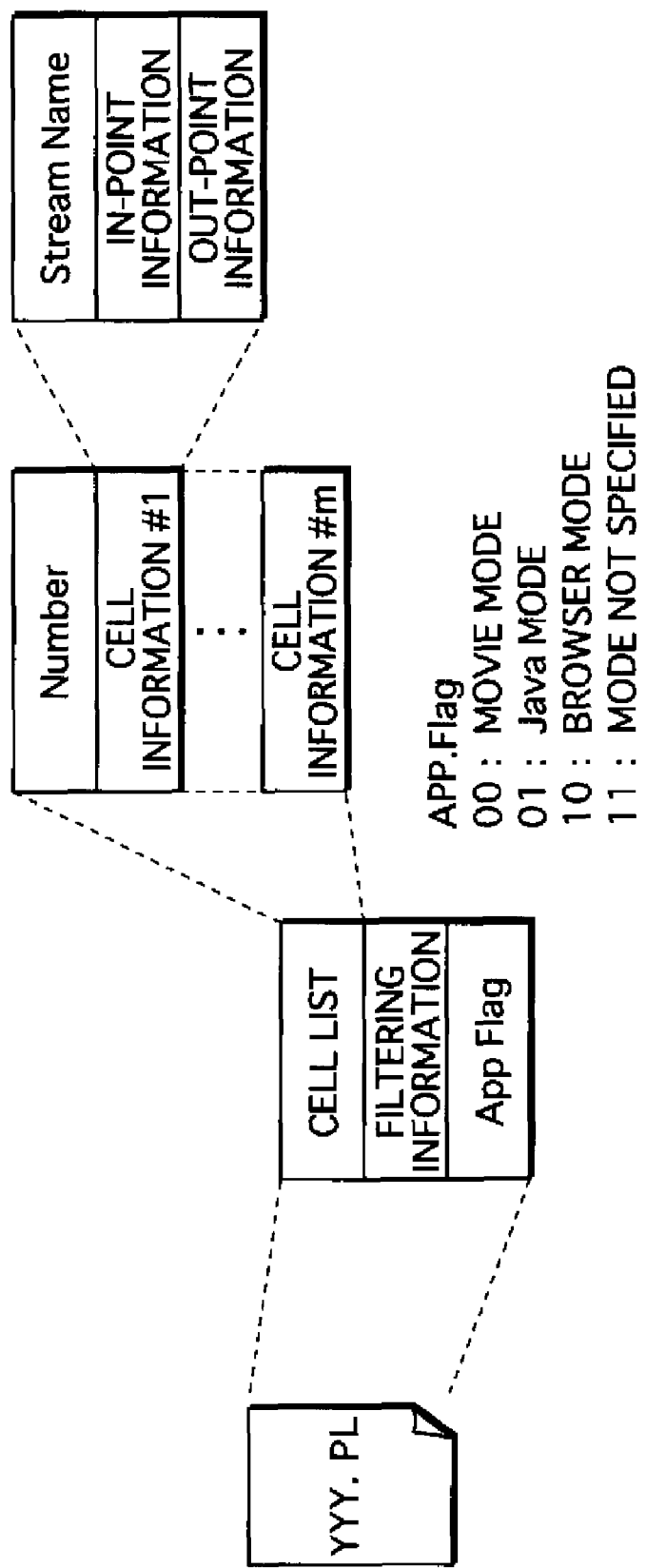
FIG. 54 shows a structure of PL information according to a seventh embodiment.

When filtering information is set in PL information, a PL is set as shown in FIG. 54 in the present embodiment since shearing of PL information is undesirable. FIG. 54 shows a configuration of PL information according to a seventh embodiment. Filtering information and APP.Flag have been added to the PL information in the figure.

APP.Flag is information for specifying that dynamic scenarios in which mode are allowed to use the PL. A specification of an application program is made by selecting one of three modes of the MOVIE mode, Java mode, and Browser mode. Any MOVIE object is able to use the PL information when APP.Flag indicates "00:MOVIE mode", but Java objects and WebPage objects are not able to use the PL information.

On the other hand, any Java object is able to extract the PL information when APP.Flag indicates "01:Java mode". When APP.Flag indicates "10:Browser mode", any WebPage object is able to extract the PL information. Further more, when APP.Flag indicates "11", dynamic scenarios in any mode can apply the PL information.

APP.Flag enables realizing exclusive controls where dynamic scenarios of one mode are allowed to use one piece of PL information while dynamic scenarios of other modes are not allowed to use the piece. Such exclusive controls achieve filtering information set in the PL information being used by dynamic scenarios in a mode intended to be used, and avoid playing streams in unintended modes.

Figure 55:
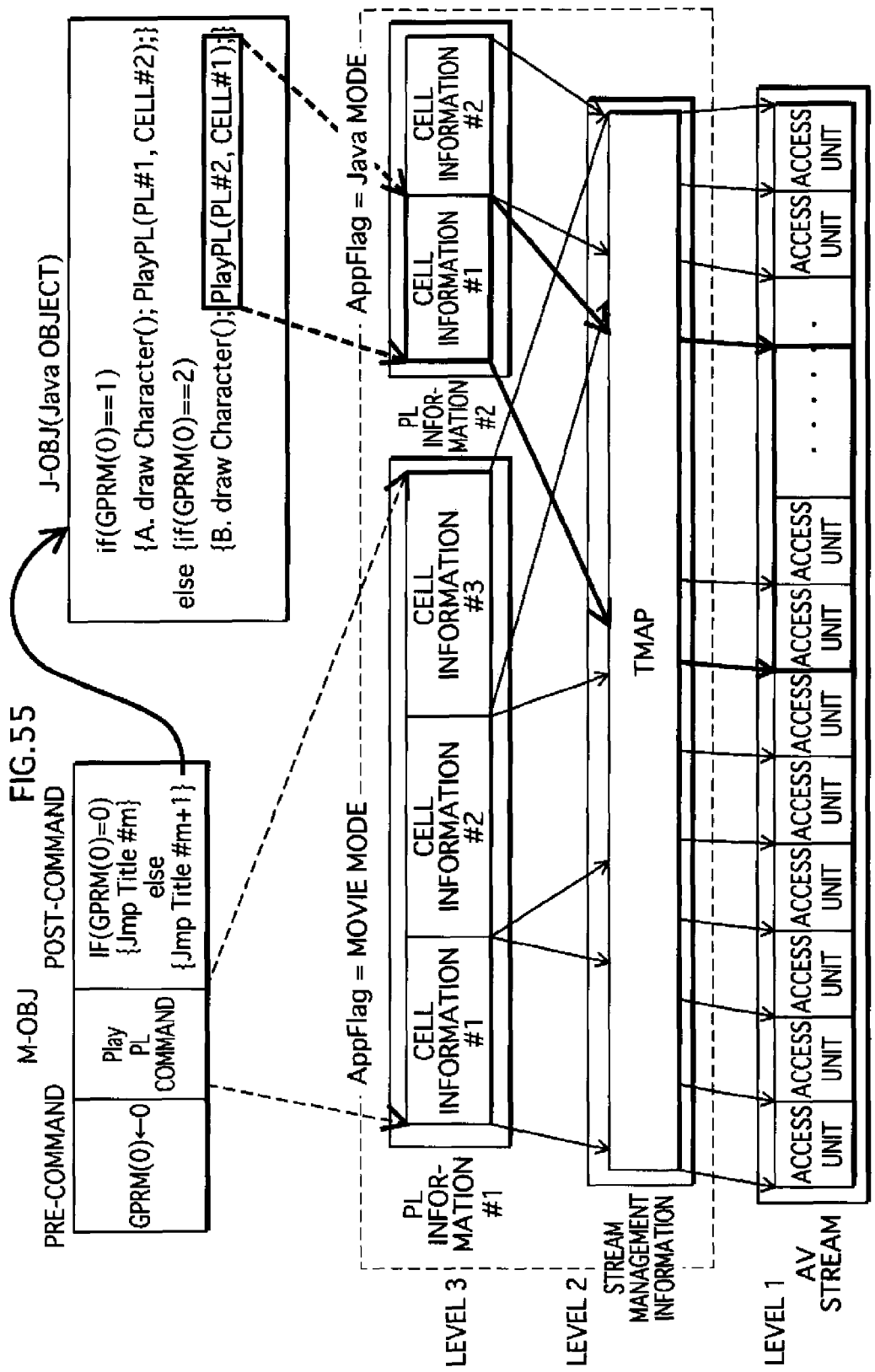
FIG. 55 shows hierarchical sharing where each piece of PL information is exclusively used by the MOVIE mode or the Java mode while a digital stream is shared by the MOVIE and Java modes.

Setting PL information enables sharing as shown in FIG. 55. FIG. 55 shows hierarchical sharing where each piece of PL information is exclusively used by the MOVIE mode or the Java mode while the digital stream is shared by the MOVIE and Java modes.

To perform processing based on APP.Flag, a dynamic scenario according to the present embodiment receives APP.Flag of a desired PL for playback from the playback control engine 12 prior to a PlayPL function call. The dynamic scenario judges whether or not the mode to which the dynamic scenario belongs is coincided with the mode shown in the received APP.Flag. If these modes are the same, then the dynamic scenario performs a PlayPL function call. On the other hand, if they disagree, the function call is not performed. As a result that the dynamic scenario and the playback control engine 12 implement the above processing, only a dynamic scenario in the mode indicated in APP.Flag performs playback of the PL.

Note that, at a time of a PlayPL function call, the dynamic scenario may inform the playback control engine 12 of a mode to which the dynamic scenario belongs, and the playback control engine 12 may judge whether the mode is coincided with a mode indicated in APP.Flag of a function-call destination PL. Then, the PlayPL function is executed if they are coincided, and the PlayPL function is not executed if they disagree. Herewith, only a dynamic scenario in the mode indicated in APP.Flag performs playback of the PL.

A hierarchical sharing as shown in the present embodiment enables scene extraction in which, for example, one scene in the MOVIE mode is used in the Java mode with the use of filtering information.

It is not to be argued that filtering information and APP.Flag can be set in stream management information. However, any sharing of an AV stream among modes becomes impossible if filtering information is set in stream management information, and therefore this is not well advised. In order to realize the use in other modes, it is preferable to leave a means for sharing of an actual AV stream by setting APP.Flag and filtering information in PL information.

8. Eighth Embodiment

Figure 56:
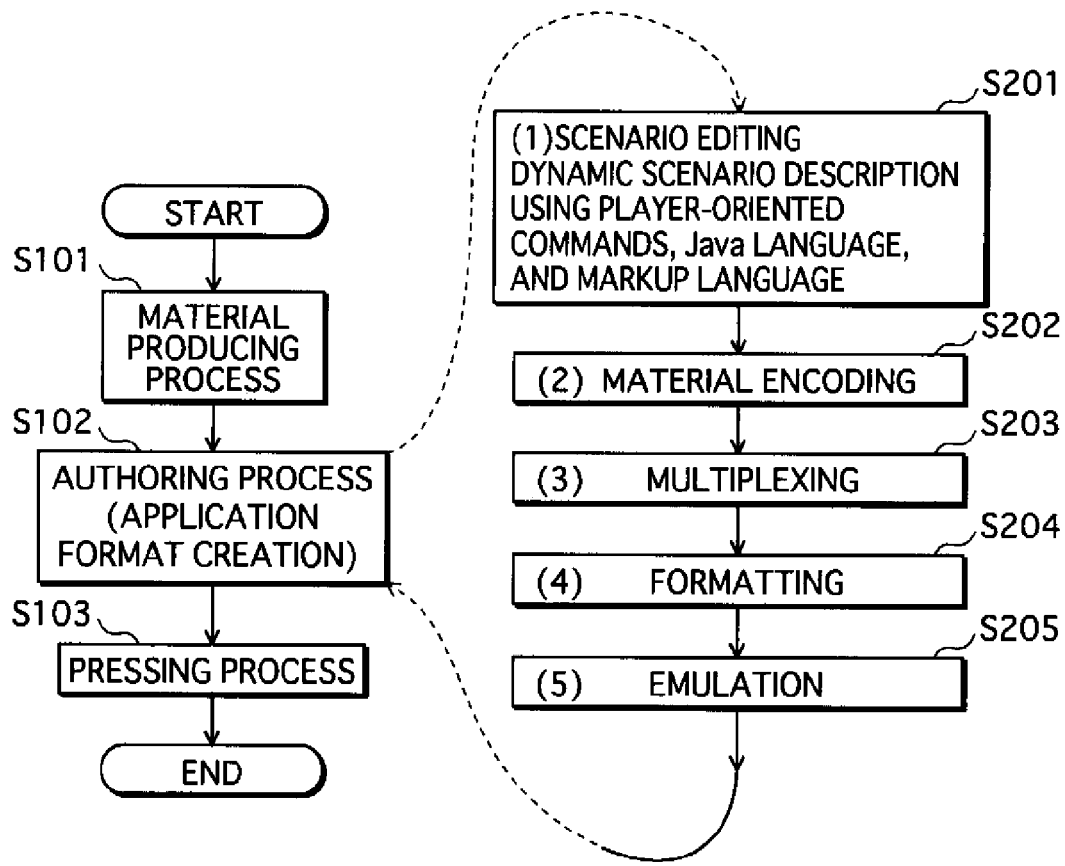
FIG. 56 is a flowchart showing BD-ROM production processes according to an eighth embodiment.

The present embodiment relates to BD-ROM production processes. FIG. 56 is a flowchart showing BD-ROM production processes according to an eighth embodiment.

The BD-ROM production processes include a material producing process S101 for creating materials such as video records and audio records, an authoring process S102 for generating an application format with the use of an authoring device, and a pressing process S103 for creating a master BD-ROM and pressing and laminating to complete BD-ROMs.

Of these processes, the authoring process targeting the BD-ROM comprises five processes: a scenario editing process S201; a material encoding process S202; a multiplexing process S203; a formatting process S204; and an emulation process S205.

The scenario editing process S201 is for converting an outline created in the planning stage into a format comprehensible to a playback device. The editing results are created as BD-ROM scenarios. In addition, multiplexing parameters for realizing multiplexing are also created in the scenario editing.

The material encoding process S202 is an operation for respectively encoding video materials, audio materials, and subtitle materials to obtain a video stream, audio streams, and subtitle streams.

The multiplexing process S203 interleave-multiplexes the video stream, audio streams, and subtitle streams obtained as a result of the material encoding, and the result is converted into a single digital stream.

In the formatting process S204, various types of information are created based on BD-ROM-oriented and the scenarios and digital stream are adapted to a BD-ROM format.

The emulation process S205 is for confirming whether or not the authoring result is correct.

Since Java objects and WebPage objects can be respectively described using the Java and markup languages in the scenario editing process above, it is possible to develop these objects with the same sensibility as that applied in the development of general computer-oriented software. Accordingly, the present embodiment has the effect of increasing the efficiency of scenario creation.

9. Ninth Embodiment

A ninth embodiment is an embodiment for implementing the recording medium according to the present invention as a rewritable optical disc such as a BD-RE (Blu-ray Rewritable disc). The data configuration of "an AV stream, stream management information, and PL information" shown in the first embodiment is compatible with BD-REs. A BD-RE recording apparatus writes the data configuration of "an AV stream, stream management information, and PL information" to BD-REs by conducting real-time recording of broadcasting signals. A user performs programming with respect to the BD-REs on which the data configuration has been written, describes MOVIE objects, Java objects, WebPage objects, and an Index Table, and writes these to the BD-REs. Herewith, a similar format to the application format shown in the first embodiment can be realized on BD-REs.

The present embodiment described above offers an opportunity for a user having a BD-RE recording apparatus to create the application format shown in the first embodiment, and therefore, it is possible to let many users know the pleasure of creating movie works shown in the first embodiment.

10. Tenth Embodiment

A tenth embodiment relates to locking a playback device into core system behavior under certain conditions, even if the playback device is operable to operate Java objects and WebPage objects.

That is, under the following situations (1) to (7), a path for transferring from the MOVIE mode to the enhanced modes is closed:

(1) when an encryption key for protecting a copyright of a movie work is exposed in a playback device, and the a playback device is made invalid by a key management center;

(2) when there is a possibility that copies of a movie work will be circulated on networks as a result that a user made unauthorized copies of the movie work recorded on a recording medium by using ripper software;

(3) when additional charge is not paid although it is required for execution of the enhanced modes;

(4) when it is desired to cut a playback device off from a network due to an occurrence of a failure in a system of the playback device;

(5) when there are version conflicts in Java Virtual Machines and browsers;

(6) when there is a possibility of leakage of personal information or infection with virus software, and it is desired to cut a playback device off from a network; and (7) when it is desired to cut a playback device off from a network in order to protect movie works on a recording medium from an unauthorized device attempting to read recorded contents on the recording medium via a network.

Java objects and WebPage objects according to the present embodiment have a check routine for checking the existence of the above situations (1) to (7). The check routine conducts checks on a playback device for installation of unauthorized software and virus infections in cooperation with a server on a network. The server is operated by, for example, an encryption key management center for managing the use of encryption keys by playback devices, an accounting center for charging users, and a copyright management center that promotes detection of illegal copies. Java and WebPage objects perform communication with these centers. The Java and WebPage objects have been programmed so as to forcibly transform a playback device to behave as a core system when the playback device meets at least one of the situations (1) to (7). Here, checks on a possibility of illegal copies with the use of ripper software can be realized by incorporating a check routine in Java objects and WebPage objects. The check routine can be realized with processing of reporting files and folders in HDs to a center on a regular basis and having those censored by the center. Note that such censoring assumes advance approval on the purchase of movie works.

The present embodiment as described above enables, while realizing an added value enhancement via a network, to describe Java objects and WebPage objects so as to set a playback device into core system behavior and then use the playback device in a stand-alone configuration, in the case when copyright holders and playback-device manufacturers desire to disconnect a network connection of the playback device for some reason. In particular, the present embodiment has significance in the case where HDs and operating systems have been installed on the playback device, and BD-ROMs are used in a playback environment similar to a personal computer. Note that, the playback device may be transformed back to a full system if appropriate measures are implemented after the occurrence of a situation as cited above.

11. Eleventh Embodiment

An eleventh embodiment relates to a playback device equipped with a HD, and the communication unit 23 of the playback device downloads an Index Table and new PLs and writes these to the HD. When a new Index Table is written to the HD, in the event of branching from a PL to another PL, the module manager 20 retrieves a filename not from the Index Table recorded on a BD-ROM but from the Index Table recorded on the HD, instead. Then, the module manager 20 reads video data having the retrieved filename, and has the DVD-like module 16, the Java module 17, or the BROWSER module 18 execute the video data.

The present embodiment described above enables a playback device to download an Index Table and replacement videos in the case when certain PLs recorded on a BD-ROM have moral and ethical issues. As a result, it is possible to have a user watch replacement videos, instead of the problematic videos, by causing the playback device to make indirect referencing via the new Index Table during the playback. Since there is no need to rewrite all the dynamic scenarios recorded on a BD-ROM when partial replacement is desired, the present embodiment is capable of avoiding the risk of recalling the recording medium even when such problems are raised.

In addition to the case where replacing videos is wanted, when it is desired not to have playback devices play certain Titles from among multiple Titles recorded on BD-ROMs, or when it is desired to shuffle the order of Titles recorded on BD-ROMs, all is required is to download an Index Table. This is because there is no need to rewrite dynamic scenarios recorded on BD-ROMs in order to make these modifications.

12. Remarks

Thus have been described the present invention the embodiments above, however, these embodiments are provided as mere examples of systems which are expected to bring about the best effects under the present set of circumstances. The present invention can be modified without departing from the scope of the invention. The following items (A) to (W) are representative modifications of the present invention.

(A) In all the embodiments above, an optical disk according to the present invention is implemented as a BD-ROM. However, the optical disk of the present invention is characterized by the recorded dynamic scenarios and Index Table, and these characteristics are not dependent on the physical properties of a BD-ROM. Any form of recording media is applicable as long as there exists the capacity to record dynamic scenarios and Index Tables. For example, optical disks such as DVD-ROM, DVD-RAM, DVD-RW, DVD-R, DVD+RW, DVD+R, CD-R, and CD-RW, and optical-magnetic disks such as PD and MO are all applicable. Semiconductor memory cards such as compact flash cards, smart media, memory sticks, multimedia cards, and PCM-CIA cards are also applicable.

Furthermore, (i) magnetic recording disks such as flexible disks, SuperDisk, Zip, and Clik!, and (ii) removable hard disk drives such as ORB, Jaz, SparQ, SyJet, EZFley, and microdrives are applicable. In addition, the recording medium may also be a built-in hard disk.

Dynamic scenarios, Index Tables, and PL information may be recorded on a different recording medium from one for the AV stream and stream management information. These may then be read in parallel and played as a single video edit.

(B) Although the playback devices in all the embodiments first decode AV streams recorded on a BD-ROM and then output the result to a TV, the playback device may be structured only from a BD-ROM drive, and all of the other elements are equipped on a TV. In this case, the playback device and the TV can be incorporated into a home network connected using IEEE1394. In addition, although the playback devices in the embodiments are of a type used after connecting to a TV, integral display-playback devices are also applicable. Furthermore, the playback device may be only those parts of the playback devices of the embodiments that perform essential parts of the processing. Because these playback devices are all inventions disclosed in the specification of the present application, acts involving the manufacture of playback devices based on an internal structure of the playback devices shown in the first to eleventh embodiments are implementations of the inventions disclosed in the specification of the present application. Acts that involve transferring (retail when cost is involved; a gift when no cost is involved), lending, or importing of playback devices shown in the first to eleventh embodiments are also implementations of the present invention. Acts that involve approaching the general user about transfer and rental by means of show-widow displays, catalogue solicitation, pamphlet distribution and the like are also implementations of these playback devices.

(C) Because of the information processing by programs shown in FIGS. 29-31, FIG. 39, and FIG. 48 being realized specifically using hardware resources, programs showing the processing procedures in the flowcharts form an invention in their own right. Although all of the embodiments show embodiments that relate to the implementation of programs relating to the present invention in an incorporated form in the playback devices, the programs shown in the first to eleventh embodiments may be implemented in their own right, separate from the playback devices. The implementation of the programs in there own right includes acts that involve: (1) production of the programs; (2) transference of the programs, either gratuitous or otherwise; (3) lending of the programs; (4) importing of the programs; (5) providing the programs publicly via bi-directional electronic communications circuits; and (6) approaching the general user about transfer and rental by means of show-widow displays, catalogue solicitation, pamphlet distribution, and so forth.

(D) Consider that the element of "time" relating to the steps executed in time-series in the flowcharts of FIGS. 29-31, FIG. 39, and FIG. 48 is a required item for specifying the invention. If this is the case, then the processing procedures shown by the flowcharts can be understood as disclosing the usage configurations of the playback method. Execution of the processing in the flowcharts so as to achieve the original objects of the present invention and to enact the actions and effects by performing the processing of the steps in time-series is, needless to say, an implementation of the recording method pertaining to the present invention.

(E) Although Java objects in the above embodiments are applications that render CGs, any application described in the Java language is applicable. For example, Java objects may be client applications used for EC (Electronic Commerce). Because Java objects that provide descriptions of products involving videos of movie works can be realized, it is possible to bring character business pertaining to movie works to a success. In addition, applications of Java objects may be online fighting games. Furthermore, characters represented by CGs using Java objects may perform processing as an agent. Characters as agents may realize a help function of playback devices, or may supply advices to a user.

A library as used by Java objects may be recorded on BD-ROMs. Such a library includes PNG files, MNG files storing animation data, XML files storing information relating to streams, and HTML/SMIL files. Particularly, in the case where MNG files storing animation data are recorded on BD-ROMs as a library, it is possible to readily render a CG of an owl as described above.

Information that WebPage objects retrieve from websites may be web pages, and image data. In addition, such information may be AV streams, stream management information, and PL information. WebPage objects may conduct processing in cooperation with search engines.

Furthermore, description languages in the enhanced modes may be C++, C#, and the like.

Figure 57:
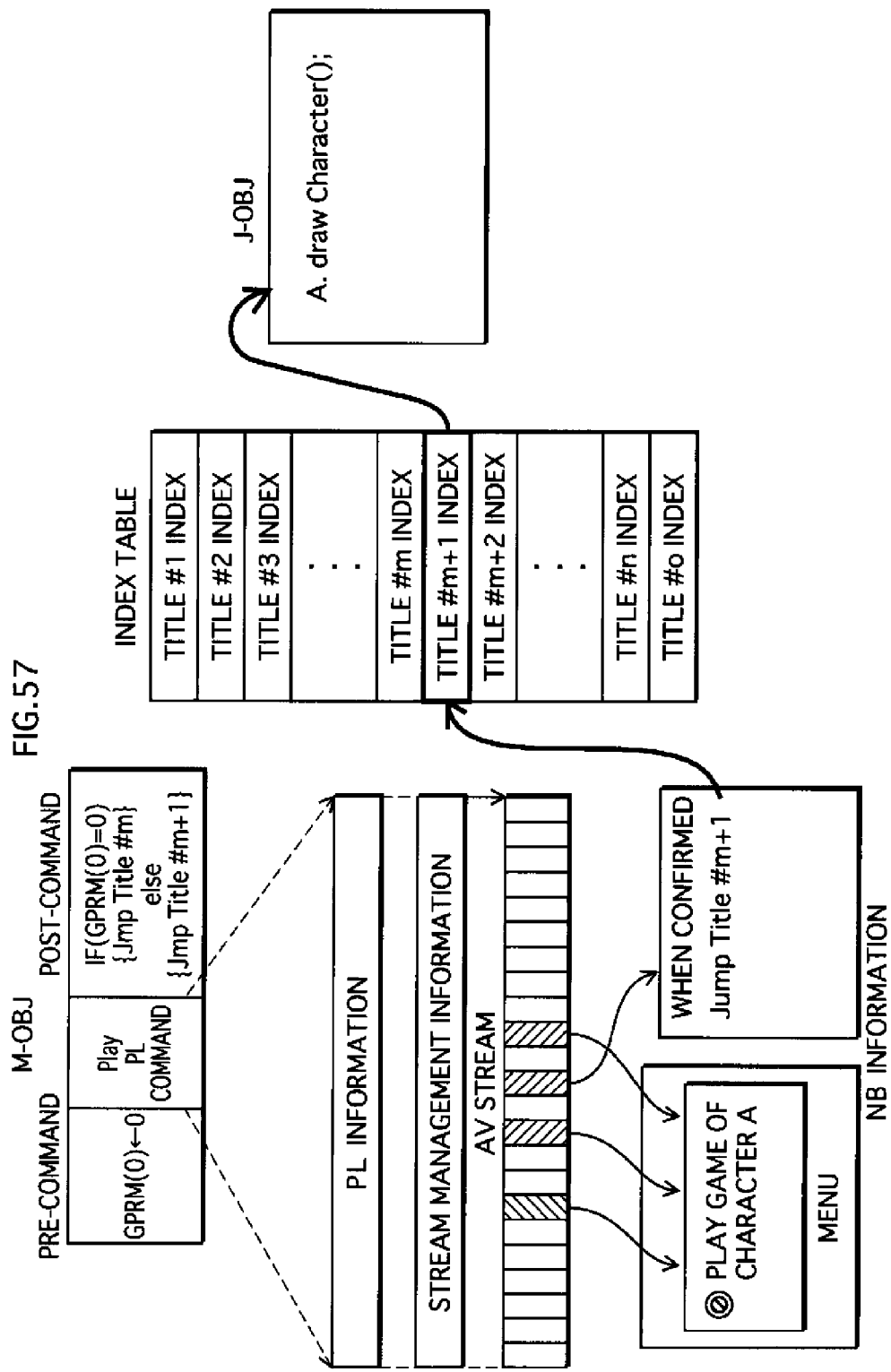
FIG. 57 shows an example of a playback control for branching directly from Navigation Button information in the AV stream to a Java object.

(F) Note that an example in FIG. 18 of the first embodiment is a mere example of a technique for describing playback controls of the BD-ROM according to the present invention. Other description techniques include directly branching from Navigation Button information in an AV stream to a Java object. FIG. 57 shows an example of a playback control for branching directly from Navigation Button information in an Av stream to a Java object. Describing Navigation Button information so as to perform such branching allows unrestricted descriptions of scene development, such as branching from a scene in which a character appears to a game starring the character, which expands the range of expression for scene development.

(G) Regarding the sixth embodiment, a menu (Chapter Menu) for displaying a list of Chapters and MOVIE objects for controlling the behavior of the menu may be recorded on a BD-ROM so that branching from the Top Menu is made possible. In addition, the menu may be called by pushing down a Chapter key on a remote controller.

(H) At recording on a BD-ROM, extension headers preferably are appended to TS packets structuring an AV stream. The extension headers, which are called TP extra header, include an "Arrival_Time_Stamp" and a "copy_permission_indicator", and have a 4-byte data length. TP_extra_header-attached TS packets (hereinafter, abbreviated to "EX-attached TS packet") are arranged into groups of 32 packets, and written into three sectors. Each group comprising 32 EX-attached TS packets is 6,144 bytes in length (=32×192), and matches the 6,144-byte size of three sectors (=2048×3). The grouping of 32 EX-attached TS packets contained in three sectors is referred to as an "Aligned Unit".

The playback device 200 transmits Aligned Units in transmission processing as described below, when used in a home network connected via IEEE1394. That is, a device on the side of the sender removes the TP extra header from each of the 32 EX-attached TS packets included in an Aligned Unit, and outputs the TS packets after encoding the TS packet body based on a DTCP standard. When outputting TS packets, isochronous packets are inserted between all adjacent TS packets. The positioning of isochronous packets is based on times shown in the Arrival_Time_Stamp in each TP_extra_ header. The playback device 200 outputs a DTCP Descriptor following the outputting of the TS packets. The DTCP_Descriptor shows a copy permissibility setting in each TP_extra_header. Here, if the DTCP_Descriptor is described so as to show "copy prohibited", TS packets will not be recorded on other devices when used in a home network connected via IEEE1394.

(I) Copy generation information (CGI) may be embedded in AV streams, and limited copies of AV streams may be permitted. CGI includes "copy free" indicating unrestricted copies permitted, "one generation copy" indicating that recording of one generation copy is permitted, "no more copy" indicating that reproduction of a further copy is prohibited, and "never copy" indicating that copying is by no means permitted. That is, a backup from HD to DVD is performed only when CGI embedded in the contents shows "copy free" or "one generation copy", but a backup is not performed when CGI shows "no more copy" or "never copy".

(J) In the case where rights management information is added to AV streams, copy of AV streams may be allowed under use conditions defined in rights management information.

When conditions for copy permits are defined with the specified number of copies in rights management information, copying is performed within this scope. When conditions for copy permits are defined with a specified period of validity (year, month, and day), copying is performed within this scope.

(K) In the case when copy processing includes variations such as transfer, migration, check-out, and the like, a backup may be performed based on defined use conditions with respect to each variation. Transfer is copy processing involving deletion of contents at a copy source, and is used when contents are transferred among multiple recording media.

Migration is copy processing conducted on the premise that information on use conditions is created at a recording medium of a copy destination.

Check-out is a type of copy with the limited number of copies, and copy of contents is implemented after the number of copies is decremented. Check-out differs from commonly termed "copy with limited number" in that an increment in the number of copying is possible. An increment in the number of copying is conducted after processing of making impossible to play contents recorded on the recording medium, due to copying (this is called "check-in").

(L) AV streams in the above embodiments may be VOBs (Video Objects) complying with a DVD-Video standard or a DVD-Video Recording standard. VOBs are program streams compliant with ISO/IEC13818-1 obtained by multiplexing video and audio streams. In addition, AV streams in the embodiments may be called "AVClips". In this case, stream management information is called Clip information. Also, video streams in the AV streams may be an MPEG-4 format, WMV format, or the like. Furthermore, audio streams may be a Linear-PCM format, Dolby-AC3 format, MP3 format, or MPEG-AAC format.

(M) Although Cell information in the above embodiments specifies a start and end of a playback section using time information, logical addresses on a BD-ROM can be used instead. In addition, CELL in the above embodiments may be called "PlayItem".

(N) TMAP in stream management information may be called "EP_map". In this case, playback start times of ACCESS UNITs are preferably represented by time-stamps (Presentation Time Stamp) of picture data located at the head of individual ACCESS UNITs. In addition, addresses of ACCESS UNITs are preferably represented by serial numbers of PES packets (SPN (Serial Packet Number)).

(O) In the structure of the playback devices, only the current dynamic scenario is stored in dynamic scenario memory 15 and only the current stream management information and the current PL information are stored in the static scenario memory 11. However, a plurality of scenarios, stream management information, and PL information may be stored in advance, as with cache memory. Herewith, the time lag until reading this data from the BD-ROM can be shortened. In addition, although BACKUP memory 14 saves the stored values of registers in stack form, when consideration is given to the relationship with memory size, it is realistic to arrange the stored values for saving on the one level.

(P) In order to play two or more CELLs structuring a PL in a row, it is preferable that a process has been conducted so as to join these CELLs seamlessly.

A process for a seamless join can be realized by copying an end part of a preceding playback section and a head part of a follow-on playback section of the video data to create a copied portion in advance, and re-encoding the copied portion. Note that the copied portion created for a seamless join may be called a "Bridge-Clip".

Here, it is preferable to set the end part and head part as follows.

The end part is preferably composed of an ACCESS UNIT including an Out-point of the preceding playback section and two ACCESS UNITS in front of the Out-point including ACCESS UNIT within a preceding CELL information #x. On the other hand, the head part is composed of an ACCESS UNIT including an In-point of the follow-on playback section within the following CELL information #x+1. The ground for setting the end and head parts in this way is described in the related technology of U.S. Pat. No. 6,148,140 disclosed by the applicants of the present invention, and therefore for more detail refer to the patent publication.

Furthermore, it is desirable to set seamless join information for the copied portion created for a seamless join. Seamless join information includes a playback starting time of the first video frame, a playback ending time of the last video frame, an audio gap starting time, an audio gap duration, and audio gap location information. When such seamless join information has been defined, it is possible to calculate the difference in time stamps (STC-Offset) of the two sections using the playback starting time of the first video frame and the playback ending time of the last video frame, and set the calculated difference to a playback device. In addition, controlling an audio decoder by referring to the audio gap information allows to prevent audio discontinuity at the time of a transition from one section to another.

(Q) Titles (movie works) in the above embodiments corresponds to all copyrighted works expressed in video pictures, such as TV films, game software, and the like. This is because video edits in the above embodiment (i) are expressed in a method that produces visual or audio-visual effects, such as cathode-ray tube display, liquid crystal display, and the like; (ii) exist as maintaining the identity by being tied with BD-ROMs, which are tangible entities, in one way or another; and (iii) are placed in a reproducible situation, and thus satisfy requirements as formats for existence of movie works with a copyright.

However, since essential elements of the present invention are not limited to such video edits, video data of the present invention may be video pictures obtained by monitoring cameras and home video cameras.

(R) BD-ROMs in the above embodiment are equivalent to HD-DVDs and BD-ROMs described in the priority applications on which a claim of priority is based (U.S. No. 60/409,999 and No. 60/440,623). In addition, playback control engines 12 in the above embodiments correspond to a BD-ROM-FF processor 3025 and a scenario processor 304 (FIG. 35) disclosed in the specification of the basic application. The module manager 20 corresponds to a playback controller 3024 (FIG. 35) while the DVD-like module 16, the Java module 17, and the BROWSER module 18 correspond to a DVD compatible module 3021, a Java module 3023, and a browser module 3022. Since these are described in the basic application, the priority claims related to the technical matters are justified.

(S) CGs rendered in the Java language (e.g. the image of an owl) may be created with data in the NURBS format (Non Uniform Rational B-Spline). NURBS is a bundle of Bezier curves (such a bundle of Bezier curves is called "B-spline"), and the curvature of each Bezier curve is not uniform.

CGs may be created in a polygon format. The polygon format is a data format that is defined to represent certain three-dimensional shape by polyhedral approximation. AutoCAD's Data eXchange Format (DXF) defined by Autodesk in the U.S. and other formats of HRC, WAVEFRONT, IV, and VRML are widely known polygon formats.

Surface patterns of configurations may be added by texture mapping. The rendering engine 22 creates projected images of three-dimensional shape data described above, and has an image decoder decode the projected images. At this point, the rendering engine performs texture mapping. Texture mapping is a process of pasting texture patterns, such as a still image, a bitmaps, and the like, on a plane surface or a curved surface to display the result. In addition, colors and brightness of plane surfaces between control points are calculated based on distances and positional relationship between a light source position and plane surfaces of individual pieces of the three-dimensional shape data, and colors and brightness of projected images on screen are adjusted according to the calculated brightness. This process of calculating colors and brightness of plane surfaces between control points based on distances and positional relationship between a light source position and each plane surface is called shading process. As a result of the shading process, projected images of three-dimensional shape data are shaded, and obtain three-dimensional appearances. The processing described above enables to display CGs comparable to those created by specialized game machines, next to video images of a movie.

Motions of characters, such as the flight of an owl, are realized by altering the three-dimensional shape data based on a constant regularity. It is preferable to record the three-dimensional shape data between extents structuring XXX.M2TS (positions corresponding to "another files" in FIG. 7). Herewith, the AV stream and three-dimensional shape data can be read all together.

(T) Although, in the above embodiments, user's selection operations for video edits are received from a remote controller, the operations may be received from a front-panel of a playback device. Alternatively, user specifications can be received via input devices, such as a keyboard, a touch panel, a mouse, a pad, a trackball, and the like. In such cases, the selection operations may be received through click and drag operations.

(U) Movie edits in the embodiments may be obtained by encoding analog video signals broadcast by analog broadcast. Also, the movie edits may be stream data constituted from transport streams broadcast by digital broadcast.

In addition, contents may be obtained by encoding analog/digital video signals recorded on videotape. Furthermore, contents may be obtained by encoding analog/digital video signals taken directly from a video camera. Alternatively, contents may be digital copyrighted works distributed from distribution servers.

(V) The Java module 17 may be a Java platform installed in a device in order to receive satellite broadcasts. If the Java module 17 is this Java platform, a playback device according to the present invention shares processing as MHP-use STBs.

Furthermore, the Java module 17 may be a Java platform installed in a device in order to perform mobile telephone processing controls. If the Java module 17 is this Java platform, a playback device according to the present invention shares processing as a mobile telephone.

In addition, the BROWSER module 18 may be computer-installed Browser software such as Microsoft's Internet Explorer, and the like.

(W) In the layer model shown in FIG. 12, the Browser mode and the MOVIE mode may be disposed over the Java mode. Particularly because of the light burden, on the playback device, of the interpretation of dynamic scenarios and the execution of control procedures based on dynamic scenarios in the MOVIE mode, no problems arise even when the MOVIE mode is executed over the Java mode. In addition, when developing playback devices and movie works, operation assurance can be dealt with in a single mode.

Furthermore, the Java mode processing may be executed only in the Java mode, instead of three modes being provided. As shown in the second embodiment, since playback controls synchronized with PL playback are possible even in the Java mode, the necessity of providing the MOVIE mode is removed. Furthermore, controls of dynamic scenarios may be performed only in either the MOVIE mode or the Browser mode.

INDUSTRIAL APPLICABILITY

Since a recording medium according to the present invention effectively enhances the added value of video data structuring movie works, it is possible to supply more appealing movie works to the market, and stimulate the markets for movies and consumer appliances. Therefore, a recording medium and playback device according to the present invention are highly applicable in the movie and consumer appliance industries.

What is claimed is:

1. A non-transitory recording medium having a digital stream, playlist information, and a program recorded thereon, the digital stream being composed of a plurality of elementary streams being multiplexed with one another, wherein
the program is written using one of an object-oriented language and a non-object-oriented language,
the playlist information is used for playing back the program, and includes filtering information relating to the elementary streams and playback path information,
the filtering information indicates, from among the elementary streams, a playable elementary stream,
the playback path information defines a playback path on the digital stream,
if the program to be played back using the playlist information is written using the object-oriented language, the filtering information included in the playlist information sets any of the elementary streams that includes Navigation Button information defining a menu to unplayable, and if the program to be played back using the playlist information is written using the non-object-oriented language, the filtering information included in the playlist information sets any of the elementary streams that includes Navigation Button information defining a menu to playable.

2. A playback device of reading a program and playlist information from a recording medium and playing back a digital stream based on the read program and playlist information, the digital stream being composed of a plurality of elementary streams multiplexed with one another, wherein the playback device comprises:

a plurality of modules each operable to execute the program recorded in the recording medium; and a playback control engine operable to play back a playlist in accordance with an instruction issued by the modules, the program is written using one of an object-oriented language and a non-object-oriented language, the playlist information is used for playing back the program, and includes filtering information relating to the elementary streams and playback path information, the filtering information indicates, from among the elementary streams, a playable elementary stream, the playback path information defines a playback path on the digital stream, if the program to be played back using the playlist information is written using the object-oriented language, the filtering information included in the playlist information sets any of the elementary streams that includes Navigation Button information defining a menu to unplayable, and if the program to be played back using the playlist information is written using the non-object-oriented language, the filtering information included in the playlist information sets any of the elementary streams that includes Navigation Button information defining a menu to playable.

3. A recording method of recording a digital stream in a recording medium, the recording method comprising:

multiplication of a plurality of elementary streams; and recording of a digital stream resulting from the multiplication, playlist information, and a program the program is written using one of an object-oriented language and a non-object-oriented language, the playlist information is used for playing back the program, and includes filtering information relating to the elementary streams and playback path information, the filtering information indicates, from among the elementary streams, a playable elementary stream, the playback path information defines a playback path on the digital stream, if the program to be played back using the playlist information is written using the object-oriented language, the filtering information included in the playlist information sets any of the elementary streams that includes Navigation Button information defining a menu to unplayable, and if the program to be played back using the playlist information is written using the non-object-oriented language, the filtering information included in the playlist information sets any of the elementary streams that includes Navigation Button information defining a menu to playable.

4. A playback method of reading a program and playlist information from a recording medium and playing back a digital stream based on the read program and playlist information, the digital stream being composed of a plurality of elementary streams multiplexed with one another, the playback method comprising:

execution of the program; and playback of the playlist in accordance with an instruction issued by the program, the program is written using one of an object-oriented language and a non-object-oriented language, the playlist information is used for playing back the program, and includes filtering information relating to the elementary streams and playback path information, the filtering information indicates, from among the elementary streams, a playable elementary stream, the playback path information defines a playback path on the digital stream, if the program to be played back using the playlist information is written using the object-oriented language, the filtering information included in the playlist information sets any of the elementary streams that includes Navigation Button information defining a menu to unplayable, and if the program to be played back using the playlist information is written using the non-object-oriented language, the filtering information included in the playlist information sets any of the elementary streams that includes Navigation Button information defining a menu to playable.

* * * * *